United States Patent
Sirpal et al.

(10) Patent No.: US 9,247,174 B2
(45) Date of Patent: Jan. 26, 2016

(54) PANEL USER INTERFACE FOR AN INTELLIGENT TELEVISION

(71) Applicant: Flextronics AP, LLC, San Jose (CA)

(72) Inventors: Sanjiv Sirpal, Oakville (CA);
Mohammed Selim, Oakville (CA);
Saulo Correia Dourado, Oakville (CA);
Alexander de Paz, Burlington (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 13/968,665

(22) Filed: Aug. 16, 2013

(65) Prior Publication Data
US 2014/0059605 A1    Feb. 27, 2014

Related U.S. Application Data

(60) Provisional application No. 61/684,672, filed on Aug. 17, 2012, provisional application No. 61/702,650, filed on Sep. 18, 2012, provisional application No. 61/697,710, filed on Sep. 6, 2012, provisional (Continued)

(51) Int. Cl.
*H04N 5/44* (2011.01)
*H04N 21/422* (2011.01)

(Continued)

(52) U.S. Cl.
CPC .............. *H04N 5/4401* (2013.01); *G06F 3/017* (2013.01); *G06F 3/0481* (2013.01);

(Continued)

(58) Field of Classification Search
CPC .......... H04N 1/00408; H04N 1/00419; H04N 1/00429; H04N 21/472; H04N 21/482; H04N 21/4825; G06F 3/048; G06F 17/30873
See application file for complete search history.

(56) References Cited

U.S. PATENT DOCUMENTS 4,284,849 A    8/1981  Anderson et al.
5,539,479 A    7/1996  Bertram
(Continued)

FOREIGN PATENT DOCUMENTS

CN    1832534       9/2006
CN    101472102     7/2009
(Continued)

OTHER PUBLICATIONS

H. Bin Sohail, "Smart TV—A Late Bloomer", Hardwarezonw.com, Apr. 1, 2011.*

(Continued)

*Primary Examiner* — Nathan Flynn
*Assistant Examiner* — James R Marandi
(74) *Attorney, Agent, or Firm* — Sheridan Ross P.C.

(57) ABSTRACT

An intelligent television and methods for displaying content are disclosed. Specifically, a user may cause an application panel to be displayed, which displays content based on the panel tab selected by the user and the content being actively displayed on the intelligent television; that is, the layout, information, and content of the application panel depends on the content being displayed by the intelligent television. For example, upon receiving a selection from the user, the intelligent television may display one or more items of information that are associated with the content currently being displayed in an active content window. Additionally, the user may select a tab corresponding to specific information about the active content window. As the application panel is used to navigate through various screens in the intelligent television, the application panel itself does not obstruct the user from viewing content displayed on the screen of the intelligent television.

14 Claims, 40 Drawing Sheets

Related U.S. Application Data application No. 61/700,182, filed on Sep. 12, 2012, provisional application No. 61/736,962, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | |
|---|---|
| H04N 17/04 | (2006.01) |
| H04N 21/482 | (2011.01) |
| H04N 5/50 | (2006.01) |
| H04N 21/43 | (2011.01) |
| H04N 21/262 | (2011.01) |
| H04N 21/437 | (2011.01) |
| H04N 21/462 | (2011.01) |
| H04N 21/81 | (2011.01) |
| H04N 21/442 | (2011.01) |
| H04N 21/485 | (2011.01) |
| H04N 21/472 | (2011.01) |
| H04N 21/4788 | (2011.01) |
| H04N 21/475 | (2011.01) |
| H04N 21/84 | (2011.01) |
| H04N 21/478 | (2011.01) |
| H04N 21/8358 | (2011.01) |
| H04N 5/445 | (2011.01) |
| G06F 3/0481 | (2013.01) |
| H04N 21/488 | (2011.01) |
| H04N 21/61 | (2011.01) |
| H04N 21/439 | (2011.01) |
| H04N 21/431 | (2011.01) |
| H04N 21/435 | (2011.01) |
| H04N 21/432 | (2011.01) |
| H04N 21/47 | (2011.01) |
| H04L 12/58 | (2006.01) |
| H04N 21/258 | (2011.01) |
| H04N 21/45 | (2011.01) |
| G06F 3/01 | (2006.01) |
| G06F 3/0488 | (2013.01) |
| H04N 5/45 | (2011.01) |
| H04N 21/433 | (2011.01) |

(52) U.S. Cl.
CPC ........... *G06F 3/04883* (2013.01); *H04L 51/32* (2013.01); *H04N 5/44* (2013.01); *H04N 5/4403* (2013.01); *H04N 5/445* (2013.01); *H04N 5/45* (2013.01); *H04N 5/50* (2013.01); *H04N 17/04* (2013.01); *H04N 21/25808* (2013.01); *H04N 21/26291* (2013.01); *H04N 21/42204* (2013.01); *H04N 21/42207* (2013.01); *H04N 21/432* (2013.01); *H04N 21/433* (2013.01); *H04N 21/435* (2013.01); *H04N 21/437* (2013.01); *H04N 21/4307* (2013.01); *H04N 21/4316* (2013.01); *H04N 21/4396* (2013.01); *H04N 21/442* (2013.01); *H04N 21/44204* (2013.01); *H04N 21/44213* (2013.01); *H04N 21/44222* (2013.01); *H04N 21/4532* (2013.01); *H04N 21/4622* (2013.01); *H04N 21/47* (2013.01); *H04N 21/472* (2013.01); *H04N 21/478* (2013.01); *H04N 21/4755* (2013.01); *H04N 21/4788* (2013.01); *H04N 21/47202* (2013.01); *H04N 21/482* (2013.01); *H04N 21/485* (2013.01); *H04N 21/488* (2013.01); *H04N 21/4821* (2013.01); *H04N 21/4823* (2013.01); *H04N 21/4828* (2013.01); *H04N 21/4858* (2013.01); *H04N 21/4882* (2013.01); *H04N 21/6125* (2013.01); *H04N 21/6175* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *G06F 2203/04804* (2013.01); *H04N 21/42219* (2013.01); *H04N 21/4332* (2013.01)

(56) References Cited

U.S. PATENT DOCUMENTS

| | | | |
|---|---|---|---|
| 5,734,444 | A | 3/1998 | Yoshinobo |
| 5,867,227 | A | 2/1999 | Yamaguchi |
| 5,964,839 | A | 10/1999 | Johnson et al. |
| 6,008,803 | A | 12/1999 | Rowe et al. |
| 6,047,319 | A | 4/2000 | Olson |
| 6,111,614 | A | 8/2000 | Mugura et al. |
| 6,177,931 | B1 | 1/2001 | Alexander et al. |
| 6,239,794 | B1 | 5/2001 | Yuen et al. |
| 6,285,804 | B1 | 9/2001 | Crinon et al. |
| 6,493,038 | B1 | 12/2002 | Singh et al. |
| 6,493,876 | B1 | 12/2002 | DeFreese et al. |
| 6,515,968 | B1 | 2/2003 | Combar et al. |
| 6,563,515 | B1 | 5/2003 | Reynolds et al. |
| 6,564,378 | B1 | 5/2003 | Satterfield et al. |
| 6,629,077 | B1 | 9/2003 | Arling et al. |
| 6,661,468 | B2 | 12/2003 | Alten et al. |
| 6,704,062 | B1 | 3/2004 | Ahida |
| 6,766,526 | B1 | 7/2004 | Ellis |
| 6,971,118 | B1 | 11/2005 | Akhavan et al. |
| 7,058,600 | B1 | 6/2006 | Combar et al. |
| 7,174,126 | B2 | 2/2007 | McElhatten et al. |
| 7,228,556 | B2 | 6/2007 | Beach et al. |
| 7,233,316 | B2 | 6/2007 | Smith et al. |
| 7,266,726 | B1 | 9/2007 | Ladd et al. |
| 7,363,591 | B2 | 4/2008 | Goldthwaite et al. |
| 7,487,529 | B1 | 2/2009 | Orlick |
| 7,493,641 | B2 | 2/2009 | Klosterman et al. |
| 7,506,350 | B2 | 3/2009 | Johnson |
| 7,543,320 | B2 | 6/2009 | Schein et al. |
| 7,577,923 | B2 | 8/2009 | Beam et al. |
| 7,623,933 | B2 | 11/2009 | Sarosi et al. |
| 7,685,520 | B2 | 3/2010 | Rashkovskiy et al. |
| 7,698,606 | B2 | 4/2010 | Ladd et al. |
| 7,805,634 | B2 | 9/2010 | Balazich et al. |
| 7,822,716 | B2 | 10/2010 | Lee et al. |
| 7,880,077 | B2 | 2/2011 | Pauws et al. |
| 7,900,228 | B2 | 3/2011 | Stark et al. |
| 7,904,924 | B1 | 3/2011 | De Heer et al. |
| 7,908,635 | B2 | 3/2011 | Barton et al. |
| 8,006,201 | B2 | 8/2011 | Bhattacharya |
| 8,065,390 | B2 | 11/2011 | Cheng |
| 8,089,455 | B1 | 1/2012 | Wieder |
| 8,127,329 | B1 | 2/2012 | Kunkel et al. |
| 8,151,215 | B2 | 4/2012 | Baurmann et al. |
| 8,166,511 | B2 | 4/2012 | Griggs |
| 8,201,104 | B2 | 6/2012 | Yamamoto et al. |
| 8,220,021 | B1 | 7/2012 | Look et al. |
| 8,281,339 | B1 | 10/2012 | Walker et al. |
| 8,473,976 | B2 | 6/2013 | Udani |
| 8,510,780 | B2 | 8/2013 | Stallings et al. |
| 8,516,519 | B2 | 8/2013 | Lee |
| 8,566,874 | B2 | 10/2013 | Roberts et al. |
| 8,589,981 | B2 | 11/2013 | Lee et al. |

(56) References Cited

U.S. PATENT DOCUMENTS

| | | |
|---|---|---|
| 8,640,166 B1 | 1/2014 | Craner |
| 8,683,519 B2 | 3/2014 | McCarthy et al. |
| 8,756,620 B2 | 6/2014 | Papish et al. |
| 8,832,742 B2 | 9/2014 | Rasanen et al. |
| 2001/0001160 A1 | 5/2001 | Shoff et al. |
| 2001/0010097 A1 | 7/2001 | Lee |
| 2001/0056577 A1 | 12/2001 | Gordon et al. |
| 2002/0042914 A1 | 4/2002 | Walker et al. |
| 2002/0049970 A1 | 4/2002 | Park |
| 2002/0052746 A1 | 5/2002 | Handelman |
| 2002/0056098 A1 | 5/2002 | White |
| 2002/0067376 A1 | 6/2002 | Martin et al. |
| 2002/0152267 A1 | 10/2002 | Lennon |
| 2002/0188944 A1 | 12/2002 | Noble |
| 2003/0003876 A1 | 1/2003 | Rumsey |
| 2003/0014752 A1 | 1/2003 | Zaslavsky et al. |
| 2003/0084449 A1 | 5/2003 | Chane et al. |
| 2003/0110234 A1 | 6/2003 | Egli et al. |
| 2003/0118323 A1 | 6/2003 | Ismail et al. |
| 2003/0149988 A1 | 8/2003 | Ellis et al. |
| 2003/0151621 A1 | 8/2003 | McEvilly et al. |
| 2003/0177498 A1 | 9/2003 | Ellis et al. |
| 2003/0182658 A1 | 9/2003 | Alexander |
| 2003/0182659 A1 | 9/2003 | Ellis et al. |
| 2003/0208763 A1 | 11/2003 | McElhatten et al. |
| 2003/0225777 A1 | 12/2003 | Marsh |
| 2003/0226146 A1 | 12/2003 | Thurston et al. |
| 2004/0078807 A1 | 4/2004 | Fries et al. |
| 2004/0093616 A1 | 5/2004 | Johnson |
| 2004/0103120 A1 | 5/2004 | Fickle et al. |
| 2004/0117831 A1 | 6/2004 | Ellis et al. |
| 2004/0119815 A1 | 6/2004 | Soloff |
| 2004/0148362 A1 | 7/2004 | Friedman |
| 2004/0154040 A1 | 8/2004 | Ellis |
| 2004/0158193 A1 | 8/2004 | Bui |
| 2004/0211282 A1 | 10/2004 | Kim |
| 2004/0216156 A1 | 10/2004 | Wagner |
| 2004/0237108 A1 | 11/2004 | Drazin et al. |
| 2005/0015804 A1 | 1/2005 | LaJoie et al. |
| 2005/0022237 A1 | 1/2005 | Nomura |
| 2005/0091596 A1 | 4/2005 | Anthony et al. |
| 2005/0097606 A1 | 5/2005 | Scott, III et al. |
| 2005/0097622 A1 | 5/2005 | Zigmond et al. |
| 2005/0120306 A1 | 6/2005 | Klassen et al. |
| 2005/0149964 A1 | 7/2005 | Thomas et al. |
| 2005/0160452 A1 | 7/2005 | Lawler et al. |
| 2005/0165918 A1 | 7/2005 | Wantanabe et al. |
| 2005/0188318 A1 | 8/2005 | Tamir et al. |
| 2005/0188402 A1 | 8/2005 | de Andrade et al. |
| 2005/0204382 A1 | 9/2005 | Ellis et al. |
| 2005/0204387 A1 | 9/2005 | Knudson et al. |
| 2005/0229210 A1 | 10/2005 | Akhavan |
| 2005/0232210 A1 | 10/2005 | Karaoguz et al. |
| 2005/0289603 A1 | 12/2005 | Cezeaux et al. |
| 2006/0031875 A1 | 2/2006 | Yu |
| 2006/0064716 A1 | 3/2006 | Sull et al. |
| 2006/0090183 A1 | 4/2006 | Zito et al. |
| 2006/0101504 A1 | 5/2006 | Aravamudan et al. |
| 2006/0117337 A1 | 6/2006 | Shivaji Rao et al. |
| 2006/0123445 A1 | 6/2006 | Sullivan et al. |
| 2006/0143674 A1 | 6/2006 | Jones et al. |
| 2006/0158838 A1 | 7/2006 | Kinoshita et al. |
| 2006/0184972 A1 | 8/2006 | Rafey et al. |
| 2006/0248557 A1 | 11/2006 | Stark et al. |
| 2006/0262116 A1 | 11/2006 | Moshiri et al. |
| 2006/0280449 A1 | 12/2006 | Ogawa et al. |
| 2007/0011702 A1 | 1/2007 | Vaysman |
| 2007/0028282 A1 | 2/2007 | Kooijmans et al. |
| 2007/0050733 A1 | 3/2007 | Lee et al. |
| 2007/0061724 A1 | 3/2007 | Slothouber et al. |
| 2007/0066283 A1 | 3/2007 | Haar et al. |
| 2007/0096939 A1 | 5/2007 | Walrath |
| 2007/0143809 A1 | 6/2007 | Chen et al. |
| 2007/0154163 A1 | 7/2007 | Cordray |
| 2007/0162936 A1 | 7/2007 | Stallings et al. |
| 2007/0192715 A1 | 8/2007 | Kataria et al. |
| 2007/0199022 A1 | 8/2007 | Moshiri et al. |
| 2007/0250762 A1 | 10/2007 | Mansfield |
| 2007/0250864 A1 | 10/2007 | Diaz Perez |
| 2007/0261090 A1 | 11/2007 | Miller et al. |
| 2008/0022309 A1 | 1/2008 | Begeja et al. |
| 2008/0086745 A1 | 4/2008 | Knudson et al. |
| 2008/0092198 A1 | 4/2008 | Hutten |
| 2008/0098433 A1 | 4/2008 | Hardacker et al. |
| 2008/0114794 A1 | 5/2008 | Craner |
| 2008/0114861 A1 | 5/2008 | Gildred |
| 2008/0120635 A1 | 5/2008 | Trimper et al. |
| 2008/0133525 A1 | 6/2008 | Ott |
| 2008/0141307 A1 | 6/2008 | Whitehead |
| 2008/0163307 A1 | 7/2008 | Coburn et al. |
| 2008/0177828 A1 | 7/2008 | Accarie et al. |
| 2008/0235595 A1 | 9/2008 | Krantz et al. |
| 2008/0244637 A1 | 10/2008 | Candelore |
| 2008/0271080 A1 | 10/2008 | Gossweiler et al. |
| 2008/0276279 A1 | 11/2008 | Gossweiler et al. |
| 2008/0282294 A1 | 11/2008 | Carpenter et al. |
| 2008/0288461 A1 | 11/2008 | Glennon et al. |
| 2008/0307457 A1 | 12/2008 | Yang et al. |
| 2008/0313677 A1 | 12/2008 | Lee |
| 2009/0013350 A1 | 1/2009 | Ohlfs et al. |
| 2009/0019485 A1 | 1/2009 | Ellis et al. |
| 2009/0064222 A1 | 3/2009 | Dawson et al. |
| 2009/0102966 A1 | 4/2009 | Jiang et al. |
| 2009/0106793 A1 | 4/2009 | Tecot et al. |
| 2009/0125940 A1 | 5/2009 | Kim et al. |
| 2009/0129340 A1 | 5/2009 | Handa |
| 2009/0150379 A1 | 6/2009 | Park et al. |
| 2009/0158326 A1 | 6/2009 | Hunt et al. |
| 2009/0158375 A1 | 6/2009 | Rodriguez et al. |
| 2009/0160764 A1 | 6/2009 | Myllymäki |
| 2009/0165045 A1 | 6/2009 | Stallings et al. |
| 2009/0177981 A1 | 7/2009 | Christie et al. |
| 2009/0179989 A1 | 7/2009 | Bessone et al. |
| 2009/0199237 A1 | 8/2009 | White et al. |
| 2009/0199241 A1 | 8/2009 | Unger et al. |
| 2009/0199242 A1 | 8/2009 | Johnson et al. |
| 2009/0204929 A1 | 8/2009 | Baurmann et al. |
| 2009/0210910 A1 | 8/2009 | Smith et al. |
| 2009/0213079 A1 | 8/2009 | Segal et al. |
| 2009/0228919 A1 | 9/2009 | Zott et al. |
| 2009/0235311 A1 | 9/2009 | Michel et al. |
| 2009/0241048 A1 | 9/2009 | Augustine et al. |
| 2009/0249394 A1 | 10/2009 | Schwesinger et al. |
| 2009/0271823 A1 | 10/2009 | Jung et al. |
| 2009/0293078 A1 | 11/2009 | Pirani et al. |
| 2009/0293079 A1 | 11/2009 | McKee et al. |
| 2009/0300674 A1 | 12/2009 | Ratsch et al. |
| 2009/0313232 A1 | 12/2009 | Tinsley et al. |
| 2010/0013997 A1 | 1/2010 | Whang |
| 2010/0031193 A1 | 2/2010 | Stark et al. |
| 2010/0050219 A1 | 2/2010 | Angiolillo et al. |
| 2010/0058231 A1 | 3/2010 | Duarte et al. |
| 2010/0071019 A1 | 3/2010 | Blanchard et al. |
| 2010/0086277 A1 | 4/2010 | Craner |
| 2010/0100512 A1 | 4/2010 | Brodin et al. |
| 2010/0107112 A1 | 4/2010 | Jennings et al. |
| 2010/0122284 A1 | 5/2010 | Yoon et al. |
| 2010/0128183 A1 | 5/2010 | Ishii |
| 2010/0161506 A1 | 6/2010 | Bosenick et al. |
| 2010/0172407 A1 | 7/2010 | Ramaswamy |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0191727 A1 | 7/2010 | Malik |
| 2010/0201890 A1 | 8/2010 | Degonde et al. |
| 2010/0225830 A1 | 9/2010 | Blanchard et al. |
| 2010/0241962 A1 | 9/2010 | Peterson et al. |
| 2010/0293497 A1 | 11/2010 | Peterson |
| 2010/0306402 A1 | 12/2010 | Russell et al. |
| 2010/0306800 A1 | 12/2010 | Jung et al. |
| 2011/0016492 A1 | 1/2011 | Morita |
| 2011/0022450 A1 | 1/2011 | Meredith |
| 2011/0023608 A1 | 2/2011 | Rueger |
| 2011/0035774 A1 | 2/2011 | Parker |

(56) References Cited

U.S. PATENT DOCUMENTS

| | | |
|---|---|---|
| 2011/0041150 A1 | 2/2011 | Schein et al. |
| 2011/0043696 A1 | 2/2011 | Onogi et al. |
| 2011/0047572 A1 | 2/2011 | Hill et al. |
| 2011/0055873 A1 | 3/2011 | Heo et al. |
| 2011/0060661 A1 | 3/2011 | Chai et al. |
| 2011/0067066 A1 | 3/2011 | Barton et al. |
| 2011/0072480 A1 | 3/2011 | Stone |
| 2011/0074591 A1 | 3/2011 | Arling et al. |
| 2011/0078745 A1 | 3/2011 | Macrae et al. |
| 2011/0093888 A1 | 4/2011 | Araki et al. |
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0125755 A1 | 5/2011 | Kaila et al. |
| 2011/0126251 A1 | 5/2011 | LaFreniere et al. |
| 2011/0131506 A1 | 6/2011 | Calissendorff |
| 2011/0145860 A1 | 6/2011 | Wei |
| 2011/0145881 A1 | 6/2011 | Hartman et al. |
| 2011/0154198 A1 | 6/2011 | Bachman et al. |
| 2011/0154405 A1 | 6/2011 | Isaias |
| 2011/0161996 A1 | 6/2011 | Hamano et al. |
| 2011/0167452 A1 | 7/2011 | Baumgartner et al. |
| 2011/0173657 A1 | 7/2011 | Thomas et al. |
| 2011/0179453 A1 | 7/2011 | Poniatowski |
| 2011/0179454 A1 | 7/2011 | Yates |
| 2011/0187929 A1 | 8/2011 | Suzuki et al. |
| 2011/0213670 A1 | 9/2011 | Strutton et al. |
| 2011/0213700 A1 | 9/2011 | Sant'Anselmo |
| 2011/0219395 A1 | 9/2011 | Moshiri et al. |
| 2011/0246495 A1 | 10/2011 | Mallinson |
| 2011/0252446 A1 | 10/2011 | Jeong et al. |
| 2011/0273552 A1 | 11/2011 | Wang et al. |
| 2011/0273625 A1 | 11/2011 | McMahon et al. |
| 2011/0276995 A1 | 11/2011 | Alten et al. |
| 2011/0283304 A1 | 11/2011 | Roberts et al. |
| 2011/0283318 A1 | 11/2011 | Seidel et al. |
| 2011/0289067 A1 | 11/2011 | Jordan et al. |
| 2011/0289419 A1 | 11/2011 | Yu et al. |
| 2011/0289452 A1 | 11/2011 | Jordan et al. |
| 2011/0321095 A1 | 12/2011 | Yao et al. |
| 2011/0321098 A1 | 12/2011 | Bangalore et al. |
| 2012/0002951 A1 | 1/2012 | Reisman |
| 2012/0011545 A1 | 1/2012 | Doets et al. |
| 2012/0026400 A1 | 2/2012 | Kang et al. |
| 2012/0030317 A1 | 2/2012 | Smyth et al. |
| 2012/0033950 A1 | 2/2012 | Cordray et al. |
| 2012/0042334 A1 | 2/2012 | Choi et al. |
| 2012/0054803 A1 | 3/2012 | Lee et al. |
| 2012/0060094 A1 | 3/2012 | Irwin et al. |
| 2012/0060187 A1 | 3/2012 | Moon et al. |
| 2012/0069131 A1 | 3/2012 | Abelow |
| 2012/0072952 A1 | 3/2012 | Vaysman et al. |
| 2012/0076473 A1 | 3/2012 | Kunkel et al. |
| 2012/0079096 A1 | 3/2012 | Cowan et al. |
| 2012/0079427 A1 | 3/2012 | Carmichael et al. |
| 2012/0086857 A1 | 4/2012 | Kim et al. |
| 2012/0090004 A1 | 4/2012 | Jeong |
| 2012/0096264 A1 | 4/2012 | Traversat et al. |
| 2012/0099024 A1 | 4/2012 | Ryu et al. |
| 2012/0110623 A1 | 5/2012 | Hill et al. |
| 2012/0120316 A1 | 5/2012 | Lee |
| 2012/0133840 A1 | 5/2012 | Shirasuka et al. |
| 2012/0143972 A1 | 6/2012 | Malik et al. |
| 2012/0144416 A1 | 6/2012 | Wetzer et al. |
| 2012/0144422 A1 | 6/2012 | Han et al. |
| 2012/0144423 A1 | 6/2012 | Kim et al. |
| 2012/0147049 A1 | 6/2012 | Lee |
| 2012/0147270 A1 | 6/2012 | Kim et al. |
| 2012/0147825 A1 | 6/2012 | Hassan et al. |
| 2012/0151006 A1 | 6/2012 | McInerney et al. |
| 2012/0154449 A1 | 6/2012 | Ramagem et al. |
| 2012/0167154 A1 | 6/2012 | Kim et al. |
| 2012/0173979 A1 | 7/2012 | Lee |
| 2012/0174039 A1* | 7/2012 | Rhoads et al. ............ 715/854 |
| 2012/0174157 A1 | 7/2012 | Stinson, III et al. |
| 2012/0176546 A1 | 7/2012 | Yoon |
| 2012/0194742 A1 | 8/2012 | Barnes et al. |
| 2012/0200574 A1 | 8/2012 | Hill et al. |
| 2012/0206652 A1 | 8/2012 | Yi |
| 2012/0210275 A1 | 8/2012 | Park et al. |
| 2012/0210355 A1 | 8/2012 | Kim et al. |
| 2012/0210367 A1 | 8/2012 | Lee et al. |
| 2012/0210370 A1 | 8/2012 | Kim et al. |
| 2012/0210375 A1 | 8/2012 | Wong et al. |
| 2012/0210386 A1 | 8/2012 | Kim et al. |
| 2012/0218203 A1 | 8/2012 | Kanki |
| 2012/0221972 A1 | 8/2012 | Dougall et al. |
| 2012/0229320 A1 | 9/2012 | Yu |
| 2012/0229473 A1 | 9/2012 | Tam |
| 2012/0257108 A1 | 10/2012 | Friedlander et al. |
| 2012/0260284 A1 | 10/2012 | Friedlander et al. |
| 2012/0272271 A1 | 10/2012 | Nishizawa et al. |
| 2012/0278725 A1 | 11/2012 | Gordon et al. |
| 2012/0284751 A1 | 11/2012 | Kim et al. |
| 2012/0284752 A1 | 11/2012 | Jung |
| 2012/0291068 A1 | 11/2012 | Khushoo et al. |
| 2012/0331505 A1 | 12/2012 | Chun et al. |
| 2013/0014006 A1 | 1/2013 | Abellera et al. |
| 2013/0034023 A1 | 2/2013 | Jung |
| 2013/0047174 A1 | 2/2013 | Lee et al. |
| 2013/0091053 A1 | 4/2013 | Park et al. |
| 2013/0097640 A1 | 4/2013 | Lemmons et al. |
| 2013/0148023 A1 | 6/2013 | Sullivan et al. |
| 2013/0152135 A1 | 6/2013 | Hong et al. |
| 2013/0160065 A1 | 6/2013 | Aso et al. |
| 2013/0191869 A1 | 7/2013 | Sugiyama et al. |
| 2013/0238777 A1 | 9/2013 | Raleigh |
| 2013/0238796 A1 | 9/2013 | Lentzitzky |
| 2013/0263021 A1 | 10/2013 | Dunn et al. |
| 2013/0263053 A1 | 10/2013 | Tritschler et al. |
| 2013/0275519 A1 | 10/2013 | Nichols |
| 2013/0282839 A1 | 10/2013 | Alcala |
| 2013/0291015 A1 | 10/2013 | Pan |
| 2013/0298164 A1 | 11/2013 | Moreau et al. |
| 2013/0318553 A1 | 11/2013 | Yegorov et al. |
| 2013/0326557 A1 | 12/2013 | Kang et al. |
| 2013/0332856 A1 | 12/2013 | Sanders et al. |
| 2014/0040344 A1 | 2/2014 | Gehring et al. |
| 2014/0040819 A1 | 2/2014 | Duffy |
| 2014/0049651 A1 | 2/2014 | Voth |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0052785 A1 | 2/2014 | Sirpal |
| 2014/0052786 A1 | 2/2014 | de Paz |
| 2014/0053176 A1 | 2/2014 | Milano et al. |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Shoykher et al. |
| 2014/0053195 A1 | 2/2014 | Sirpal et al. |
| 2014/0053196 A1 | 2/2014 | Selim |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher et al. |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053221 A1 | 2/2014 | Sirpal et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |

(56) References Cited

U.S. PATENT DOCUMENTS

| | | |
|---|---|---|
| 2014/0059578 A1 | 2/2014 | Voth et al. |
| 2014/0059589 A1 | 2/2014 | Sirpal |
| 2014/0059596 A1 | 2/2014 | Dourado |
| 2014/0059598 A1 | 2/2014 | Milano |
| 2014/0059599 A1 | 2/2014 | Sirpal et al. |
| 2014/0059600 A1 | 2/2014 | Duarado |
| 2014/0059601 A1 | 2/2014 | Sirpal |
| 2014/0059602 A1 | 2/2014 | Sirpal |
| 2014/0059603 A1 | 2/2014 | Lee et al. |
| 2014/0059606 A1 | 2/2014 | Selim et al. |
| 2014/0059609 A1 | 2/2014 | Duarado |
| 2014/0059610 A1 | 2/2014 | Sirpal et al. |
| 2014/0059612 A1 | 2/2014 | Selim |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059625 A1 | 2/2014 | Dourado et al. |
| 2014/0059626 A1 | 2/2014 | Selim |
| 2014/0059635 A1 | 2/2014 | Sirpal et al. |
| 2014/0059637 A1 | 2/2014 | Chen et al. |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068679 A1 | 3/2014 | Kaneko et al. |
| 2014/0068682 A1 | 3/2014 | Selim et al. |
| 2014/0068683 A1 | 3/2014 | Selim et al. |
| 2014/0068685 A1 | 3/2014 | Selim et al. |
| 2014/0068689 A1 | 3/2014 | Sirpal et al. |
| 2014/0075475 A1 | 3/2014 | Sirpal et al. |
| 2014/0075476 A1 | 3/2014 | de Paz et al. |
| 2014/0075477 A1 | 3/2014 | de Paz et al. |
| 2014/0075479 A1 | 3/2014 | Soto et al. |
| 2014/0075483 A1 | 3/2014 | de Paz et al. |
| 2014/0075484 A1 | 3/2014 | Selim et al. |
| 2014/0075487 A1 | 3/2014 | Selim et al. |
| 2014/0082659 A1 | 3/2014 | Fife et al. |
| 2014/0109143 A1 | 4/2014 | Craner |
| 2014/0173660 A1 | 6/2014 | Correa et al. |
| 2014/0181851 A1 | 6/2014 | Givon et al. |
| 2014/0181853 A1 | 6/2014 | Dureau et al. |
| 2014/0188970 A1 | 7/2014 | Madhok et al. |
| 2014/0259074 A1 | 9/2014 | Ansari et al. |
| 2014/0380414 A1 | 12/2014 | Saidi et al. |

FOREIGN PATENT DOCUMENTS

| | | |
|---|---|---|
| CN | 101540850 | 9/2009 |
| CN | 101567992 | 10/2009 |
| CN | 201937743 | 8/2011 |
| EP | 1031929 | 8/2000 |
| EP | 1067458 | 1/2001 |
| EP | 1770956 | 4/2007 |
| EP | 1865723 | 12/2007 |
| EP | 2328346 | 6/2011 |
| EP | 2348724 | 7/2011 |
| EP | 2439935 | 4/2012 |
| EP | 2487922 | 8/2012 |
| WO | WO 99/21308 | 4/1999 |
| WO | WO 99/35849 | 7/1999 |
| WO | WO 00/05884 | 2/2000 |
| WO | WO 01/06784 | 1/2001 |
| WO | WO 01/06788 | 1/2001 |
| WO | WO 02/080552 | 10/2002 |
| WO | WO 03/044755 | 5/2003 |
| WO | WO 2007/137611 | 12/2007 |
| WO | WO 2011/148054 | 12/2011 |
| WO | WO 2011/163481 | 12/2011 |
| WO | WO 2012/030024 | 3/2012 |
| WO | WO 2012/068438 | 5/2012 |
| WO | WO 2012/073027 | 6/2012 |
| WO | WO 2012/094247 | 7/2012 |
| WO | WO 2012/103121 | 8/2012 |
| WO | WO 2014/026636 | 2/2014 |
| WO | WO 2014/026640 | 2/2014 |
| WO | WO 2014/028067 | 2/2014 |
| WO | WO 2014/028068 | 2/2014 |
| WO | WO 2014/028069 | 2/2014 |
| WO | WO 2014/028071 | 2/2014 |
| WO | WO 2014/028074 | 2/2014 |

OTHER PUBLICATIONS

U.S. Appl. No. 13/970,420, filed Aug. 19, 2013, Selim et al.
Tvonicsuk "Tvonics: How to use the EPG search function." 1 pages retrieved from the internet on Nov. 11, 2013 from [www.youtube.com/watch?v=H8euZ0Iydo].
International Search Report and Written Opinion for International (PCT) Patent Application No. PCT/US13/36844, mailed Jun. 28, 2013 (Attorney's Ref. No. 6583-425-PCT) 8 pages.
International Search Report and Written Opinion for International (PCT) Patent Application No. PCT/US13/36843, mailed Jun. 28, 2013 (Attorney's Ref. No. 6583-425-PCT) 8 pages.
International Search Report and Written Opinion for International (PCT) Patent Application No. PCT/US13/36826, mailed Jun. 17, 2013 (Attorney's Ref. No. 6583-430-PCT) 8 pages.
International Search Report and Written Opinion for International (PCT) Patent Application No. PCT/US13/55589, mailed Dec. 19, 2013 (Attorney's Ref. No. 6583-436-PCT) 9 pages.
International Search Report and Written Opinion for International (PCT) Patent Application No. PCT/US2013/055289, mailed Dec. 2, 2013 (Attorney's Ref. No. 6583-444-PCT) 7 pages.
International Search Report and Written Opinion for International (PCT) Patent Application No. PCT/US2013/055288, mailed Dec. 2, 2013 (Attorney's Ref. No. 6583-445-PCT) 9 pages.
International Search Report and Written Opinion for International (PCT) Patent Application No. PCT/US2013/055286, mailed Dec. 2, 2013 (Attorney's Ref. No. 6583-446-PCT) 8 pages.
International Search Report and Written Opinion for International (PCT) Patent Application No. PCT/US13/55285, mailed Dec. 11, 2013 (Attorney's Ref. No. 6583-447-PCT) 8 pages.
International Search Report and Written Opinion for International (PCT) Patent Application No. PCT/US2013/055284, mailed Jan. 14, 2014 (Attorney's Ref. No. 6583-448-PCT) 12 pages.
International Search Report and Written Opinion for International (PCT) Patent Application No. PCT/US2013/055293, mailed Dec. 2, 2013 (Attorney's Ref. No. 6583-449-PCT) 12 pages.
International Search Report and Written Opinion for International (PCT) Patent Application No. PCT/US2013/055294, mailed Dec. 2, 2013 (Attorney's Ref. No. 6583-450-PCT) 10 pages.
International Search Report and Written Opinion for International (PCT) Patent Application No. PCT/US2013/055296, mailed Nov. 29, 2013 (Attorney's Ref. No. 6583-451-PCT) 9 pages.
International Search Report and Written Opinion for International (PCT) Patent Application No. PCT/US13/55493, mailed Nov. 7, 2013 (Attorney's Ref. No. 6583-452-PCT) 9 pages.
International Search Report and Written Opinion for International (PCT) Patent Application No. PCT/US2013/036828, mailed Jun. 28, 2013 (Attorney's Ref. No. 6583-453-PCT) 12 pages.
International Search Report and Written Opinion for International (PCT) Patent Application No. PCT/US2013/055340, mailed Feb. 10, 2014 (Attorney's Ref. No. 6583-454-PCT) 10 pages.
International Search Report and Written Opinion for International (PCT) Patent Application No. PCT/US13/55551, mailed Dec. 6, 2013 (Attorney's Ref. No. 6583-463-PCT) 7 pages.
International Search Report and Written Opinion for International (PCT) Patent Application No. PCT/US2013/036819, mailed Jun. 17, 2013 (Attorney's Ref. No. 6583-469-PCT) 9 pages.
International Search Report and Written Opinion for International (PCT) Patent Application No. PCT/US2013/036782, mailed Jun. 28, 2013 (Attorney's Ref. No. 6583-470-PCT) 9 pages.
International Search Report and Written Opinion for International (PCT) Patent Application No. PCT/US13/36678, mailed Aug. 30, 2013 (Attorney's Ref. No. 6583-471-PCT) 9 pages.
International Search Report and Written Opinion for International (PCT) Patent Application No. PCT/US2013/036804, mailed Jul. 1, 2013 (Attorney's Ref. No. 6583-478-PCT) 13 pages.

(56) References Cited

OTHER PUBLICATIONS

International Search Report and Written Opinion for International (PCT) Patent Application No. PCT/US13/55405, mailed Jan. 17, 2014 (Attorney's Ref. No. 6583-478-PCT) 8 pages.
International Search Report and Written Opinion for International (PCT) Patent Application No. PCT/US2013/055278, mailed Mar. 11, 2014 (Attorney's Ref. No. 6583-479) 9 pages.
International Search Report and Written Opinion for International (PCT) Patent Application No. PCT/US13/55509, mailed Nov. 8, 2013 (Attorney's Ref. No. 6583-481-PCT) 9 pages.
International Search Report and Written Opinion for Intenational (PCT) Patent Application No. PCT/CN2013/081639, mailed Nov. 28, 2013 (Attorney's Ref. No. 6583-487-PCT) 10 pages.
International Search Report and Written Opinion for International (PCT) Patent Application No. PCT/US2013/055303, mailed Dec. 5, 2013 (Attorney's Ref. No. 6583-488-PCT) 8 pages.
International Search Report and Written Opinion for International (PCT) Patent Application No. PCT/US2013/055280, mailed Jan. 10, 2014 (Attorney's Ref. No. 6583-489-PCT) 10 pages.
International Search Report and Written Opinion for International (PCT) Patent Application No. PCT/US13/55383, mailed Nov. 13, 2013 (Attorney's Ref. No. 6583-490-PCT) 9 pages.
International Search Report and Written Opinion for International (PCT) Patent Application No. PCT/US2013/055344, mailed Mar. 11, 2014 (Attorney's Ref. No. 6583-491-PCT) 8 pages.
International Search Report and Written Opinion for International (PCT) Patent Application No. PCT/US2013/055345, mailed Dec. 6, 2013 (Attorney's Ref. No. 6583-492-PCT) 7 pages.
International Search Report and Written Opinion for International (PCT) Patent Application No. PCT/US13/55371, mailed No. 8, 2013 (Attorney's Ref. No. 6583-493-PCT) 7 pages.
International Search Report and Written Opinion for International (PCT) Patent Application No. PCT/US13/55389, mailed Mar. 10, 2014 (Attorney's Ref. No. 6583-494-PCT) 10 pages.
International Search Report and Written Opinion for International (PCT) Patent Application No. PCT/US2013/055283, mailed Mar. 4, 2014 (Attorney's Ref. No. 6583-495-PCT) 7 pages.
International Search Report and Written Opinion for International (PCT) Patent Application No. PCT/US13/55564, mailed Nov. 22, 2013 (Attorney's Ref. No. 6583-496-PCT) 7 pages.
International Search Report and Written Opinion for International (PCT) Patent Application No. PCT/US13/55379, mailed Dec. 6, 2013 (Attorney's Ref. No. 6583-497-PCT) 8 pages.
International Search Report and Written Opinion for International (PCT) Patent Application No. PCT/US2013/055349, mailed Nov. 29, 2013 (Attorney's Ref. No. 6583-498-PCT) 7 pages.
International Search Report and Written Opinion for International (PCT) Patent Application No. PCT/US2013/055312, mailed Dec. 5, 2013 (Attorney's Ref. No. 6583-499-PCT) 8 pages.
International Search Report and Written Opinion for International (PCT) Patent Application No. PCT/US13/55374, mailed Nov. 12, 2013 (Attorney's Ref. No. 6583-500-PCT) 8 pages.
International Search Report and Written Opinion for International (PCT) Patent Application No. PCT/US13/55542, mailed Mar. 10, 2014 (Attorney's Ref. No. 6583-501-PCT) 9 pages.
International Search Report and Written Opinion for International (PCT) Patent Application No. PCT/US13/55315, mailed Jan. 24, 2014 (Attorney's Ref. No. 6583-478-PCT) 9 pages.
International Search Report and Written Opinion for International (PCT) Patent Application No. PCT/US2013/055317, mailed Dec. 2, 2013 (Attorney's Ref. No. 6583-503-PCT) 9 pages.
International Search Report and Written Opinion for International (PCT) Patent Application No. PCT/US2013/055318, mailed Jan. 9, 2014 (Attorney's Ref. No. 6583-504-PCT) 10 pages.
International Search Report and Written Opinion for International (PCT) Patent Application No. PCT/US2013/055319, mailed Mar. 11, 2014 (Attorney's Ref. No. 6583-505-PCT) 7 pages.
International Search Report and Written Opinion for International (PCT) Patent Application No. PCT/US2013/055321, mailed Dec. 6, 2013 (Attorney's Ref. No. 6583-506-PCT) 9 pages.
International Search Report and Written Opinion for International (PCT) Patent Application No. PCT/CN2013/081630, mailed Nov. 21, 2013 (Attorney's Ref. No. 6583-507-PCT) 11 pages.
International Search Report and Written Opinion for International (PCT) Patent Application No. PCT/US2013/055298, mailed Nov. 29, 2013 (Attorney's Ref. No. 6583-509-PCT) 8 pages.
International Search Report and Written Opinion for International (PCT) Patent Application No. PCT/US13/55567, mailed Dec. 20, 2013 (Attorney's Ref. No. 6583-519-PCT) 10 pages.
International Search Report and Written Opinion for International (PCT) Patent Application No. PCT/US13/55570, mailed Nov. 22, 2013 (Attorney's Ref. No. 6583-520-PCT) 8 pages.
Official Action for U.S. Appl. No. 13/864,206, mailed Nov. 27, 2013 (Attorney's Ref. No. 6583-425) 17 pages.
Official Action for U.S. Appl. No. 13/864,214, mailed Mar. 12, 2014 (Attorney's Ref. No. 6583-469) 12 pages.
International Search Report and Written Opinion for International (PCT) Patent Application No. PCT/US13/55494, mailed Apr. 16, 2014 (Attorney's Ref. No. 6583-426-PCT) 9 pages.
International Search Report and Written Opinion for International (PCT) Patent Application No. PCT/US2013/055342, mailed Apr. 17, 2014 (Attorney's Ref. No. 6583-434-PCT) 12 pages.
International Search Report and Written Opinion for International (PCT) Patent Application No. PCT/US13/55592, mailed Mar. 10, 2014 (Attorney's Ref. No. 6583-464-PCT) 11 pages.
Notice of Allowance for U.S. Appl. No. 13/864,206, mailed Apr. 16, 2014 (Attorney's Ref. No. 6583-425) 7 pages.
Official Action for U.S. Appl. No. 13/970,409, mailed Jul. 21, 2014 (Attorney's Ref. No. 6583-438) 21 pages.
Official Action for U.S. Appl. No. 13/970,442, mailed Jun. 4, 2014 (Attorney's Ref. No. 6583-441) 10 pages.
Official Action for U.S. Appl. No. 13/970,450 mailed Jul. 9, 2014 (Attorney's Ref. No. 6583-442) 17 pages.
Official Action for U.S. Appl. No. 13/970,453, mailed Jul. 21, 2014 (Attorney's Ref. No. 6583-443) 12 pages.
Official Action for U.S. Appl. No. 13/968,858 mailed May 15, 2014 (Attorney's Ref. No. 6583-444) 6 pages.
Official Action for U.S. Appl. No. 13/968,884, mailed Jun. 25, 2014 (Attorney's Ref. No. 6583-445) 23 pages.
Official Action for U.S. Appl. No. 13/968,876 mailed Jun. 16, 2014 (Attorney's Ref. No. 6583-446) 10 pages.
Official Action for U.S. Appl. No. 13/968,983, mailed Ju. 7, 2014 (Attorney's Ref. No. 6584-449) 15 pages.
Official Action for U.S. Appl. No. 13/968,948 mailed May 6, 2014 (Attorney's Ref. No. 6583-450) 11 pages.
Official Action for U.S. Appl. No. 13/864,120 mailed Jun. 13, 2014 (Attorney's Ref. No. 6583-453) 10 pages.
Official Action for U.S. Appl. No. 13/969,505, mailed Jul. 15, 2014 (Attorney's Ref. No. 6583-454) 7 pages.
Official Action for U.S. Appl. No. 13/969,490 mailed May 23, 2014 (Attorney's Ref. No. 6583-456) 18 pages.
Official Action for U.S. Appl. No. 13/969,492 mailed May 23, 2014 (Attorney's Ref. No. 6583-458) 17 pages.
Official Action for U.S. Appl. No. 13/970,000, mailed Jul. 15, 2014 (Attorney's Ref. No. 6583-463) 12 pages.
Official Action for U.S. Appl. No. 13/970,355, mailed Jul. 7, 2014 (Attorney's Ref. No. 6583-464) 7 pages.
Official Action for U.S. Appl. No. 13/970,374, mailed Jun. 6, 2014 (Attorney's Ref. No. 6583-481) 7 pages.
Official Action for U.S. Appl. No. 13/968,903, mailed Jul. 18, 2014 (Attorney's Ref. No. 6583-495) 14 pages.
Official Action for U.S. Appl. No. 13/968,969, mailed May 6, 2014 (Attorney's Ref. No. 6583-498) 12 pages.
Official Action for U.S. Appl. No. 13/968,610, mailed Apr. 30, 2014 (Attorney's Ref. No. 6583-499) 11 pages.
Official Action for U.S. Appl. No. 13/968,732, mailed May 27, 2014 (Attorney's Ref. No. 6583-500) 12 pages.
Official Action for U.S. Appl. No. 13/969,777, mailed Jun. 25, 2014 (Attorney's Ref. No. 6583-501) 9 pages.
Official Action for U.S. Appl. No. 13/969,510, mailed Jun. 25, 2014 (Attorney's Ref. No. 6583-511) 13 pages.
Official Action for U.S. Appl. No. 13/970,247, mailed Jul. 9, 2014 (Attorney's Ref. No. 6583-520) 19 pages.

(56) References Cited

OTHER PUBLICATIONS

Official Action for U.S. Appl. No. 13/969,504, mailed Jul. 15, 2014 (Attorney's Ref. No. 6583-526) 9 pages.
Official Action for U.S. Appl. No. 13/969,846, mailed Aug. 15, 2014 (Attorney's Ref. No. 6583-426) 19 pages.
Official Action for U.S. Appl. No. 13/969,869, mailed Sep. 16, 2014 (Attorney's Ref. No. 6583-428) 20 pages.
Official Action for U.S. Appl. No. 13/969,880, mailed Sep. 11, 2014 (Attorney's Ref. No. 6583-431) 10 pages.
Official Action for U.S. Appl. No. 13/969,884, mailed Oct. 23, 2014 (Attorney's Ref. No. 6583-432) 20 pages.
Official Action for U.S. Appl. No. 13/969,887, mailed Oct. 23, 2014 (Attorney's Ref. No. 6583-433) 16 pages.
Official Action for U.S. Appl. No. 13/969,482, mailed Oct. 21, 2014 (Attorney's Ref. No. 6583-434) 22 pages.
Official Action for U.S. Appl. No. 13/969,485, mailed Oct. 2, 2014 (Attorney's Ref. No. 6583-435) 21 pages.
Official Action for U.S. Appl. No. 13/970,388, mailed Sep. 4, 2014 (Attorney's Ref. No. 6583-436) 14 pages.
Official Action for U.S. Appl. No. 13/970,398, mailed Sep. 2, 2014 (Attorney's Ref. No. 6583-437) 14 pages.
Official Action for U.S. Appl. No. 13/970,420, mailed Oct. 9, 2014 (Attorney's Ref. No. 6583-439) 15 pages.
Official Action for U.S. Appl. No. 13/970,427, mailed Sep. 30, 2014 (Attorney's Ref. No. 6583-440) 24 pages.
Official Action for U.S. Appl. No. 13/970,442, mailed Oct. 7, 2014 (Attorney's Ref. No. 6583-441) 10 pages.
Official Action for U.S. Appl. No. 13/969,588, mailed Nov. 10, 2014 (Attorney's Ref. No. 6583-452) 11 pages.
Official Action for U.S. Appl. No. 13/969,487, mailed Sep. 11, 2014 (Attorney's Ref. No. 6583-455) 10 pages.
Official Action for U.S. Appl. No. 13/969,491, mailed Oct. 8, 2014 (Attorney's Ref. No. 6583-457) 21 pages.
Official Action for U.S. Appl. No. 13/864,214, mailed Aug. 19, 2014 (Attorney's Ref. No. 6583-469) 17 pages.
Official Action for U.S. Appl. No. 13/969,506, mailed Oct. 2, 2014 (Attorney's Ref. No. 6583-480) 9 pages.
Official Action for U.S. Appl. No. 13/968,897, mailed Aug. 15, 2014 (Attorney's Ref. No. 6583-489) 15 pages.
Official Action for U.S. Appl. No. 13/970,234, mailed Aug. 12, 2014 (Attorney's Ref. No. 6583-496) 19 pages.
Official Action for U.S. Appl. No. 13/968,969, mailed Aug. 19, 2014 (Attorney's Ref. No. 6583-498) 14 pages.
Official Action for U.S. Appl. No. 13/968,610, mailed Aug. 19, 2014 (Attorney's Ref. No. 6583-499) 13 pages.
Official Action for U.S. Appl. No. 13/968,630, mailed Jul. 31, 2014 (Attorney's Ref. No. 6583-504) 9 pages.
Official Action for U.S. Appl. No. 13/969,507, mailed Aug. 29, 2014 (Attorney's Ref. No. 6583-508) 30 pages.
Official Action for U.S. Appl. No. 13/969,508, mailed Nov. 7, 2014 (Attorney's Ref. No. 6583-510) 10 pages.
Official Action for U.S. Appl. No. 13/969,510, mailed Nov. 3, 2014 (Attorney's Ref. No. 6583-511) 16 pages.
Official Action for U.S. Appl. No. 13/970,243, mailed Aug. 22, 2014 (Attorney's Ref. No. 6583-519) 20 pages.
International Preliminary Report on Patentability for Intenational (PCT) Patent Application No. PCT/CN2013/081639, mailed Feb. 26, 2015 (Attorney's Ref. No. 6583-487-PCT) 6 pages.
Official Action for U.S. Appl. No. 13/969,846, mailed Mar. 2, 2015 (Attorney's Ref. No. 6583-426) 21 pages.
Official Action for U.S. Appl. No. 13/969,869, mailed Feb. 24, 2015 (Attorney's Ref. No. 6583-428) 22 pages.
Official Action for U.S. Appl. No. 13/970,388, mailed Jan. 22, 2015 (Attorney's Ref. No. 6583-436) 12 pages.
Notice of Allowance for U.S. Appl. No. 13/970,398, mailed Feb. 2, 2015 (Attorney's Ref. No. 6583-437) 14 pages.
Official Action for U.S. Appl. No. 13/970,409, mailed Feb. 11, 2015 (Attorney's Ref. No. 6583-438) 25 pages.
Official Action for U.S. Appl. No. 13/970,420, mailed Feb. 10, 2015 (Attorney's Ref. No. 6583-439) 13 pages.
Official Action for U.S. Appl. No. 13/970,442, mailed Feb. 26, 2015 (Attorney's Ref. No. 6583-441) 10 pages.
U.S. Appl. No. 14/407,593, filed Dec. 12, 2014, Sirpal et al.
U.S. Appl. No. 14/407,598, filed Dec. 12, 2014, Sirpal et al.
U.S. Appl. No. 14/407,601, filed Dec. 12, 2014, Sirpal et al.
U.S. Appl. No. 14/407,609, filed Dec. 12, 2014, Sirpal et al.
U.S. Appl. No. 14/418,969, filed Feb. 2, 2015, Sirpal et al.
U.S. Appl. No. 14/418,972, filed Feb. 2, 2015, Sirpal et al.
U.S. Appl. No. 14/418,971, filed Feb. 2, 2015, Shoykher et al.
Official Action for U.S. Appl. No. 13/970,450, mailed Nov. 19, 2014 (Attorney's Ref. No. 6583-442) 12 pages.
Notice of Allowance for U.S. Appl. No. 13/970,453, mailed Dec. 9, 2014 (Attorney's Ref. No. 6583-443) 11 pages.
Official Action for U.S. Appl. No. 13/968,858, mailed Jan. 23, 2015 (Attorney's Ref. No. 6583-444) 9 pages.
Notice of Allowance for U.S. Appl. No. 13/968,884, mailed Jan. 5, 2015 (Attorney's Ref. No. 6583-445) 20 pages.
Official Action for U.S. Appl. No. 13/968,876, mailed Dec. 26, 2014 (Attorney's Ref. No. 6583-446) 13 pages.
Official Action for U.S. Appl. No. 13/968,867, mailed Jan. 27, 2015 (Attorney's Ref. No. 6583-447) 17 pages.
Official Action for U.S. Appl. No. 13/968,983, mailed Nov. 26, 2014 (Attorney's Ref. No. 6583-449) 17 pages.
Official Action for U.S. Appl. No. 13/968,948, mailed Nov. 24, 2014 (Attorney's Ref. No. 6583-450) 13 pages.
Official Action for U.S. Appl. No. 13/864,120, mailed Dec. 24, 2014 (Attorney's Ref. No. 6583-453) 13 pages.
Official Action for U.S. Appl. No. 13/969,505, mailed Feb. 24, 2015 (Attorney's Ref. No. 6583-454) 9 pages.
Official Action for U.S. Appl. No. 13/969,490, mailed Nov. 19, 2014 (Attorney's Ref. No. 6583-456) 22 pages.
Official Action for U.S. Appl. No. 13/969,492, mailed Dec. 5, 2014 (Attorney's Ref. No. 6583-458) 14 pages.
Official Action for U.S. Appl. No. 13/969,493, mailed Mar. 2, 2015 (Attorney's Ref. No. 6583-459) 15 pages.
Official Action for U.S. Appl. No. 13/9700,000, mailed Nov. 14, 2014 (Attorney's Ref. No. 6583-463) 14 pages.
Official Action for U.S. Appl. No. 13/970,355, mailed Dec. 19, 2014 (Attorney's Ref. No. 6583-464) 9 pages.
Official Action for U.S. Appl. No. 13/864,214, mailed Jan. 29, 2015 (Attorney's Ref. No. 6583-469) 17 pages.
Official Action for U.S. Appl. No. 13/969,179, mailed Nov. 28, 2014 (Attorney's Ref. No. 6583-478) 15 pages.
Official Action for U.S. Appl. No. 13/969,179, mailed Mar. 12, 2015 (Attorney's Ref. No. 6583-478) 17 pages.
Official Action for U.S. Appl. No. 13/968,767, mailed Jan. 22, 2015 (Attorney's Ref. No. 6583-479) 15 pages.
Official Action for U.S. Appl. No. 13/969,506, mailed Jan. 23, 2015 (Attorney's Ref. No. 6583-480) 9 pages.
Official Action for U.S. Appl. No. 13/970,374, mailed Dec. 9, 2014 (Attorney's Ref. No. 6583-481) 9 pages.
Official Action for U.S. Appl. No. 13/968,897, mailed Jan. 28, 2015 (Attorney's Ref. No. 6583-489) 18 pages.
Official Action for U.S. Appl. No. 13/968,652, mailed Dec. 5, 2014 (Attorney's Ref. No. 6583-491) 25 pages.
Official Action for U.S. Appl. No. 13/968,709, mailed Nov. 14, 2014 (Attorney's Ref. No. 6583-493) 17 pages.
Official Action for U.S. Appl. No. 13/968,709, mailed Feb. 23, 2015 (Attorney's Ref. No. 6583-493) 13 pages.
Official Action for U.S. Appl. No. 13/968,903, mailed Jan. 5, 2015 (Attorney's Ref. No. 6583-495) 13 pages.
Official Action for U.S. Appl. No. 13/970,234, mailed Dec. 26, 2014 (Attorney's Ref. No. 6583-496) 13 pages.
Notice of Allowance for U.S. Appl. No. 13/968,969, mailed Jan. 6, 2015 (Attorney's Ref. No. 6583-498) 6 pages.
Official Action for U.S. Appl. No. 13/968,610, mailed Dec. 31, 2014 (Attorney's Ref. No. 6583-499) 7 pages.
Notice of Allowance for U.S. Appl. No. 13/968,610, mailed Feb. 24, 2015 (Attorney's Ref. No. 6583-499) 5 pages.
Official Action for U.S. Appl. No. 13/968,732, mailed Dec. 26, 2014 (Attorney's Ref. No. 6583-500) 13 pages.
Official Action for U.S. Appl. No. 13/969,777, mailed Jan. 8, 2015 (Attorney's Ref. No. 6583-501) 11 pages.

(56) References Cited

OTHER PUBLICATIONS

Official Action for U.S. Appl. No. 13/968,630, mailed Nov. 19, 2014 (Attorney's Ref. No. 6583-504) 11 pages.
Official Action for U.S. Appl. No. 13/969,507, mailed Jan. 27, 2015 (Attorney's Ref. No. 6583-508) 30 pages.
Official Action for U.S. Appl. No. 13/968,937, mailed Dec. 18, 2014 (Attorney's Ref. No. 6583-509) 9 pages.
Official Action for U.S. Appl. No. 13/969,510, mailed Feb. 24, 2015 (Attorney's Ref. No. 6583-511) 17 pages.
Official Action for U.S. Appl. No. 13/970,243, mailed Jan. 22, 2015 (Attorney's Ref. No. 6583-519) 14 pages.
Official Action for U.S. Appl. No. 13/970,247, mailed Dec. 22, 2014 (Attorney's Ref. No. 6583-520) 20 pages.
Official Action for U.S. Appl. No. 13/969,504, mailed Feb. 23, 2015 (Attorney's Ref. No. 6583-526) 10 pages.

\* cited by examiner

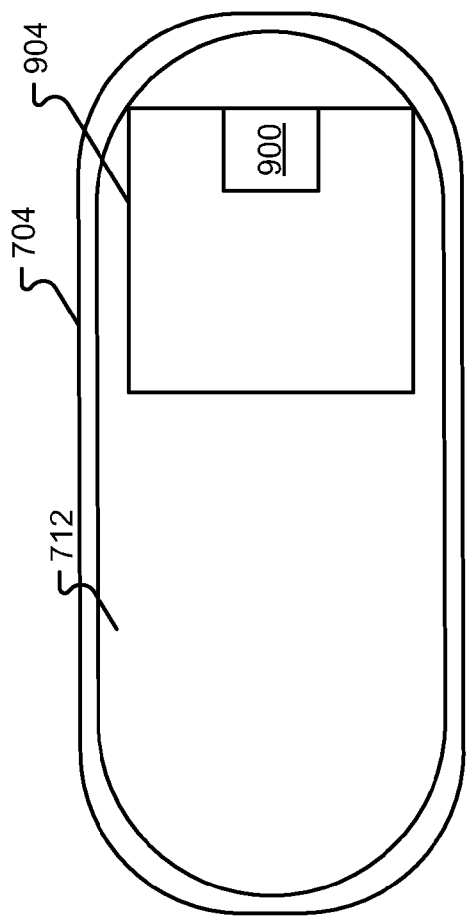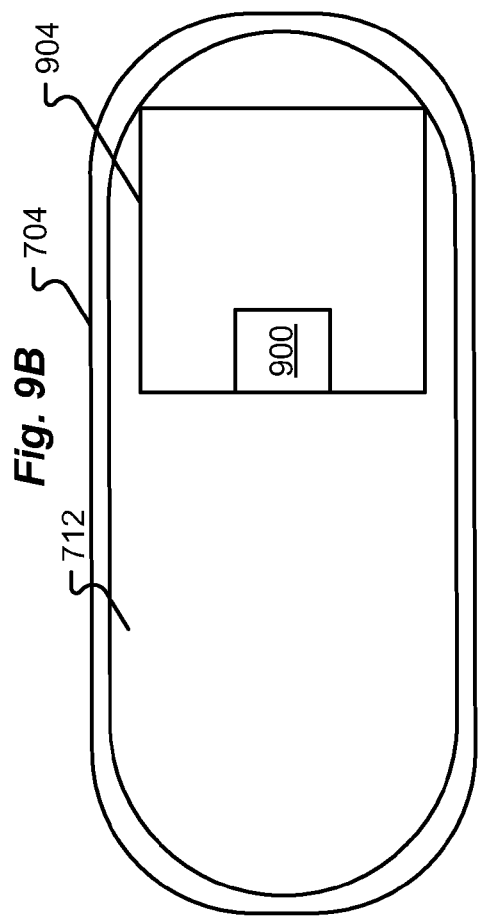

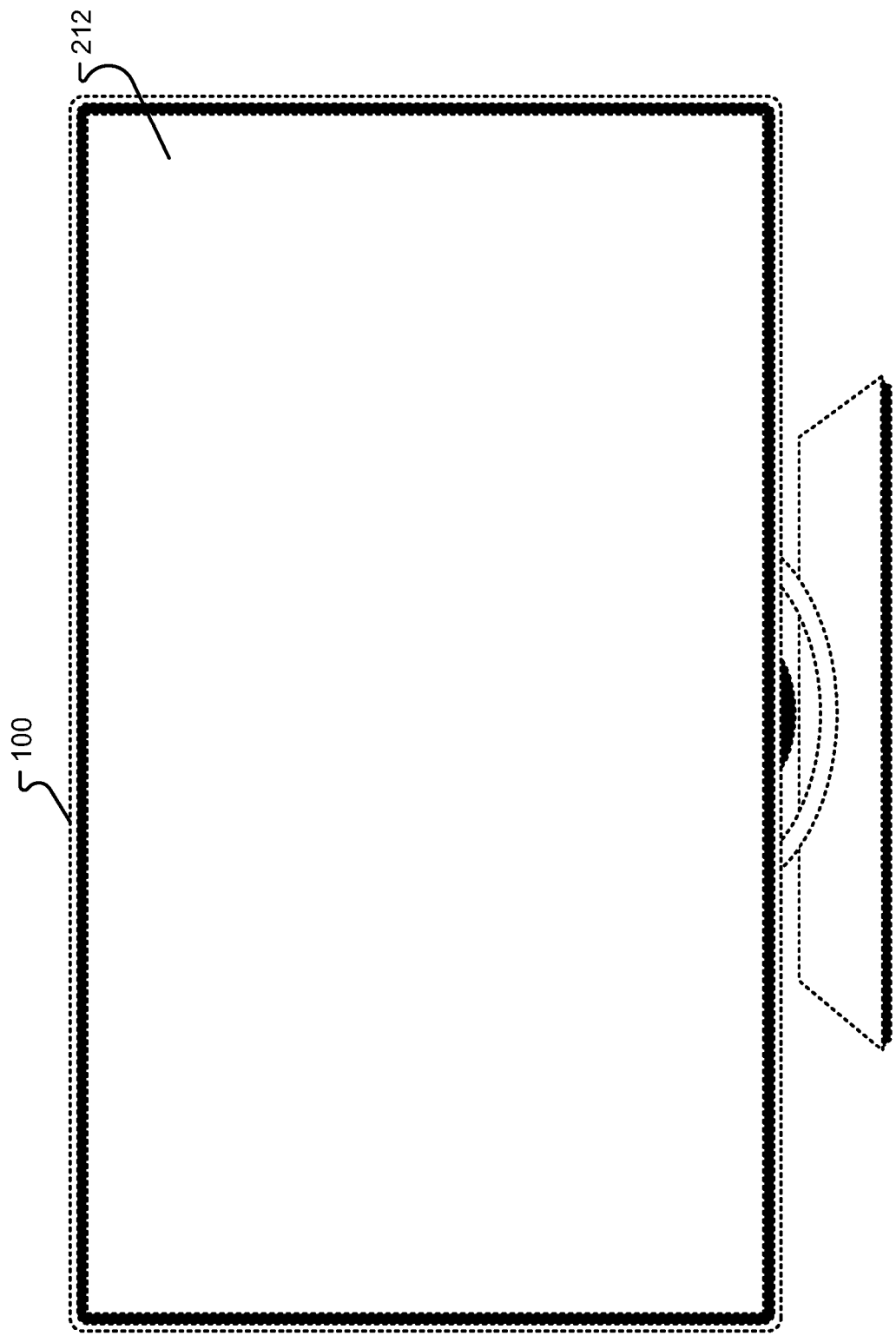

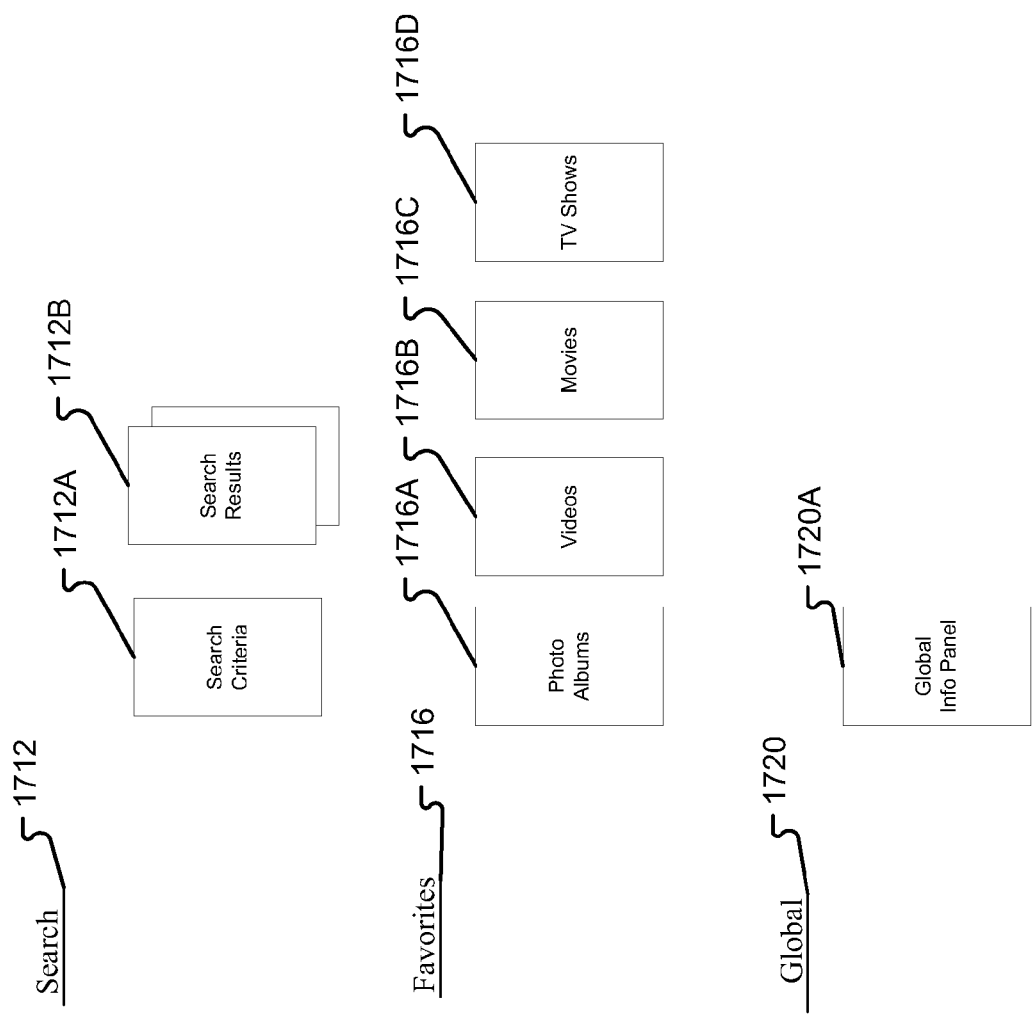

PANEL USER INTERFACE FOR AN INTELLIGENT TELEVISION

CROSS REFERENCE TO RELATED APPLICATION

The present application claims the benefits of and priority, under 35 U.S.C. §119(e), to U.S. Provisional Application Ser. Nos. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

In embodiments, a method of displaying content on a television is provided, comprising: receiving a first directional input via an input device associated with the television; determining, based on a first direction associated with the first directional input, a content panel to display via the television; retrieving, from a memory, a first content information for displaying in the content panel; identifying at least one of a content source and a second content information currently being displayed via the television; selecting a panel type based on the identified at least one of content source and second content information currently being displayed via the television; retrieving, from memory, a third content information based on the selected panel type; and displaying, via the television, the retrieved first content information and the third content information in the content panel based on the selected panel type. This method may further comprise: retrieving, from a memory, a first image that is representative of the at least one of content source and second content information; and displaying, via the television, the first image in the content panel. Further yet, this method may further include: receiving a second directional input via the input device; and determining, based on a second direction associated with the second directional input, a second content panel to display via the television. Alternatively, this method may further comprise: receiving a second directional input via the input device; determining, based on a second direction associated with the second directional input, a source of at least one content information to be displayed in the content panel based on the selected panel type; retrieving at least a portion of the at least one content information from the determined source; and displaying, via the television, the content information associated with the determined source, wherein the third content information comprises at least one of information associated with content information marked as a favorite and information associated with TV series episode content information. In one embodiment, the content panel is an application panel and the selected panel type is at least one of a search panel and a recommended panel.

In another embodiment, a non-transitory computer readable information storage medium is provided, the non-transitory computer readable information storage medium having stored thereon instructions that cause a computing system to execute a method of displaying content on a television, comprising: receiving a first directional input via an input device associated with the television; determining, based on a first direction associated with the first directional input, a content panel to display via the television; retrieving, from a memory, a first content information for displaying in the content panel; identifying at least one of a content source and a second content information currently being displayed via the television; selecting a panel type based on the identified at least one of content source and second content information currently being displayed via the television; retrieving, from memory, a third content information based on the selected panel type; and displaying, via the television, the retrieved first content information and the third content information in the content panel based on the selected panel type. These instructions may further comprise: retrieving, from a memory, a first image that is representative of the at least one of content source and second content information; and displaying, via the television, the first image in the content panel. Further yet, these instruction may comprise: receiving a second directional input via the input device; determining, based on a second direction associated with the second directional input, a source of at least one content information to be displayed in the content panel based on the search panel; retrieving at least a portion of the at least one content information from the determined source; and displaying, via the television, the content information associated with the determined source. In some embodiments, the content panel is an application panel. In various embodiments, the third content information comprises at least one of information associated with content information marked as favorite and information associated with TV series episode content information, and wherein the selected panel type is an info panel associated with the TV series episode content information.

In yet another embodiment, a system for displaying content on a television is provided, comprising: an input device associated with the television; a memory; and a microprocessor operable to: receive a first directional input via an input device associated with the television; determine, based on a first direction associated with the first directional input, a content panel to display via the television; retrieve, from a memory, a first content information for displaying in the content panel; identify at least one of a content source and a second content information currently being displayed via the television; select a panel type based on the identified at least one of content source and second content information currently being displayed via the television; retrieve, from memory, a third content information based on the selected panel type; and display, via the television, the retrieved first content information and the third content information in the content panel based on the selected panel type. Further yet, the microprocessor may further be operable to retrieve, from a memory, a first image that is representative of the at least one of content source and second content information; and display, via the television, the first image in the content panel. In some embodiments, the microprocessor may further be operable to receive a second directional input via the input device; determine, based on a second direction associated with the second directional input, a source of at least one content information to be displayed in the content panel based on the selected panel type; retrieve at least a portion of the at least one content information from the determined source; and display, via the television, the content information associated with the determined source.

In one embodiment, the content panel is an application panel and the third content information comprises information associated with content information marked as favorite.

The present disclosure can provide a number of advantages depending on the particular aspect, embodiment, and/or configuration. For example, the current disclosure provides a panel system that aides in the navigation of an intelligent television. For example, a multi-panel system is provided that satisfies the following: allows a user to watch a primary program while surfing the internet, checking social media, and checking a system error, etc. Moreover, information may be displayed in one content area that specifically depends on or contextually dependent on the primary program or active content area. The panel system allows for a same pattern of navigation—all resulting in a unified experience for a user. In another area, an application panel is provided that allows quick access to core functionality, provides an unobtrusive design which allows for the active media to always be in view, provides a consistent user experience across all applications, and provides focused contextual content.

Another advantage is easy navigation in on-demand programming and allowing for consumers' increased demand for multi-sourced content. Thus, the user interface is flexible, reliable, and consistent across different applications.

The application panel in on demand includes six views (info, new, recommended, genre, favorites, and search). The video on demand interaction framework is flexible so different content providers can populate the content into the views in video on demand by providing a back end data source. Most views in video on demand have multiple components; some components are mandatory and others are optional. Content providers can pick and choose the components that go into each view based on the structure and availability of their media content. Multiple variations within the five categories of panels allow the user a rich, elegant, and intelligent navigational experience.

The application panel provides customized information in each application. The navigation pattern and content layout remains consistent across all applications. Key benefits of the application panel includes: quick access to core functionality, unobtrusive design allowing the active video to always be in view, consistent user experience across all applications, and focused contextual content.

As consumers are demanding more access to content, the trend of viewing live and on-demand programming accelerates. The panel system provides quick access to extended functionality while still maintaining visibility into the main content view. The panel system allows the user to continue watching a primary program while surfing, checking social media, checking a system error, etc. The panel system is easy to navigate and contextually relevant, designed to provide quick access to extended functionality while still maintaining visibility into the main content view.

A favorites panel provides a list of recommendations based on favorites and allows viewers to search and find videos, movies, photos and other content on the web, on cable TV channels, on satellite TV channels, or content stored on a local hard drive. The favorites panel provides easy navigation. The favorites panel is a highlight to the context driven functionality, allowing a user to scroll through a list that he or she has marked as special or favorite. The panel system provides an elegant and easy list of favorite content. The favorites panel provides a list of user-selected favorite content items. This includes the panel navigation bar and the favorites list. The favorites panel is essentially a running list of a user's favorite content, allowing for easy re-viewing, date checking, sharing, etc. The favorites panel provides a vertical scrollable collection of items that a user has marked as Favorite. It offers a series name and a short description. The info panel for a TV series allows a user to mark a series as a favorite via an episode screen rather than having to go back to view the entire series. A recommended panel is context-based to provide relevant recommendations in a scrollable list to a user. A search panel prior to entering the traditional search panel allows a user to use previous search terms. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p—1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p—1280× 720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTE Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC, and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation, or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information, and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community," "e-community," and "virtual community" mean a group of people that primarily interact via a computer network, rather than face to face, for social, professional, educational, or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text, or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communication satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 9B is a bottom view of an embodiment of a remote control with the joystick in a lower position;

FIG. 9C is a bottom view of an embodiment of a remote control with the joystick in an upper position;

FIG. 11A is a front view of an embodiment of an Intelligent TV screen;

FIGS. 17A-17B illustrate one or more panel types in accordance with embodiments of the present disclosure;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
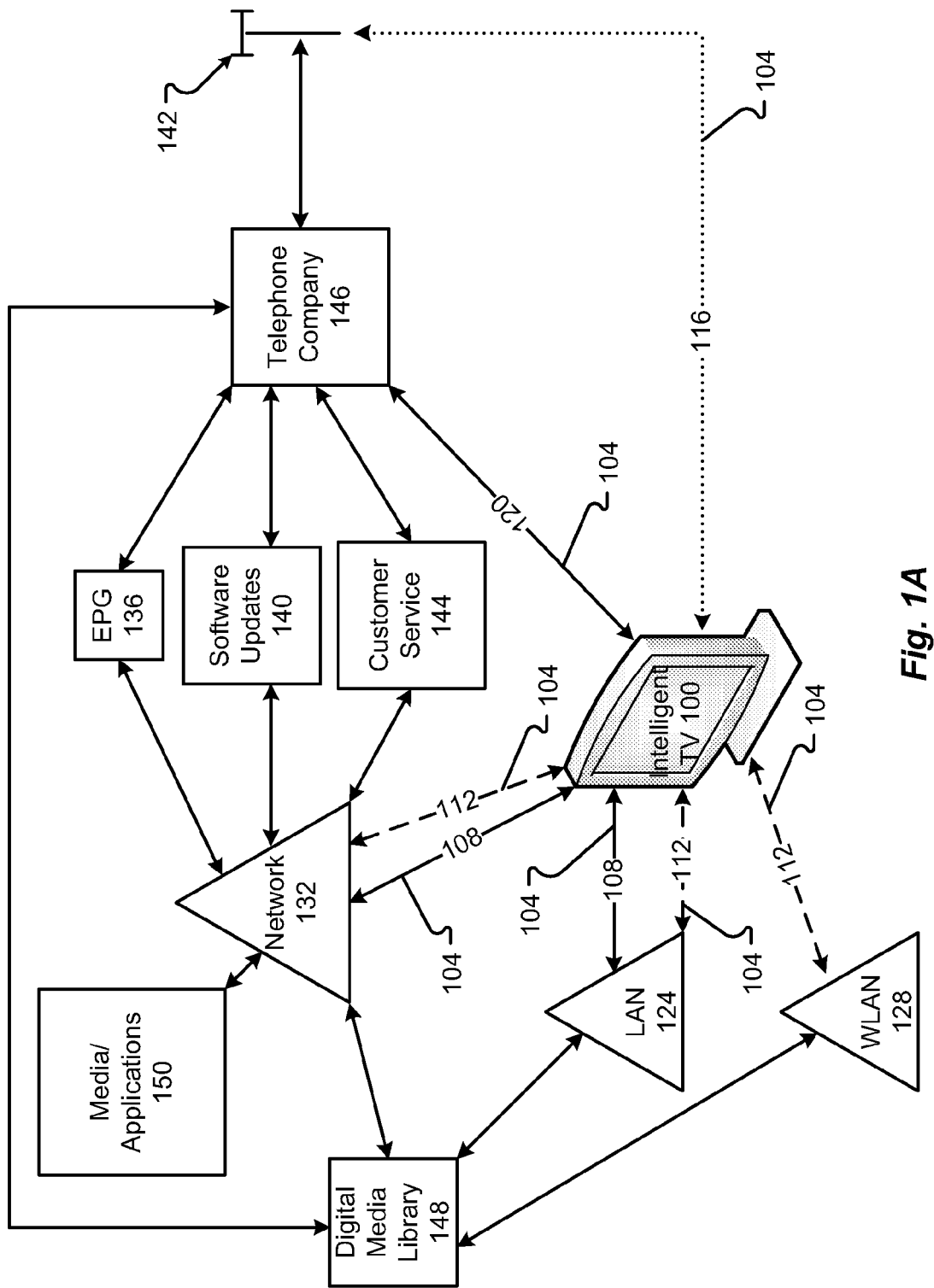
FIG. 1A includes a first view of an embodiment of an environment of an intelligent television.
Figure 1B:
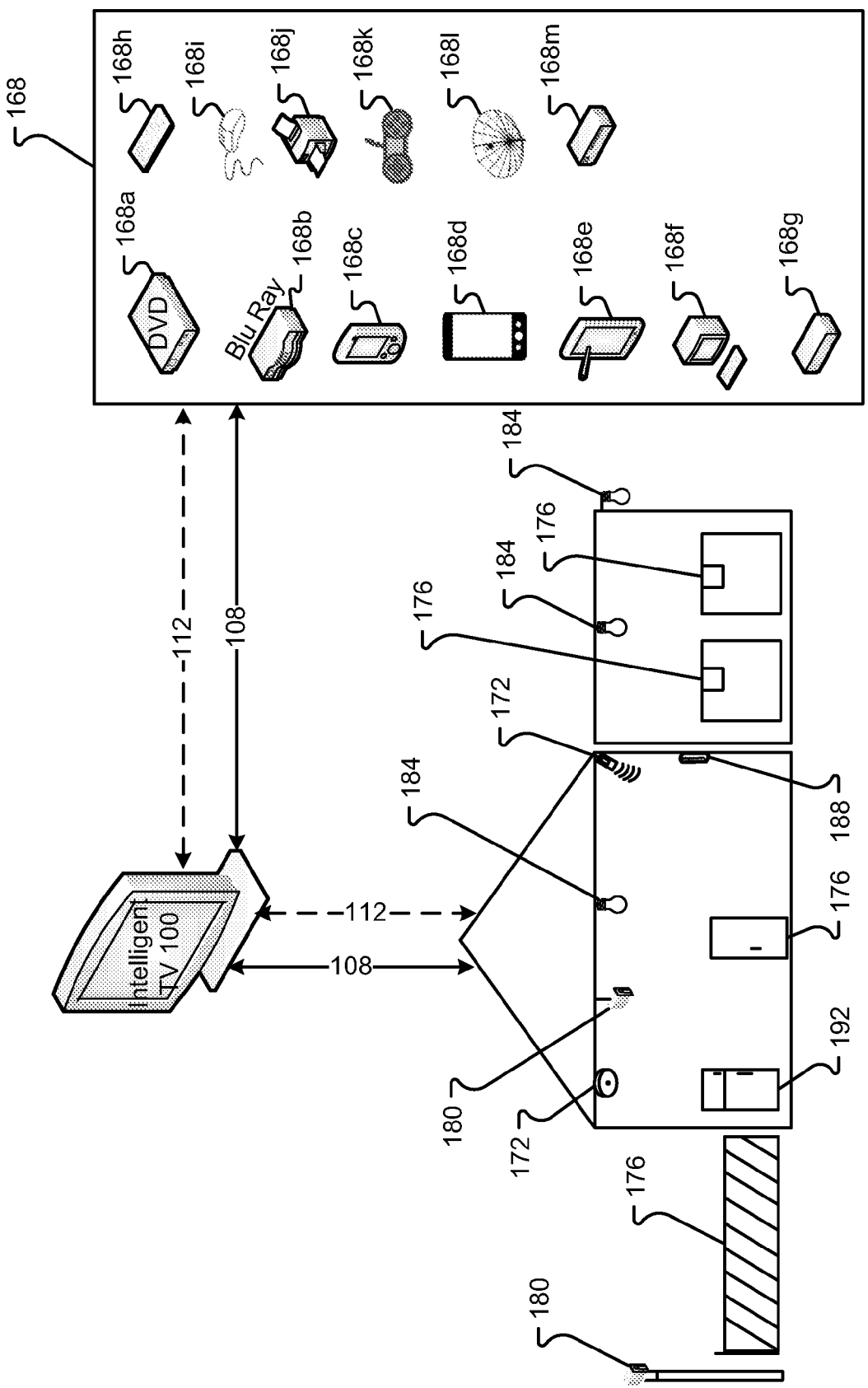
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by a telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168*a*, BluRay players 168*b*, portable digital media devices 168*c*, smart phones 168*d*, tablet devices 168*e*, personal computers 168*f*, external cable boxes 168*g*, keyboards 168*h*, pointing devices 168*i*, printers 168*j*, game controllers and/or game pads 168*k*, satellite dishes 168*l*, external display devices 168*m*, and other universal serial bus (USB), local area network (LAN), Bluetooth™, or high-definition multimedia interface (HDMI) compliant devices, and/or wireless devices. When connected to an external cable box 168*g* or satellite dish 168*l*, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
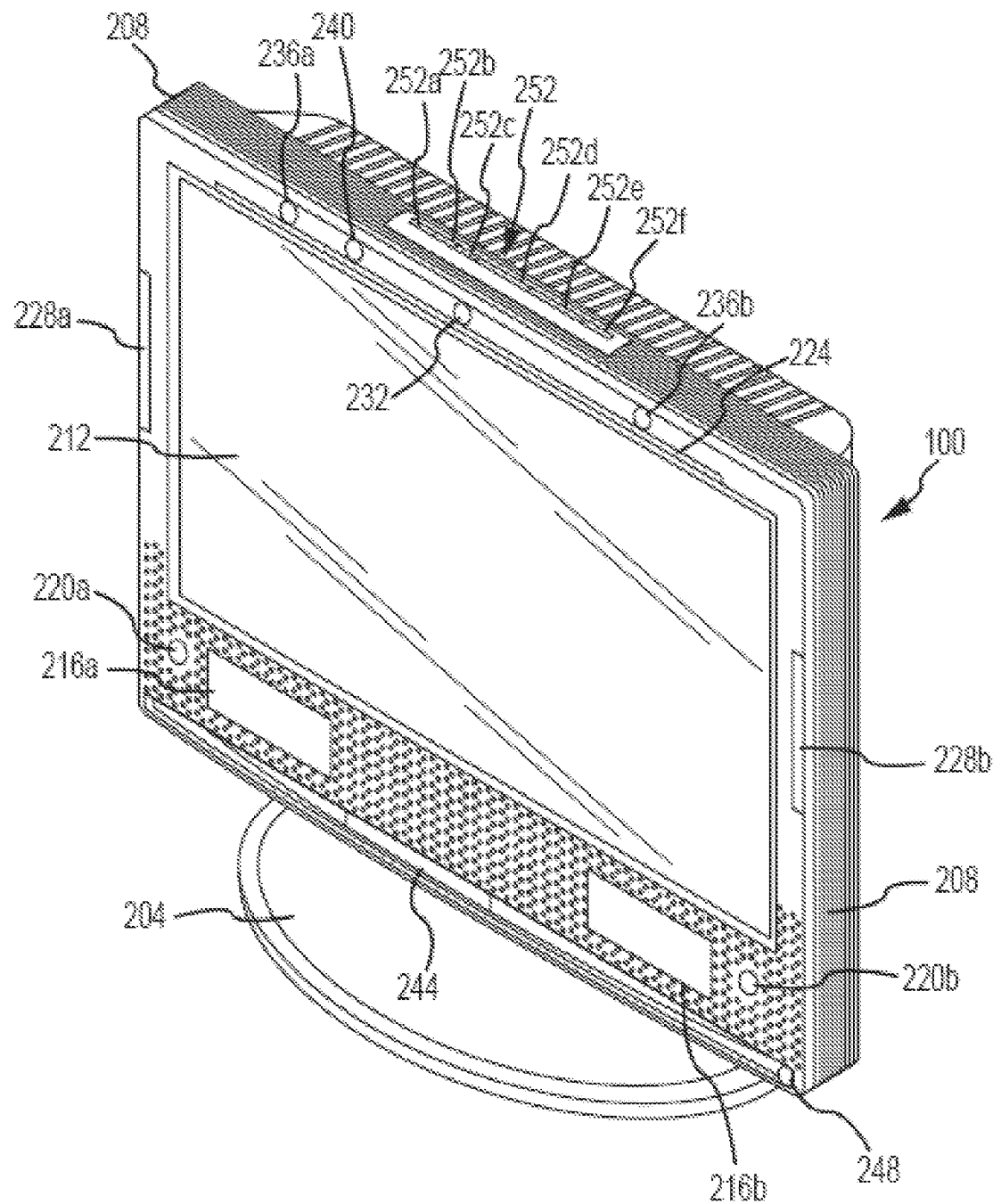
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture device 232, and range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252*a-f*, which can be configured for specific inputs. For example, the first button 252*a* may be configured as an on/off button used to control overall system power to the Intelligent TV 100. The buttons 252 may be configured, in combination or alone, to control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds.

A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
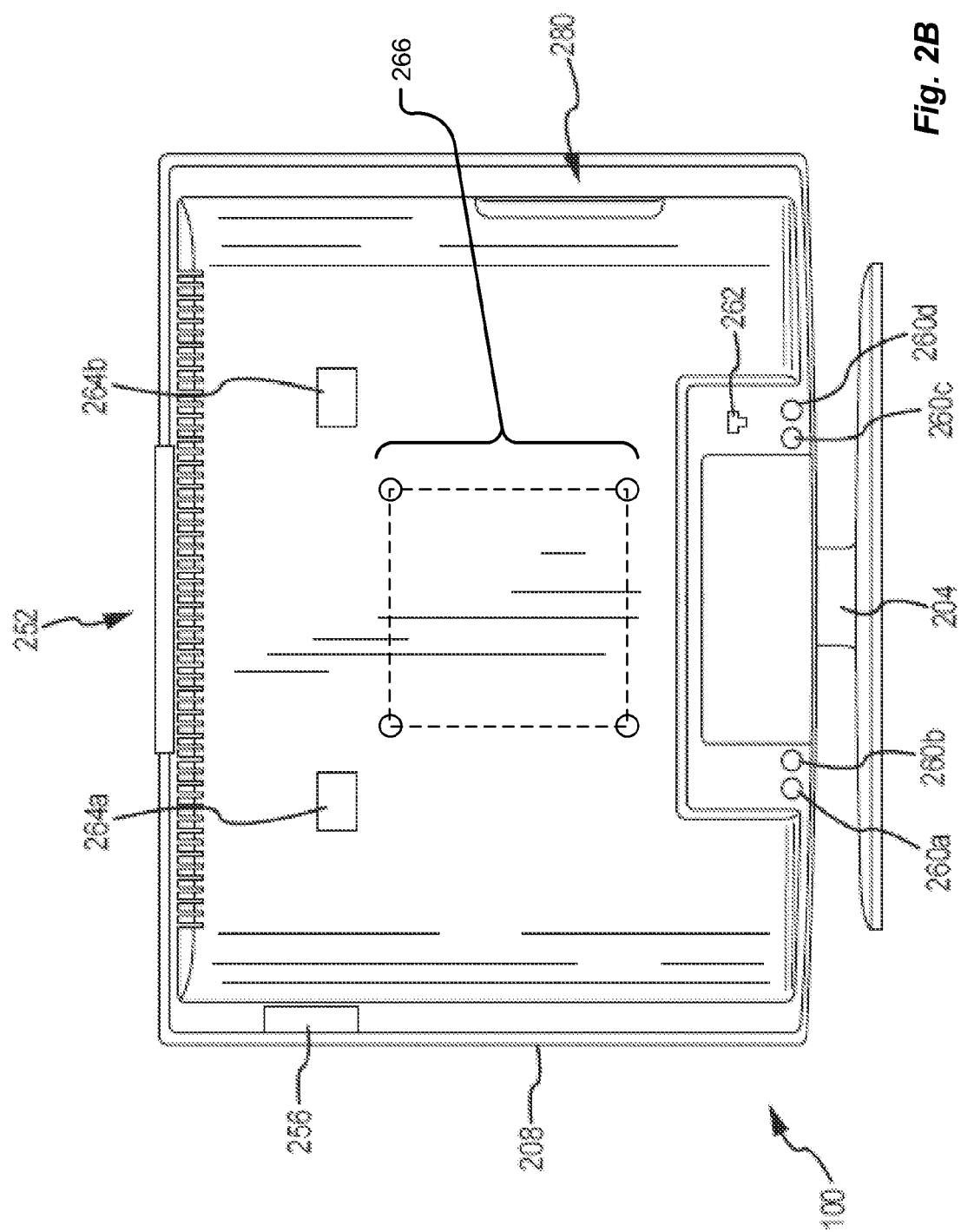
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
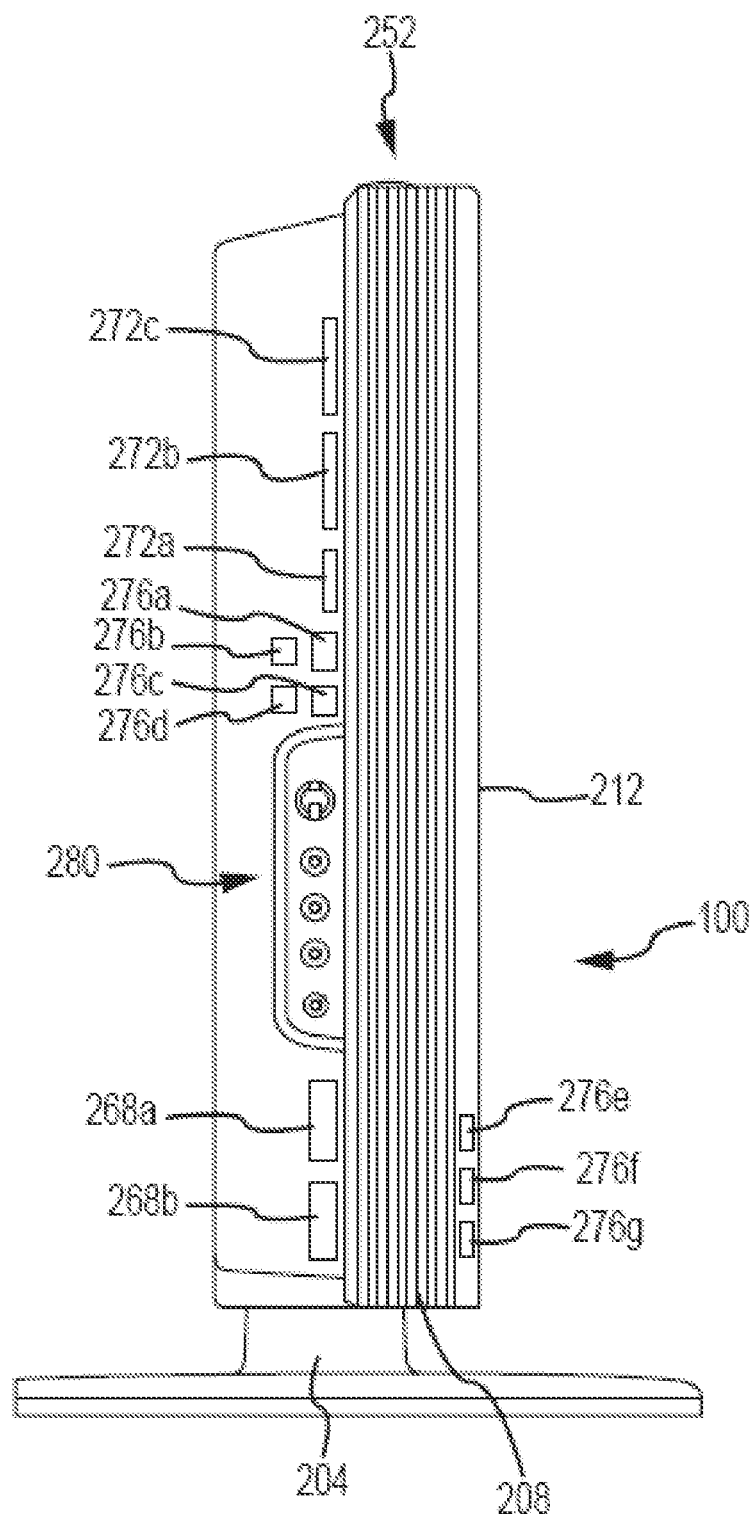
FIG. 2C includes a third view of an embodiment of an intelligent television.
Figure 2D:
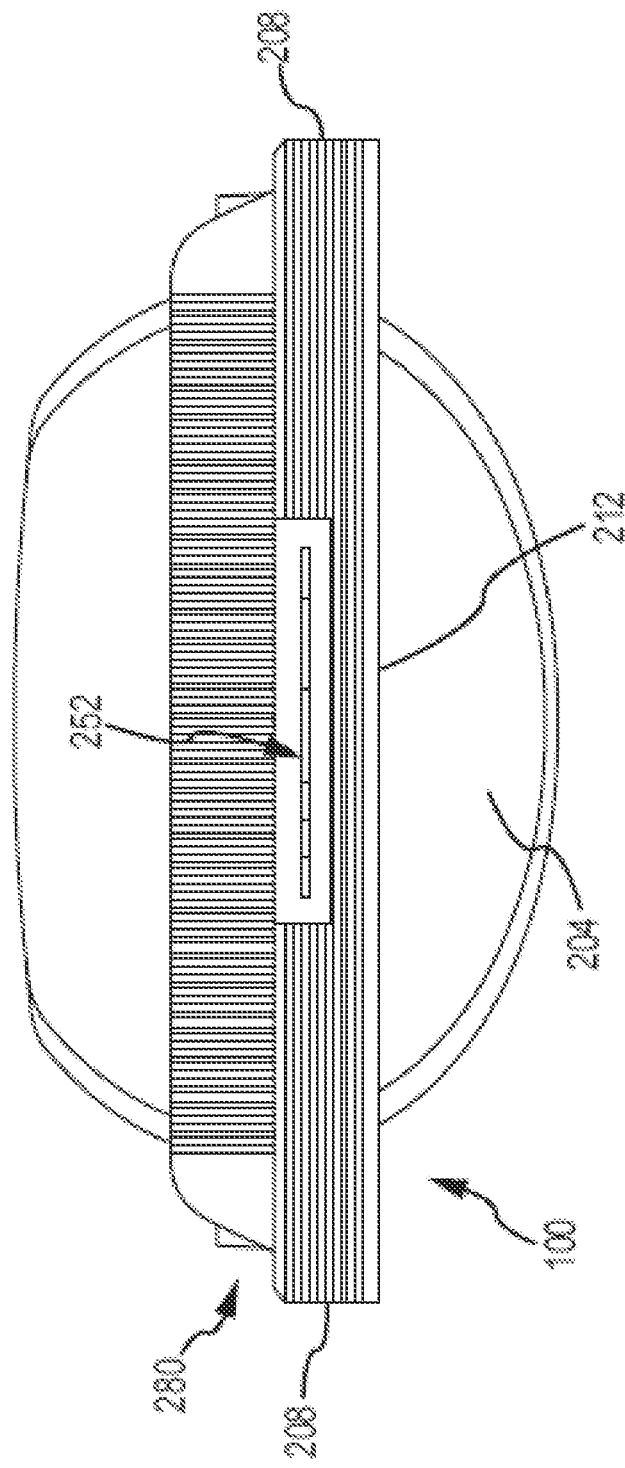
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
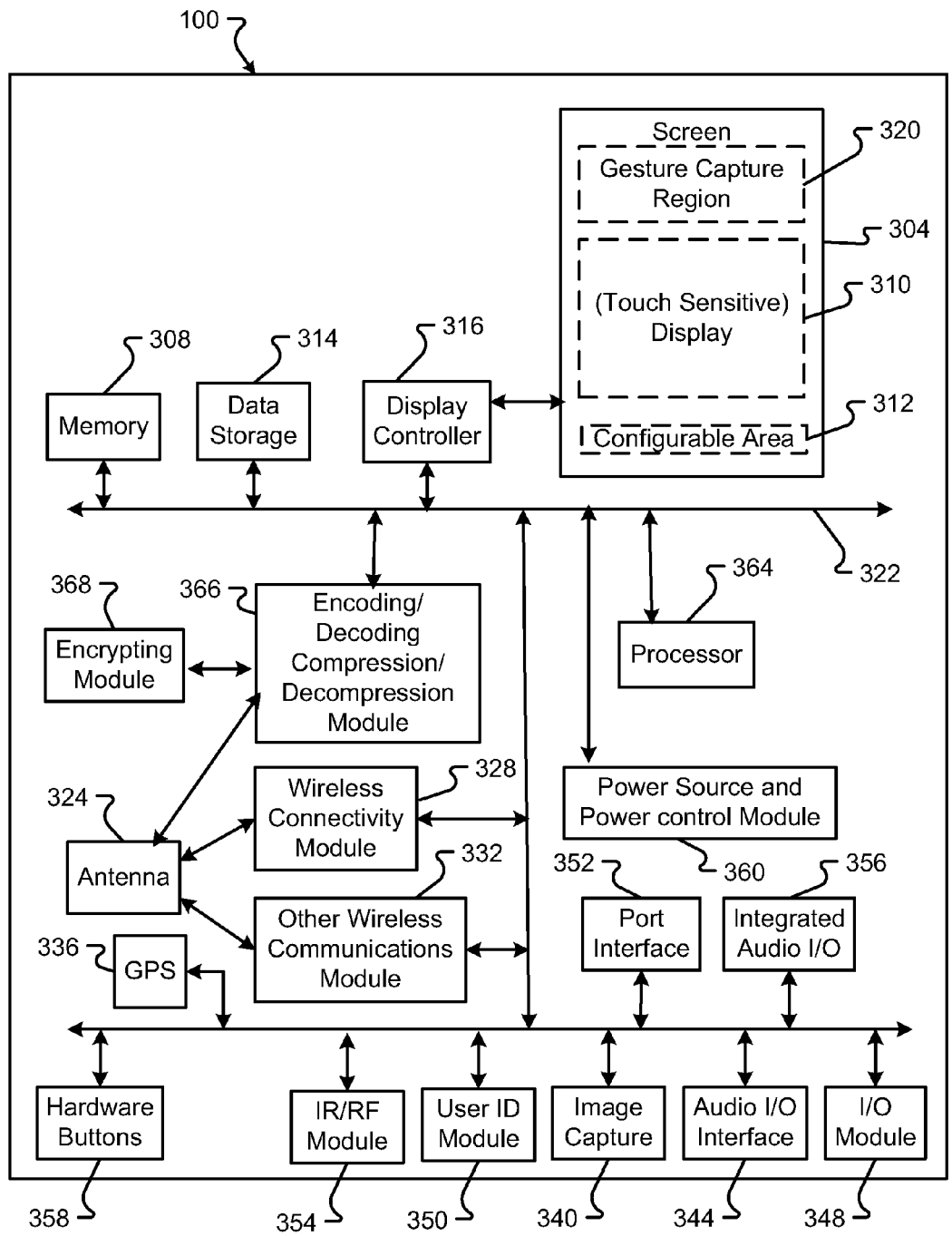
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA, and/or analog cellular telephony transceiver capable of supporting voice, multimedia, and/or data transfers over a cellular network. Alternatively or additionally, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
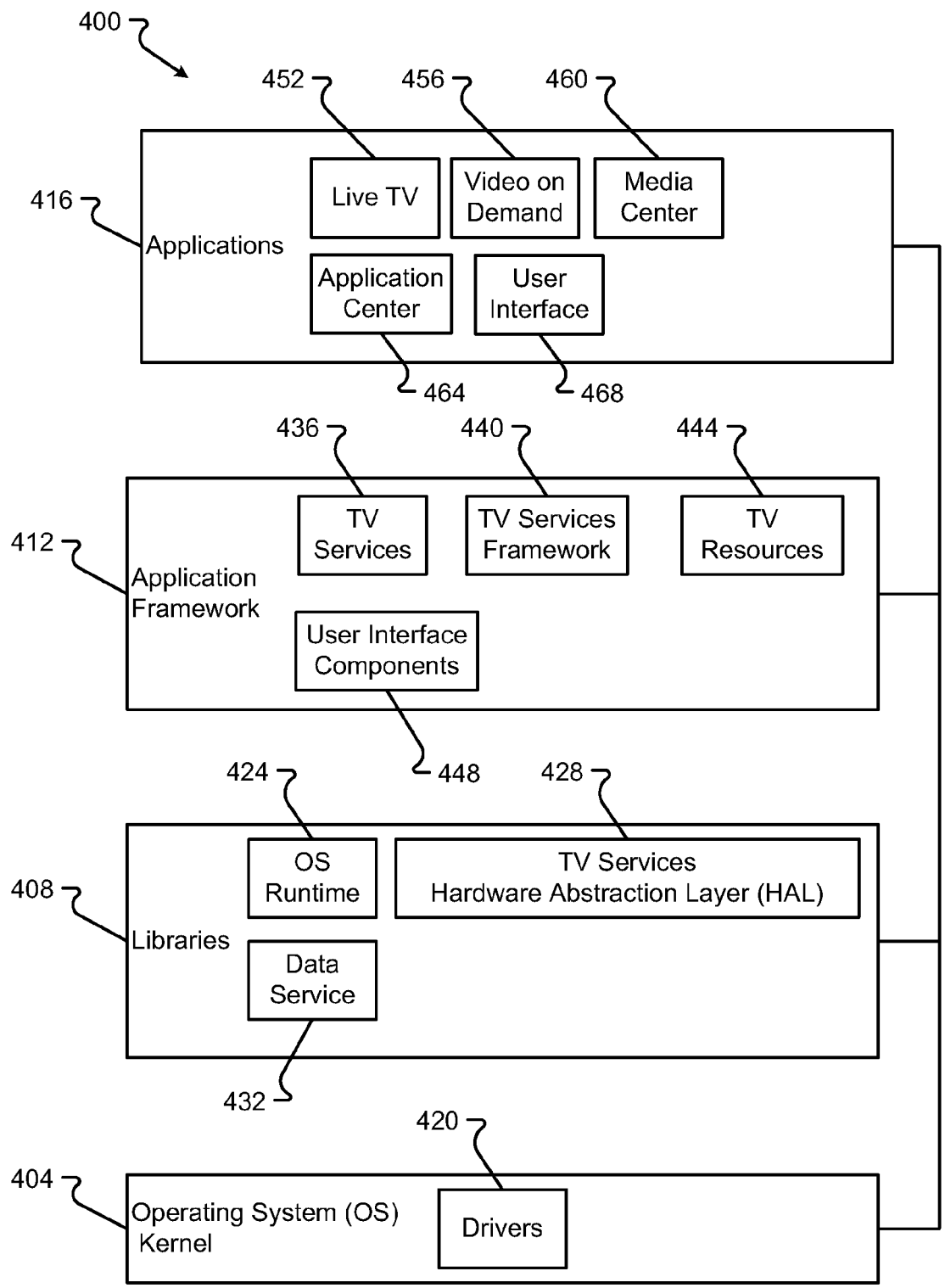
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
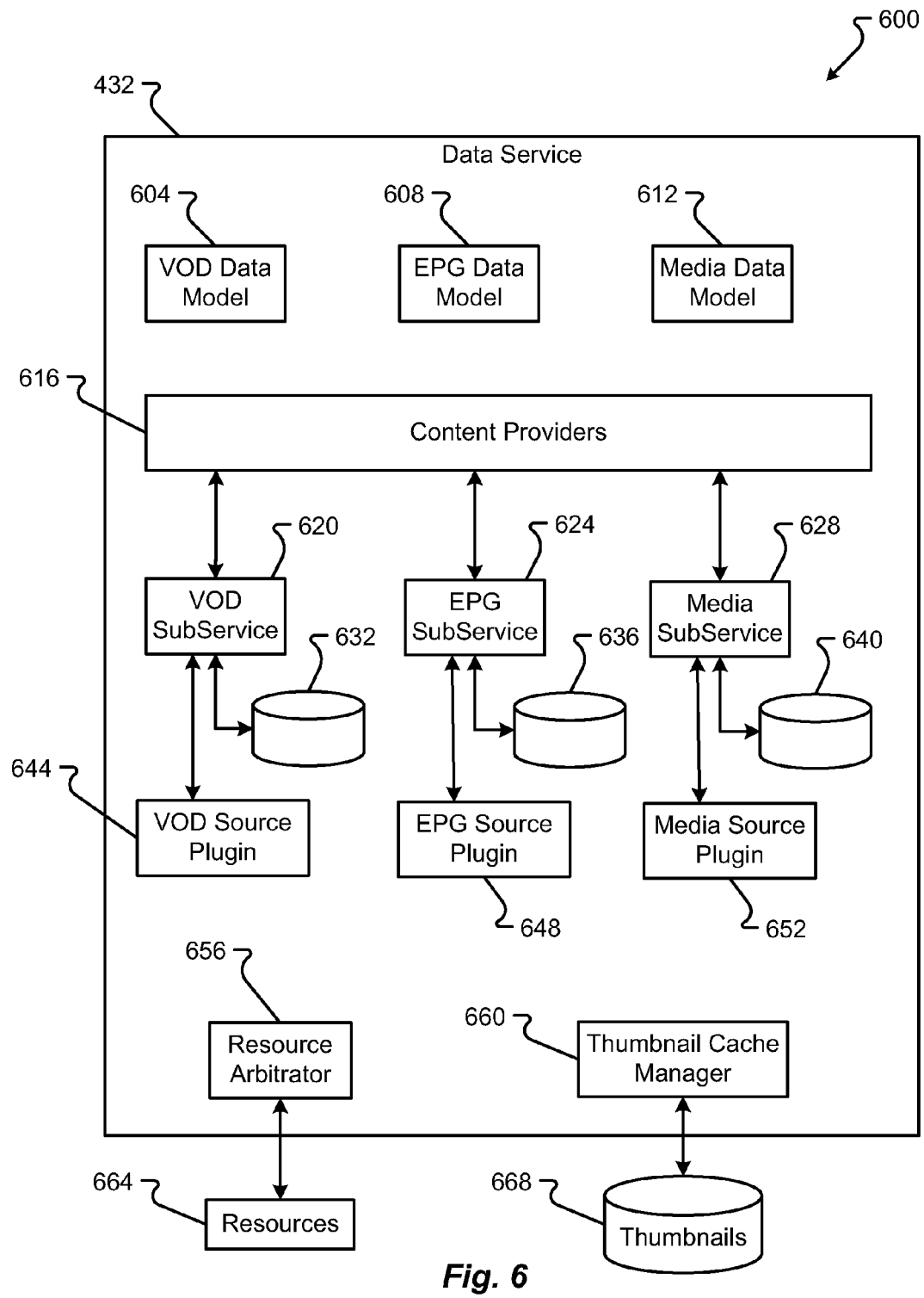
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user, Live TV or video on demand. The media center 460 allows for the access of different sources to obtain the media in the display of such media on the Intelligent TV 100.

The application center 464 allows for the provision, storage, and use of applications. An application can be a game, a productivity application, or some other application generally associated with computer systems or other devices, but may be operated within the Intelligent TV. The application center 464 may obtain these applications from different sources, store them locally, and then execute those types of applications for the user on the Intelligent TV 100.

Figure 5:
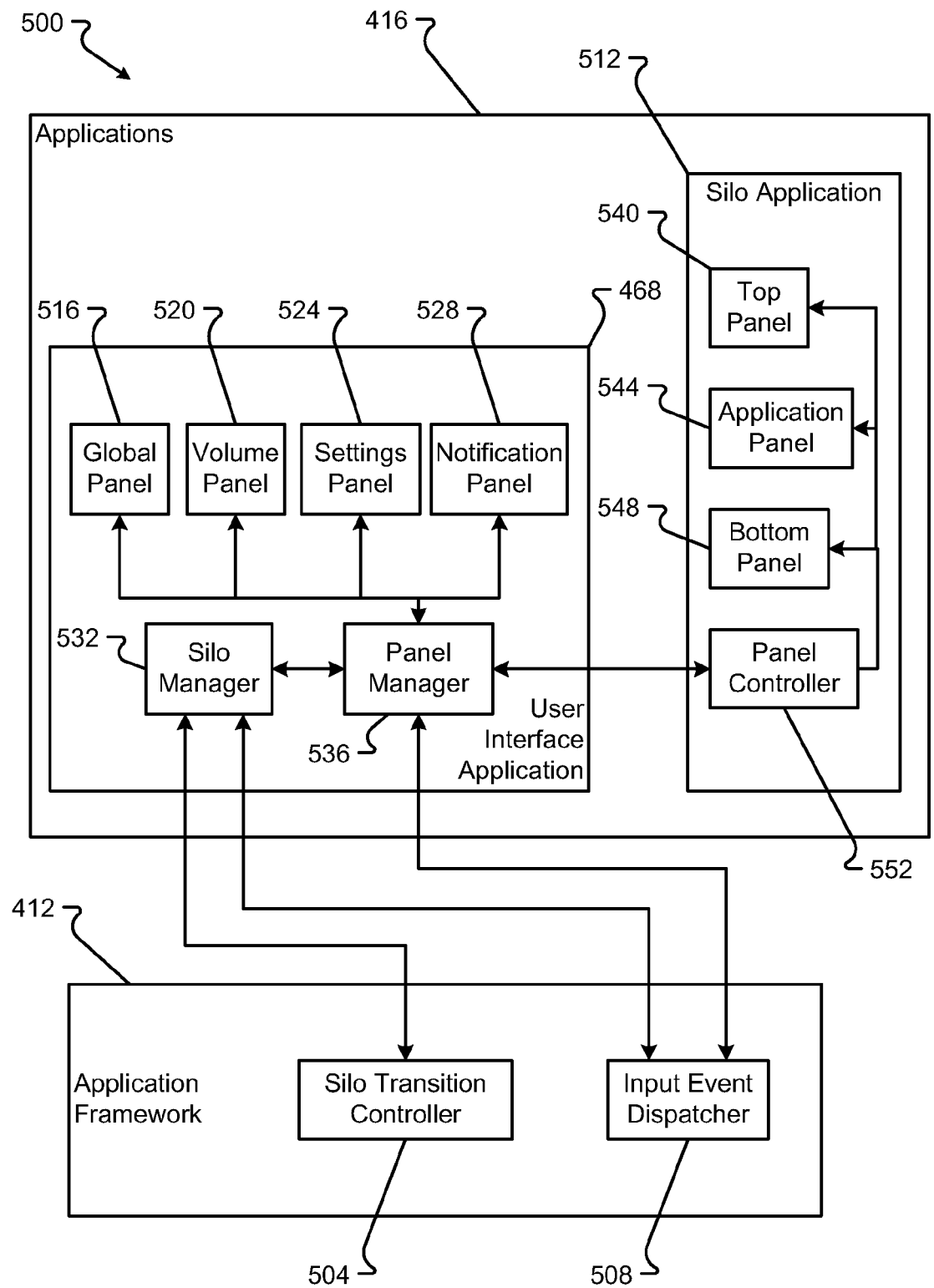
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data sub-service 620, 624, and/or 628 that is in communication with one or more internal and/or external content providers 616.

The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
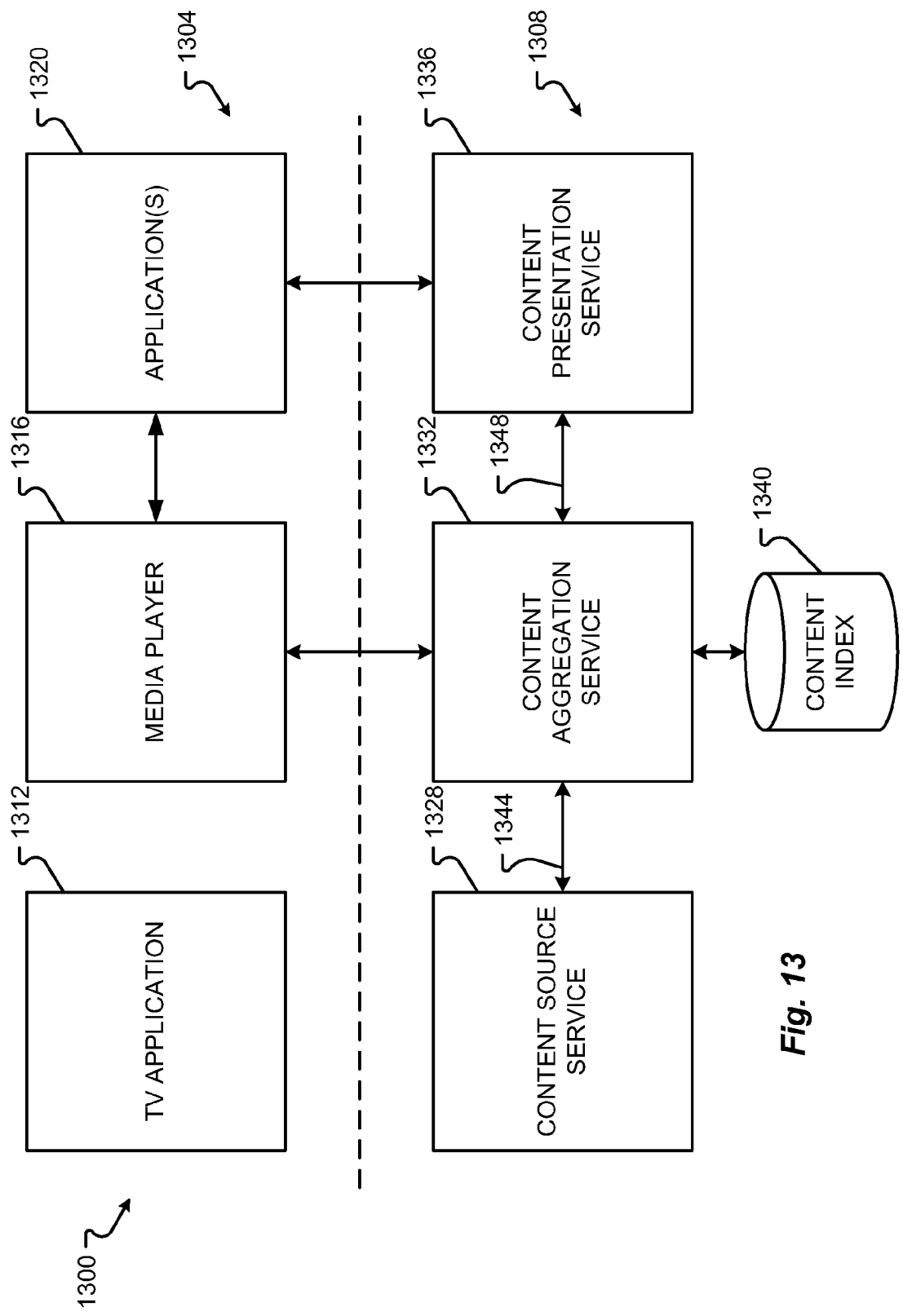
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332, and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television (IPTV), digital television (DTV) (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
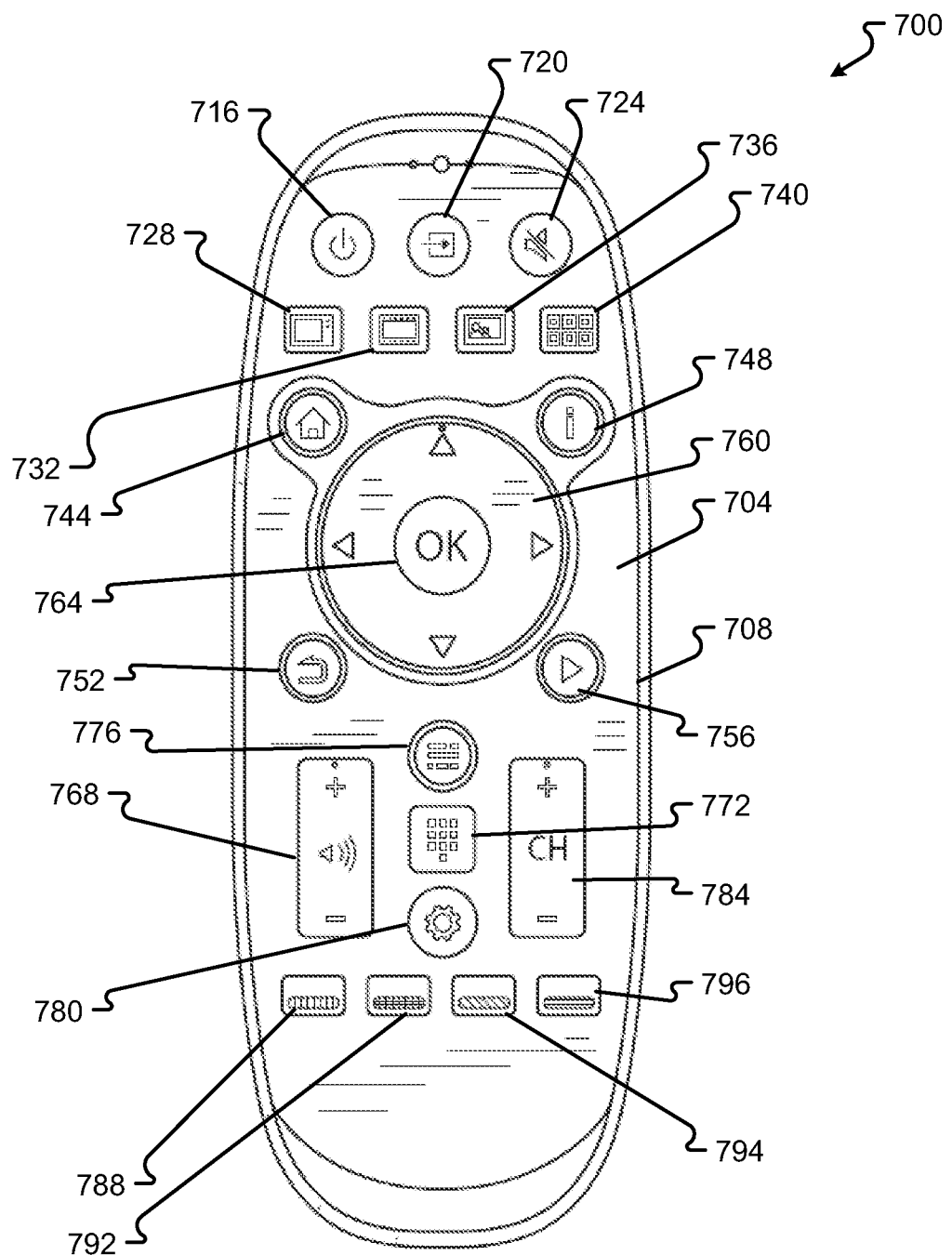
FIG. 7 is a plan view of an embodiment of a handheld remote control.
Figure 8:
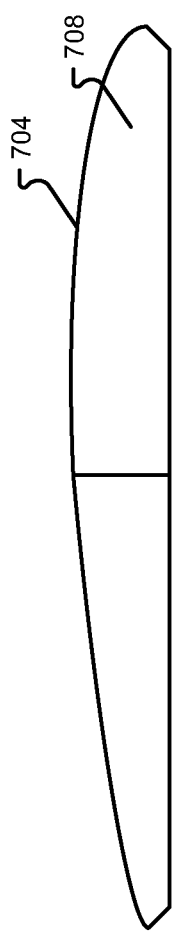
FIG. 8 is a side view of an embodiment of a remote control.

Remote Control:

A handheld remote control can be provided to enable user interaction with the Intelligent TV 100. An exemplary handheld remote control is shown in FIGS. 7-9. The remote control 700 can include one or more of, but is not limited to, top, side, and bottom housings 704, 708, and 712, an (on/off) power button 716, an input source button 720 (to select input source such as Live TV, video on demand, media center, application center, high definition multimedia interface (HDMI), component (COMP), audio/video (A/V), digital or analog television (DTV/ATV), and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third, and fourth hotkeys 788, 792, 794, and 796, and/or a moveable joystick 900 on a bottom of the remote control 700. The first, second, third, and fourth hotkeys 788, 792, 794, and 796 are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center, are always connected/detected.

Figure 9A:
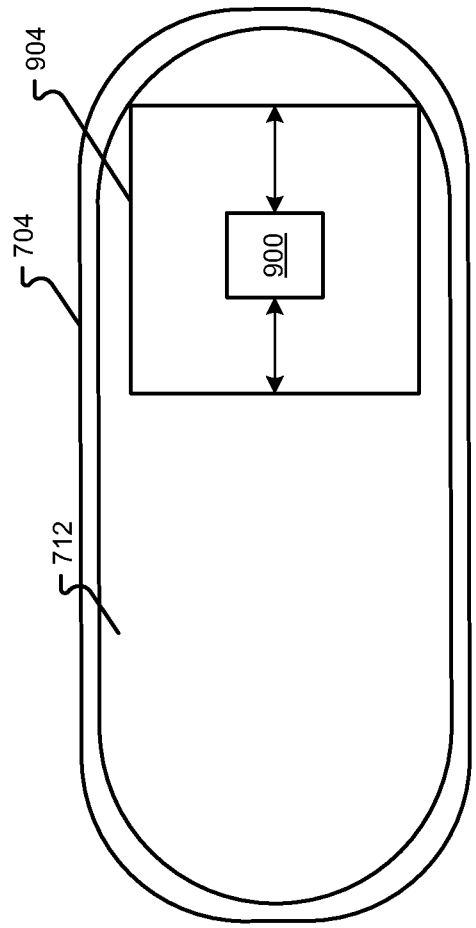
FIG. 9A is a bottom view of an embodiment of a remote control with a joystick in a neutral position.
Figure 11B:
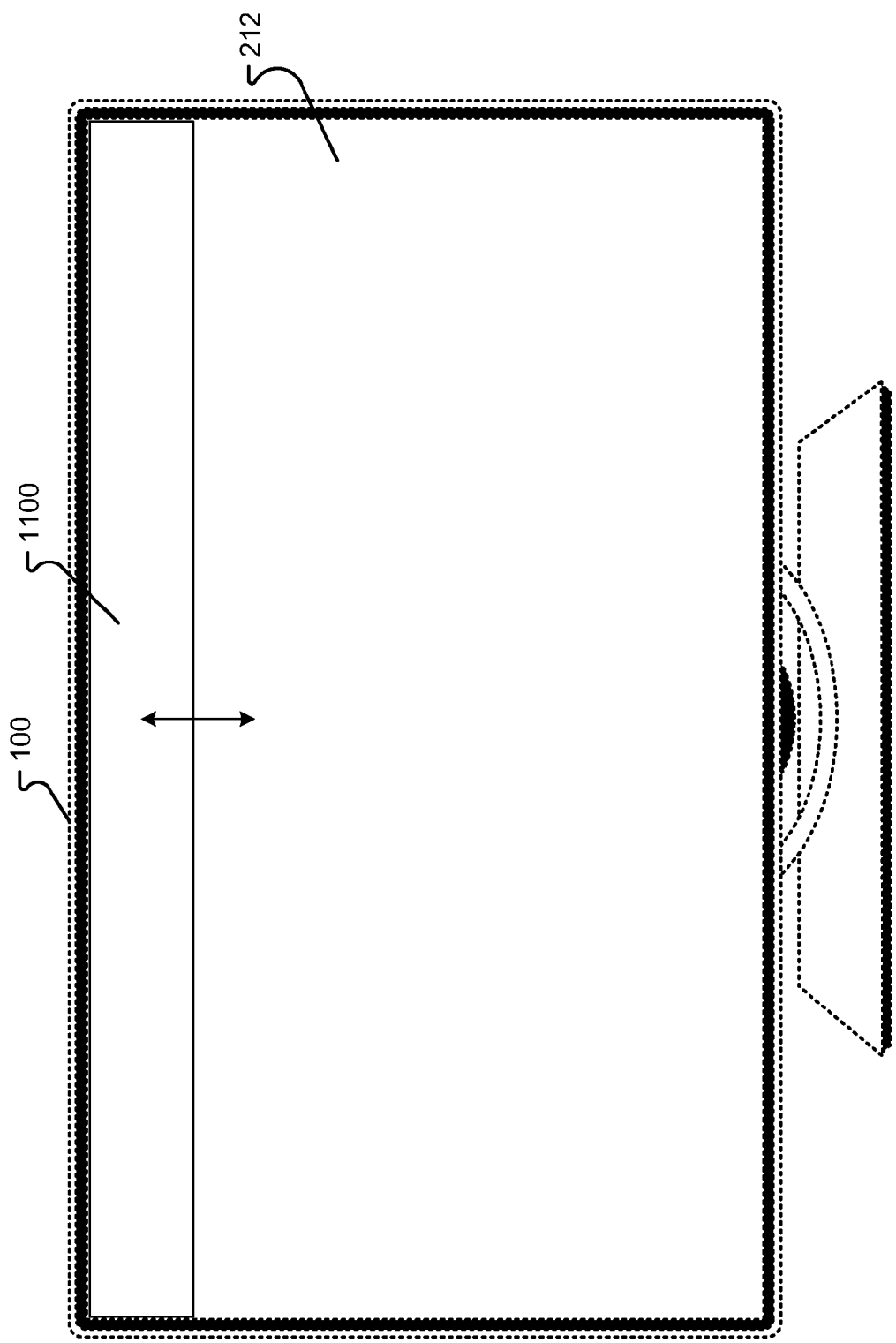
FIG. 11B is a front view of an embodiment of an Intelligent TV screen.
Figure 11C:
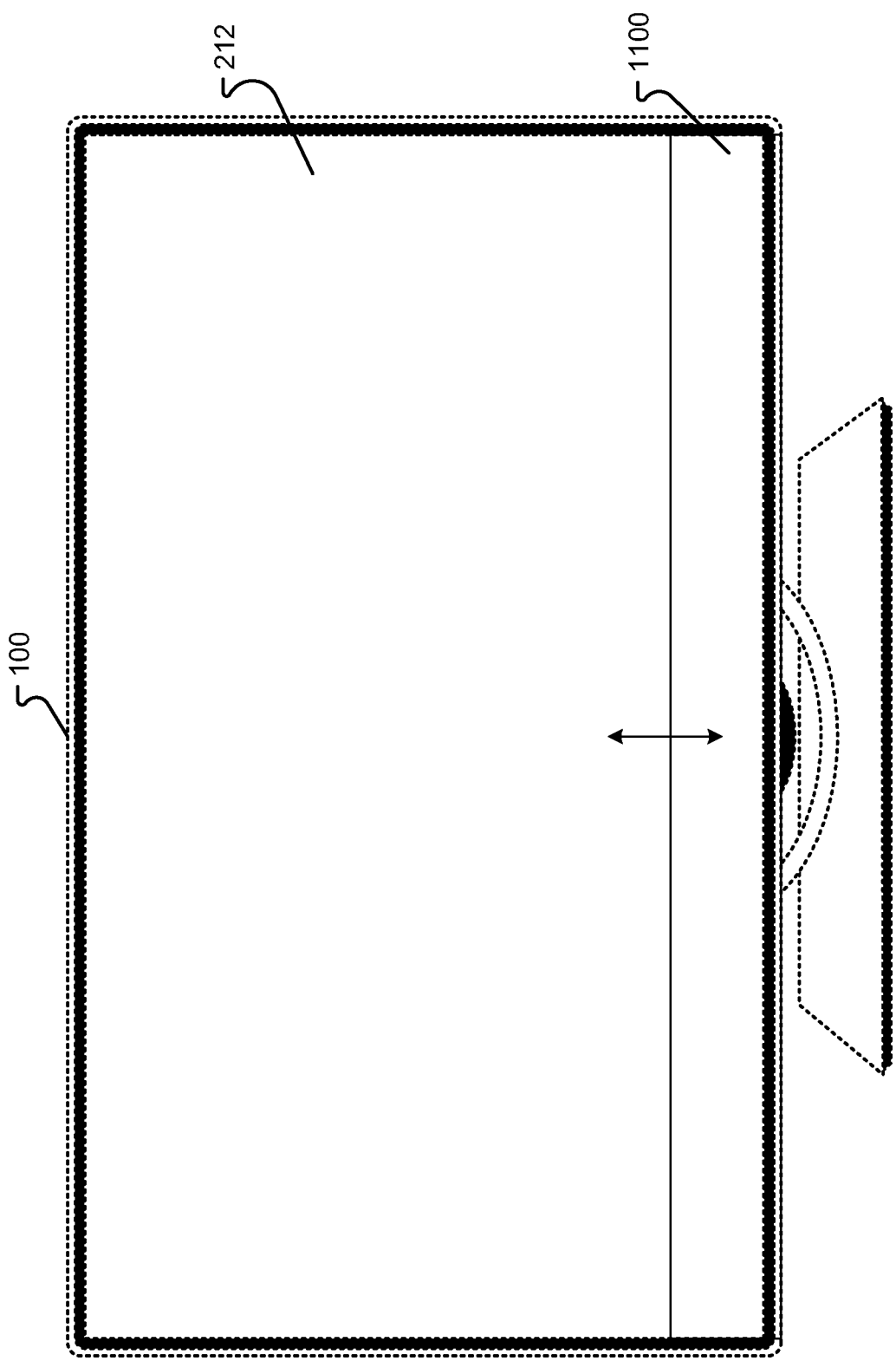
FIG. 11C is a front view of an embodiment of an Intelligent TV screen.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in an nonintrusive manner and without affecting the flow of content that is pushed up or down. The joystick 900 could be moved, additionally or differently, from side-to-side to cause the window to appear at the left or right edge of the screen 212.

Figure 10:
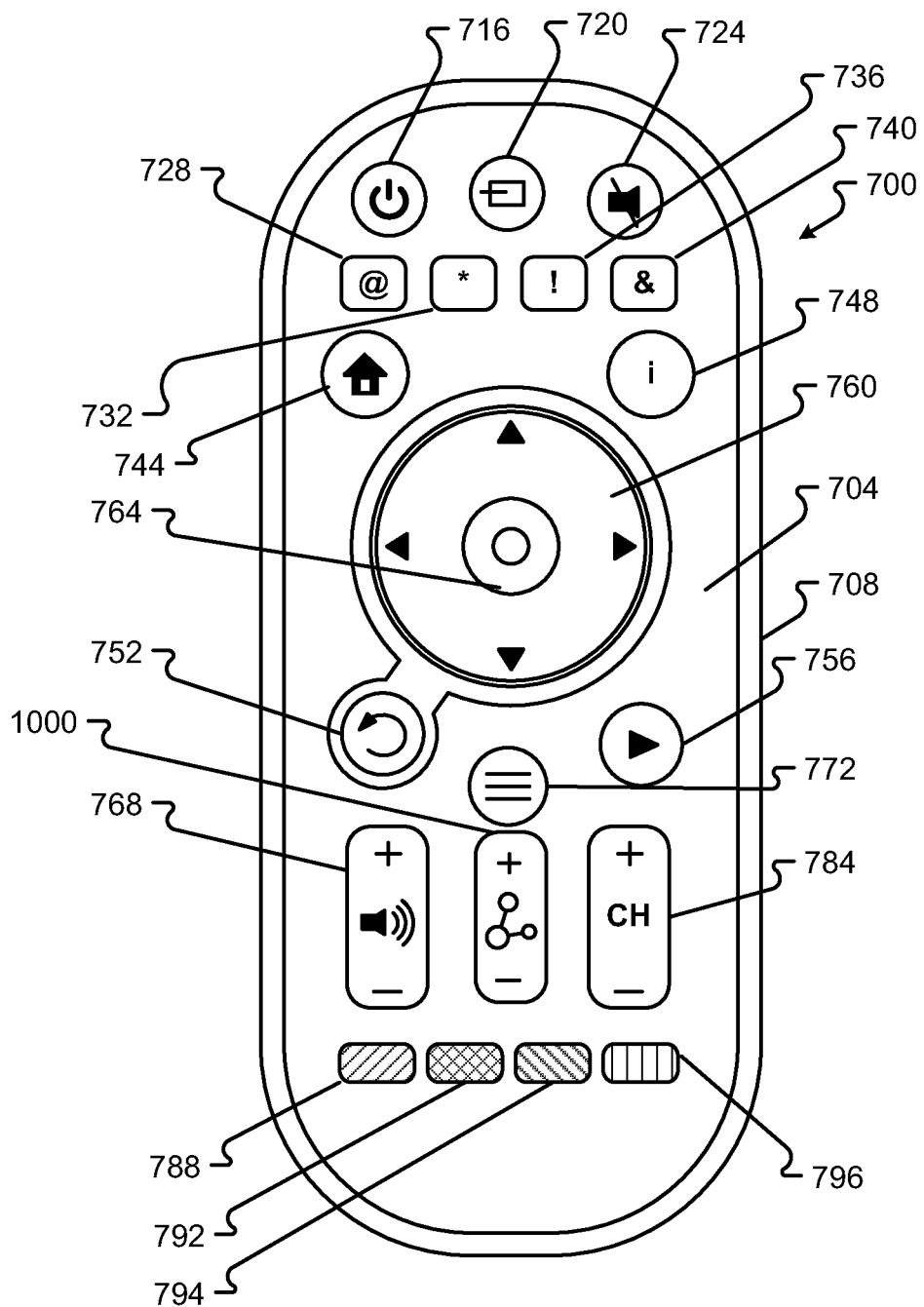
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via Linked-In™, Myspace™, Twitter™, YouTube™, DailyMotion™, Facebook™, Google+™, or Second Life™ The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
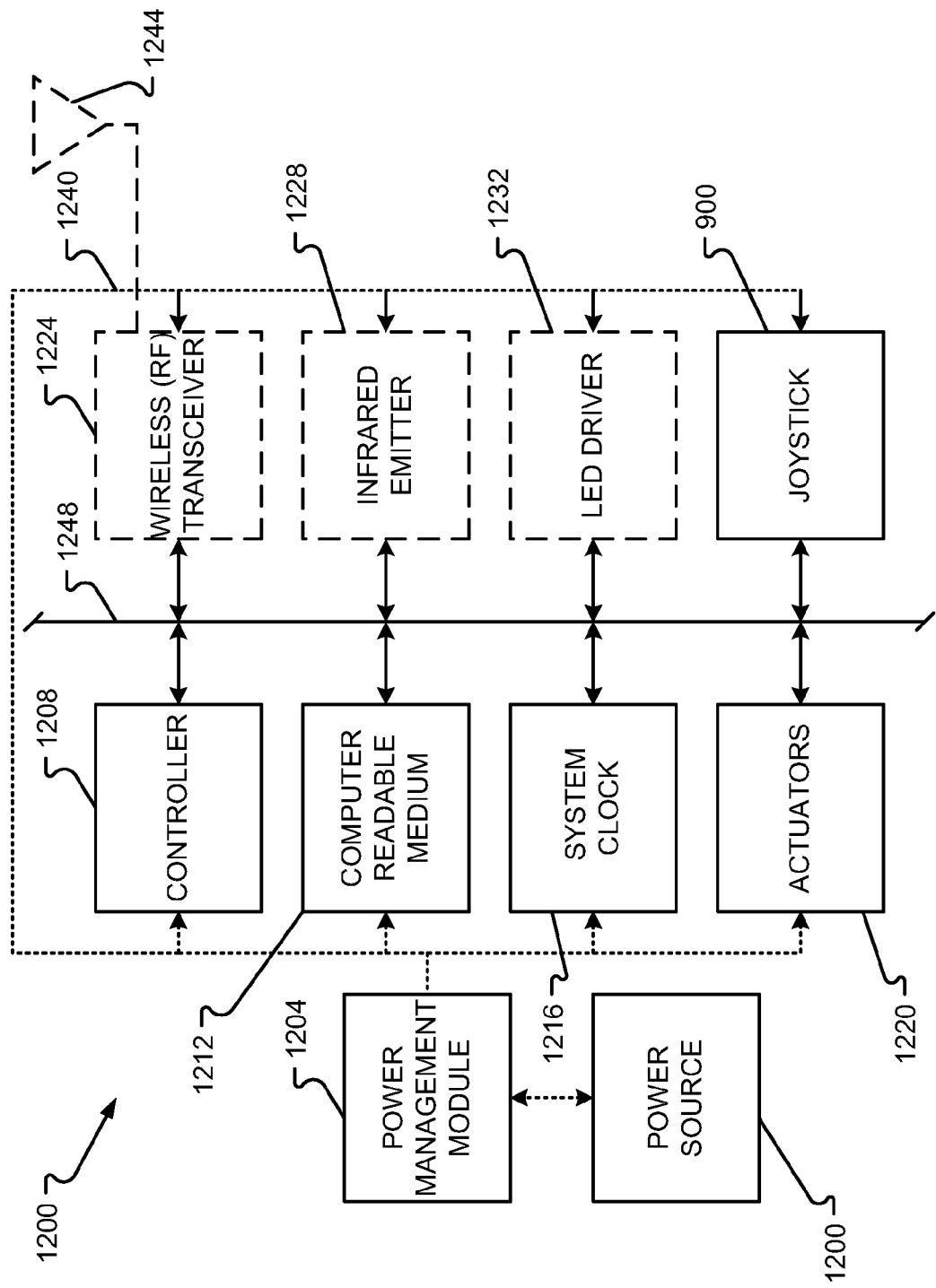
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
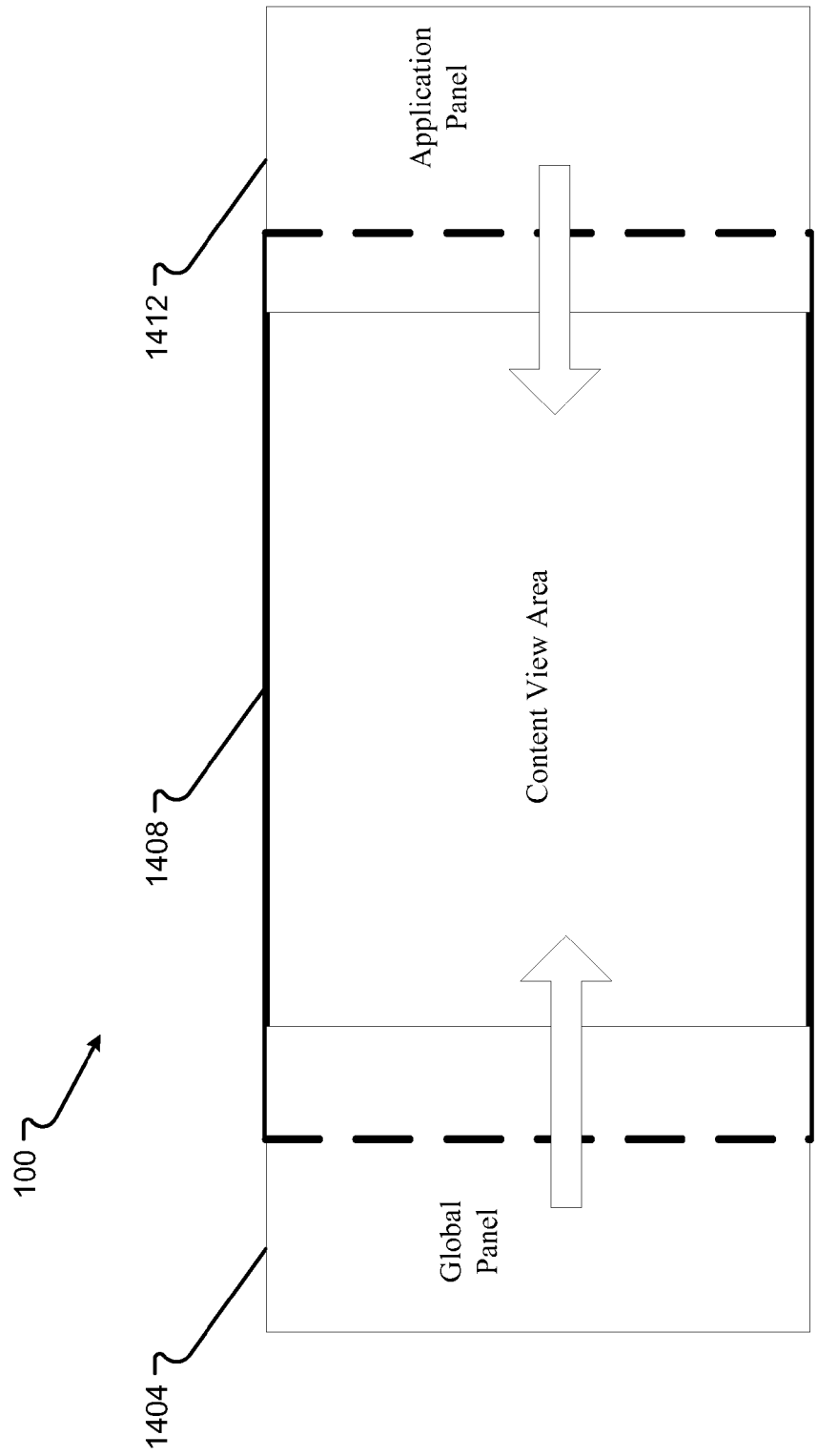
FIG. 14 is a first panel view of an embodiment of an intelligent television.

Referring now to FIG. 14, a panel configuration in accordance with embodiments of the present disclosure is illustrated. As previously discussed, the panel manager 536 is operable to display panels in the user interface, to manage transitions between those panels, or to affect user interface inputs received in the panel. The panel manager 536 may thus be in communication with different user interface panels such as a global panel 516, a volume panel 520, a settings panel 524, an application panel 544, and/or a notification panel 528. The panel manager 536 can display these types of panels depending on the inputs received from the input event dispatcher 508. The panel system is designed to provide a quick access to extended functionality while still maintaining visibility into the main content view.

As illustrated in FIG. 14, an Intelligent TV 100 may display a global panel 1404, an active content view 1408, and an application panel 1412. The global panel 1404 may be the same or similar to global panel 516. The global panel 1404 may include information that is associated with the home screen or top level hierarchal information for the user. For instance, global panel 1404 may be used to contain and access functionality that exists at a system level; this functionality may be completely independent of the currently viewed content. The global panel 1404 may be displayed in such a manner as to not disrupt the content view area 1404; that is, the global panel 1404 may be displayed in such a manner as to provide a user the ability to view content displayed in the content view area 1408. For example, the global panel 1404 may be translucent in nature such that the content displayed in the content view area 1408 is displayed (i.e., still viewable to a user), behind the global panel 1404. The global panel 1404 may provide a consistent access to high level actions across all applications, an anchor for all views, a unified experience, and further may follow the same pattern as the application panel 1412. Moreover, and as previously discussed, global panel 1404 may be displayed by the Intelligent TV 100 such that the active content in the content view area 1408 is always in view. In some embodiments, the global panel 1404 and the contents of the global panel 1404 may depend on the user; that is, the global panel 1404 may be specific to one or more users. Therefore, the global panel 1404 may also be thought of as a home panel.

As further illustrated in FIG. 14, an Intelligent TV 100 may display an application panel 1412. The application panel 1412 may be the same or similar to application panel 544. The application panel 1412 may provide access to contextually relevant functionality based on the currently viewing/recently viewed material. Similar to the global panel 1404, the application panel 1412 may provide such access without disrupting the content view area 1408. That is, the application panel 1412 may be displayed in such a manner as to provide a user the ability to view content displayed in convent view area 1408. For example, the application panel 1412 may be translucent in nature such that the content displayed in the content view area 1408 is displayed (i.e., still viewable to a user), behind the application panel 1412. The application panel 1412 may provide quick access to core functionality of the Intelligent TV 100 such that the active content in the content view area 1408 is always in view. Moreover, the application panel 1412 may provide a consistent user experience across all applications and may include focused contextual content.

Figure 15:
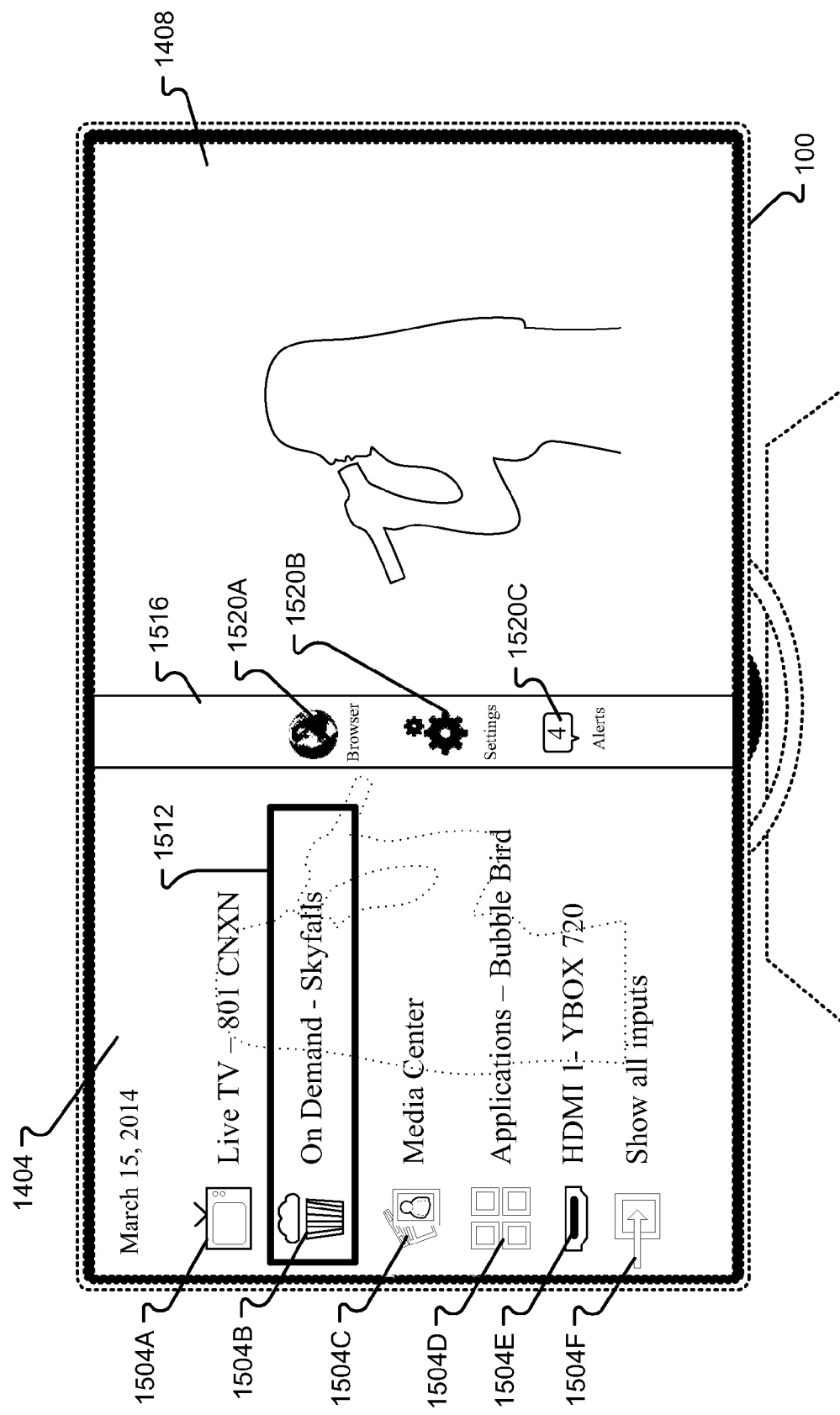
FIG. 15 illustrates a layout consistent with at least one embodiment of the present disclosure.

Referring now to FIG. 15, a global panel configuration in accordance with embodiments of the present disclosure is depicted. Specifically, Intelligent TV 100 may display a global panel 1404 such that the global panel 1404 appears on the left side of the Intelligent TV 100. However, Intelligent TV 100 is not limited to displaying the global panel 1404 on the left; in some embodiments, and consistent with the present disclosure, the global panel 1404 may be displayed on the right side of the Intelligent TV 100, near the top side of the Intelligent TV 100, near the bottom of the Intelligent TV 100, and also in the center of the Intelligent TV 100. Moreover, the Intelligent TV 100 may display content in an active content area 1408.

A detailed global panel 1404 configuration is illustrated in accordance with embodiments of the present disclosure. The global panel 1404 may include one or more sources represented by icons and text, or shortcuts, 1504A-E. Of course, more or less icons and text 1504A-E may be displayed. As previously discussed, each icon and text 1504A-E may be associated with one or more sources of content. For example, icon and text 1504A may be associated with the Live TV application 452; icon and text 1504B may be associated with the video on demand application 456; icon and text 1504C may be associated with the media center application 460; icon and text 1504D may be associated with the application center application 464; and icon and text 1504E may be associated with one or more sources of content, either internal or external. Moreover, icon and text 1504F may provide the ability for all sources of content to be displayed within global panel 1404. Global panel 1404 may additionally indicate a source that is selected using an indicator 1512; for example, the indicator 1512 may comprise a box positioned around On Demand—Skyfalls. Although illustrated as a box, other methods or configurations which provide for icon selection and/or identification may be used. For example, instead of a box, indicator 1512 may comprise a circle, oval, or line or may comprise adjusting the background of an icon and text 1504A-F such that the color, shade, highlighting, spotlight, or hue is different for the selected icon and text 1504A-F. Alternatively or in addition, indicator 1512 may comprise enlarging or magnifying the icon and text 1504A-F.

The text portion of icon and text 1504A-1504F may also include the application, source, or channel that is currently maintained, on hold, active, and/or associated with another content that is not currently displayed in the content display area 1408. For example, in FIG. 15, the active content area 1408 is currently displaying an On Demand view (specifically, Skyfalls) that is on the on demand application 456. The text of icon and text 1504B includes a title of the content that was previously displayed—"Skyfalls." The other icons and text, 1504A, 1504C-E, may display the previously active content or content that was previously displayed in the active area 1408 at one time, but is now currently in a hold, an inactive, or a paused state. For example, icon and text 1504A display "Live TV—801 CNXN," which Live TV application 452 may have previously been displaying some form of content: various Live TV channels, etc. The text of icon and 1504A includes a title of the content that was previously displayed: "801 CNXN." Similarly, the text portion of icon and text 1504D displays a previously displayed or previously active application—for example, "Bubble Bird." The application "Bubble Bird" may still reside in some form of application memory associated with the application center application 464. As another example, the text portion of icon and text 1504E includes "HDMI 1—YBOX 720." Thus, the source content on the HDMI 1 port from a YBOX 720 was previously displayed in content area 1408.

Additionally, the global panel 1404 may include a shortcut area 1516. The shortcut area 1516 may provide access to frequently used applications, sources, or areas of the Intelligent TV 100. Moreover, shortcut area 1516 may be user configurable; thus, a user may be able to decide what applications or sources are displayed in the short cut area 1516. As illustrated in FIG. 15, shortcut area 1516 displays an icon for a browser 1520A, an icon for a settings menu 1520B, and an icon for alerts 1520C. The settings 1520B may provide a user access to one or more Intelligent TV 100 configurations. Additionally, the alerts icon 1520C, may indicate a number of alerts, or messages, a user has. The alert messages may be messages involving the operation and configuration of the Intelligent TV 100, messages received from one or more users, indications that new content has arrived, or the like.

In addition, the global panel 1404 may be displayed such that the actively displayed content is displayed in active content area 1408 and is further visible behind global panel 1404. For example, the content currently displayed on the Intelligent TV 100 is an image or video associated with Skyfalls. The global panel 1404 may be translucent such that the content is displayed below or behind the global panel 1404, as represented by the dotted lines in FIG. 15.

Figure 16A:
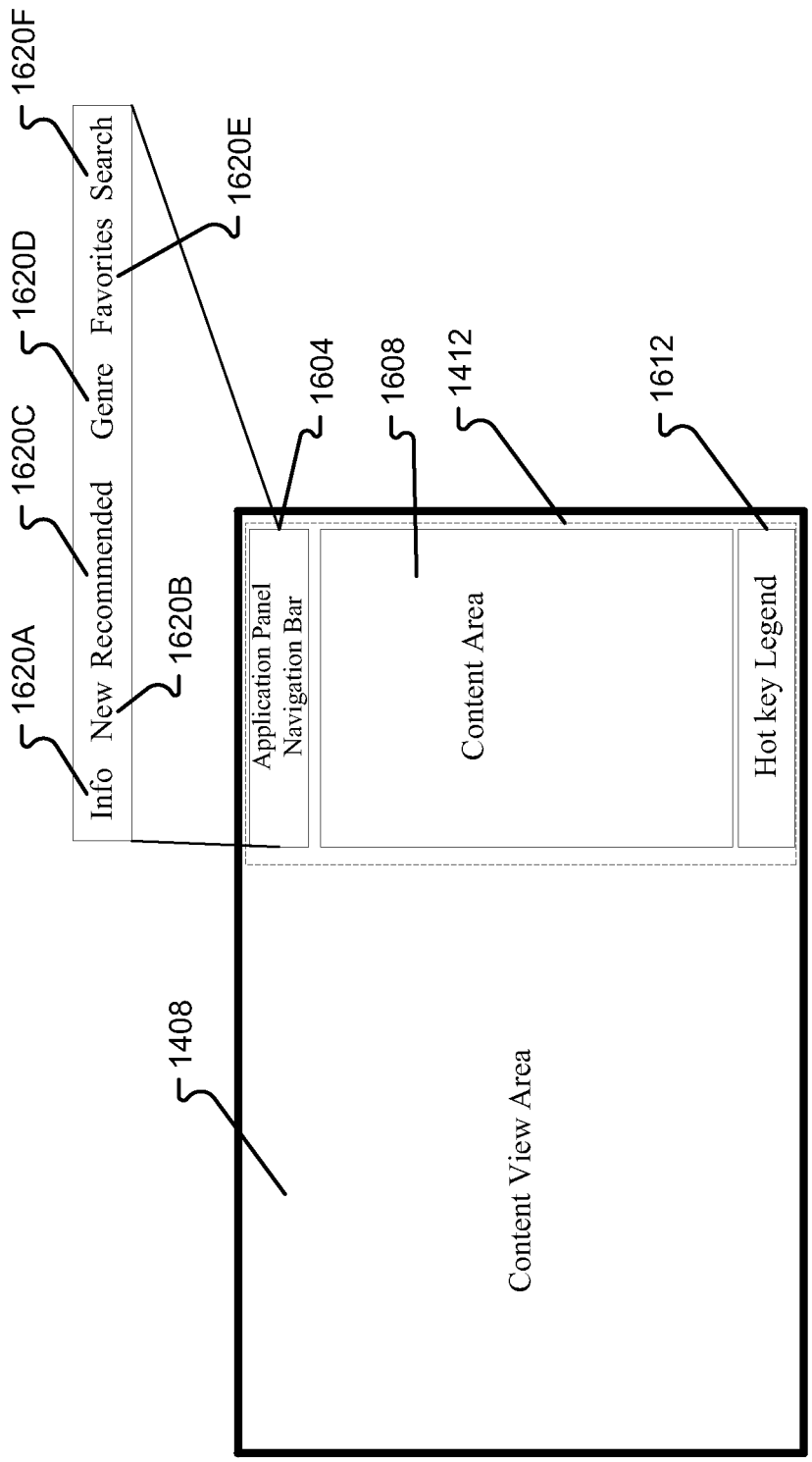
FIG. 16A is a second panel view in accordance with embodiments of the present disclosure.

As previously discussed, the Intelligent TV 100 may further include an application panel 1412 as shown in FIG. 16A. The content displayed in the application panel 1412 depends on the content displayed in content view area 1408. Stated another way, application panel 1412 is contextually dependent upon the source of content and the content itself in content view area 1408. This is significantly different from global panel 1404, in which the content displayed in global panel 1404 contains functionality that exists at a system level and is completely independent of the currently viewed content in content view area 1408. The application panel 1412 also provides customized information for each application. The application panel 1412 is horizontally scrollable and vertically scrollable. Thus, the navigation panel bar 1604 is horizontally scrollable and the content area may be vertically scrollable. The navigation bar 1604 appears in multiple places throughout the system. Although the visual appearance may vary, the functionality of the navigation bar 1604 remains the same across all screens. A very simple horizontal pattern is used to move between elements in the navigation bar 1604. Unlike other controls, the navigation bar 1604 does not support a separation between focus and selection. Moving between tabs in a navigation bar 1604 happens as soon as the focus is moved to the next item. In many cases moving past the edges of the content below a navigation bar 1604 will also move to the next tab. When the number of items exceeds the available space, the navigation bar 1604 may scroll horizontally. A navigation bar 1604 with one item becomes a title bar and no longer support focus or selection. The Master View's navigation bar follows the same navigation pattern but will not convert to a dropdown when there is insufficient horizontal space. The Master View's navigation bar supports horizontal scrolling.

The application panel 1412 may comprise application panel elements comprising an application panel navigation bar 1604, a content area 1608, and a hotkey legend 1612. The application panel navigation bar 1604 is presented such that the navigation pattern and content remain consistent across applications. That is, the navigation bar 1604 may include the same or similar elements such that ease of navigation is maintained no matter which applications and/or sources are selected and displayed. For example, the panel navigation bar 1604 may include fixed tab regions (also called tabs or panel views herein) 1620A-1620F corresponding to navigable menus and further comprising Info, New, Recommended, Genre, Favorites, and Search. Although, Info 1620A, New 1620B, Recommended 1620C, Genre 1620D, Favorites 1620E, and Search 1620F are illustrated in FIG. 16A, additional or fewer tabs may be displayed.

The panel content area 1608 is panel view specific; that is, depending on a panel view focus, the panel content area 1608 may update or change, as further described below. The panel content area 1608 is panel view specific, i.e., when the panel view in focus changes, the panel content area 1608 updates to the corresponding panel view that is currently in focus. The panel content area for each panel view is also active content area 1408 specific; that is, depending on the active content area currently selected or being viewed, the panel content area 1608 may change and/or may be presented in a different way (i.e., have a slightly different look or content). The Active View (content view area 1408) should not be interrupted while the user is navigating the application panel 1412.

Moreover, application panel 1412 may include a hotkey legend 1612 corresponding to one or more hotkeys. The hot key legend 1612 may be positioned at the bottom of the application panel 1412 across all applications. The function of the hot keys is context sensitive and may vary depending on the application selected and/or displayed in content view area 1408. However, generally speaking, some hot keys are generally navigation based while others are action based—for example, based on shortcuts such as marking a series as a favorite. The hot key legend 1612 is positioned at the bottom of the panel 1412 across all applications. The function of hot keys 1612 is context sensitive, and it might vary in different applications. However, generally speaking, the red and yellow keys are navigation based shortcuts, and the green and blue keys are action based shortcuts, such as marking a series as favorite. These colors and actions may vary in different embodiments and across different applications.

Figure 16B:
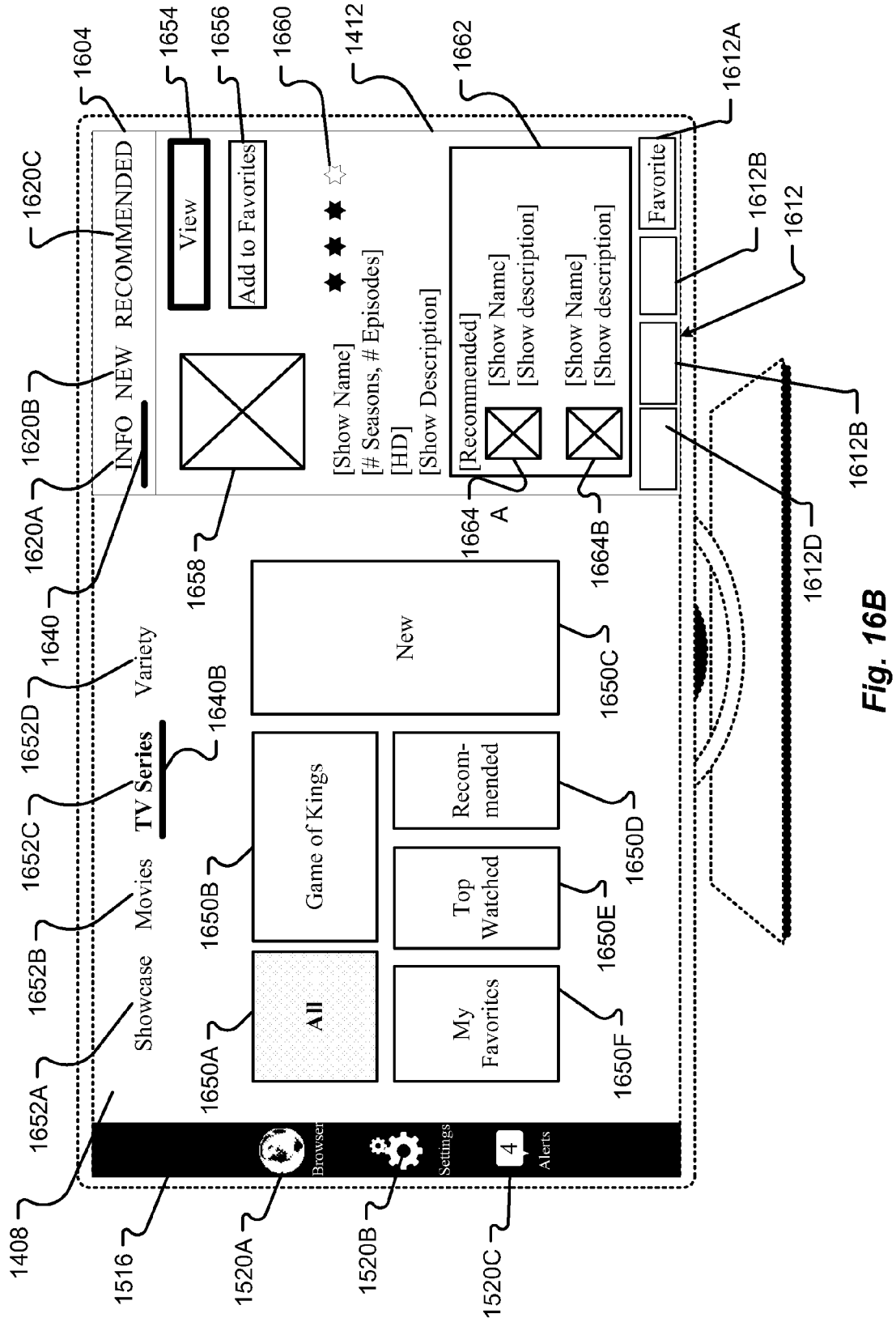
FIG. 16B is a third panel view in accordance with embodiments of the present disclosure.

FIG. 16B shows one embodiment of the user interface and behavior for the application panel 1412 in the video on demand application 456, including three of the application panel's 1412 six panel views: Info, New, Recommended, Genre, Favorites, and Search. FIG. 16B also shows the Master View with top categories 1652 and tiles 1650. The video on demand interaction framework is flexible so different content providers can populate the content into the views in video on demand by providing a back end data source. Most views in video on demand have multiple components; some components are mandatory and others are optional. Content providers can pick and choose the components that go into each view based on the structure and availability of their media content. Within each top category in the Master View, content is organized in collections represented by tiles. An "All" collection that contains all the media content within this top category is available if needed. As an example, the top category "Movies" 1652B can have the following tiles: All 1650A, My Favorites 1650F, Top Watched 1650E, New 1650C, Recommended 1650C, etc.

The application panel 1412 provides customized information in each application view. The navigation pattern and content layout remains consistent across all applications. There may be a number (e.g., three or six) tabs in the application panel navigation bar 1604. Each tab represents a panel view 1620. The total number of views in the application panel 1412 varies in each application. The application panel navigation bar 1604 follows the same interaction pattern across all functions. If overflow happens, the navigation bar becomes horizontally scrollable and visual feedback may be provided to indicate so.

In accordance with some embodiments of the present invention and as previously described, a user may select a tab 1620A corresponding to info, as illustrated in FIG. 16BA. An indicator, such as indicator 1640, may display which panel view 1620A-C is selected or has the current focus. Application panel 1412 may then display context specific information corresponding to the active content area 1408. For example, application panel 1412 may include information specific to On Demand—for example a show name and the number of seasons, episodes, etc. Additionally, a large thumbnail image 1658 corresponding to a specific show may be displayed in the application panel 1412, for example in the large information view contents for a TV series 1652C top category. Moreover, the application panel 1412 may utilize one or more panel content view types discussed in FIGS. 17A-17B. Mini information view contents 1662 may contain additional or alternative information. Moreover, additional information pertaining to the active content area 1408 may be presented to a user. Information such as the title of the show, the number of seasons for the show, the number of episodes for the show, a description of the program, characteristics of the program (for example HD, Dolby, and category), and the number of stars 1660 a show receives may also be displayed. Options such as "View" 1654 (to view series details) or "Add to Favorites" 1656 (to add the series or episode to a favorites list) may also be available to the user. In one embodiment, the "View" button 1654 allows the user to view the content or view a preview of the content. In some embodiments, upon the display of the application panel 1412, the shortcut area 1516 may also be displayed. Similar views and layouts may be used in the info panel 1412A if Variety Episode or Movie is selected rather than TV Series.

The goal of this design is to provide clear navigation mechanism within the application panel 1412. The two fundamental rules of navigating on the application panel 1412 are: (1) Left-Right and (2) Up-Bottom. Using the left and right arrows on the D-Pad navigates between the various panel views 1620. Pressing left or right arrows does not move the focus within the content view area 1408 and the content area 1608 also remains in focus in the application panel 1412. When reaching the end of the navigation bar 1604, visual feedback may be provided to indicate the user can no longer scroll to the left or right. Using up and down arrows on the D-Pad navigates through selectable items in the panel content area 1608. The user may also use the down arrows on the D-Pad to get to the hot key legend 1612 and may use the left and right arrows to scroll through the hot keys 1612A-D.

Pressing the remote [Panel Button] launches the application panel 1412, and pressing it again dismisses the panel 1412. In some scenarios, the application panel 1412 is dismissed automatically upon user choosing to play the video by selecting either a "Watch" button or pressing the "Play" button on the remote or by selecting "View" 1654 on the application panel 1412. Alternatively, "View" 1654 may allow the user to see details and more information about the selected show, movie, series, etc.

The stickiness rule applies to the application panel 1412 across different panel views 1620. When the application panel 1412 is launched, it shows the view where the user was last before the panel 1412 was dismissed. If the content in the view is time based, the content should be updated. When the application panel 1412 is launched for the first time, the default view (the first tab on the navigation bar) is shown.

Multiple panels are provided based on the context of navigation. The system supports five main categories of panels. Within each of these categories are multiple variations. The types of panels are based on the needs of the application. The panels are related to the current active view. Multiple variations within the five categories of panels allow the user a rich, elegant, and intelligent navigational experience.

Figure 16C:
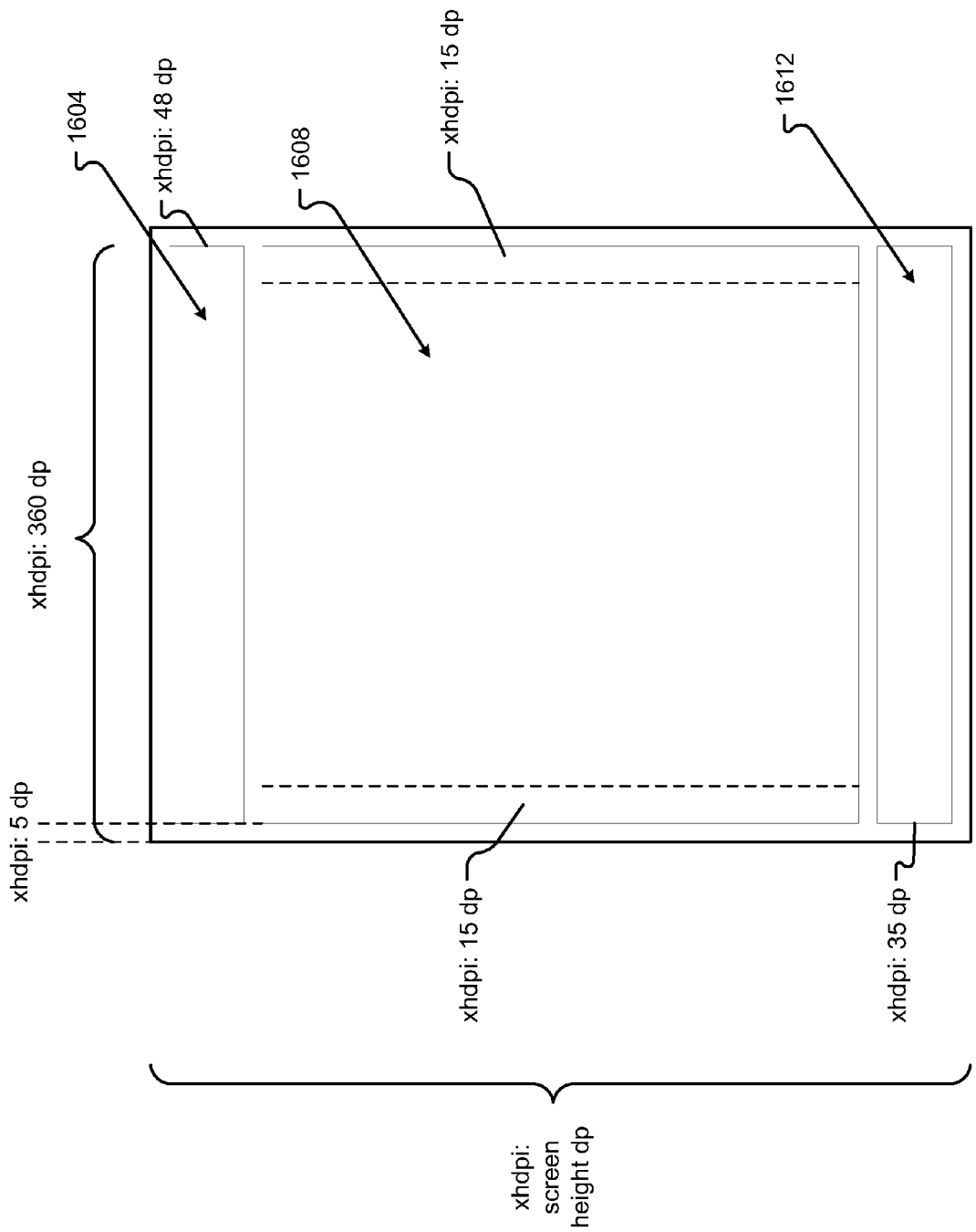
FIG. 16C is a fourth panel view in accordance with embodiments of the present disclosure.

FIG. 16C shows the application panel 1412 layout on the screen. The panel height occupies the whole screen, while its width is fixed. All list items share the same set of basic rules. The list items are categorized by the number of lines they can show (e.g., from 1 to 4 lines). All list items follow the same structure, containing a picture area and a content area. In general, the smaller ones will show icons while the bigger one will show thumbnails. Depending on the situation, the picture area may not be used, or be aligned to the right. The list items have fixed height, while their width is fluid. When a list item is scaled horizontally, the picture area size remains fixed, while content area grows/shrinks to accommodate the new width. The content area can contain multiples configurations of information. For example, the 4-Liner can be used to show 1 single line text plus 1 multiline text (exactly like the example on the left), but it could also be used to show 4 singles lines of text, or just one multiline text. All list items share the same margin between the thumbnail and the labels, as shown on the diagram.

The aspect ratio of the picture area is by default a square. But, in some situations, the picture area or thumbnail can have different aspect ratios: special landscape or special portrait, in order to match with the type of content that is being displayed. All lists in the application panel that holds 1-liner list items share the same specifications shown on the left. All lists in the application panel that holds 1-liner-plus list items share the same specifications shown on the left. All lists in the application panel that holds 2-liner list items share the same specifications shown on the left. All lists in the application panel that holds 3-liner list items share the same specifications shown on the left. All lists in the application panel that holds 4-liner list items share the same specifications shown on the left.

Figure 17A:
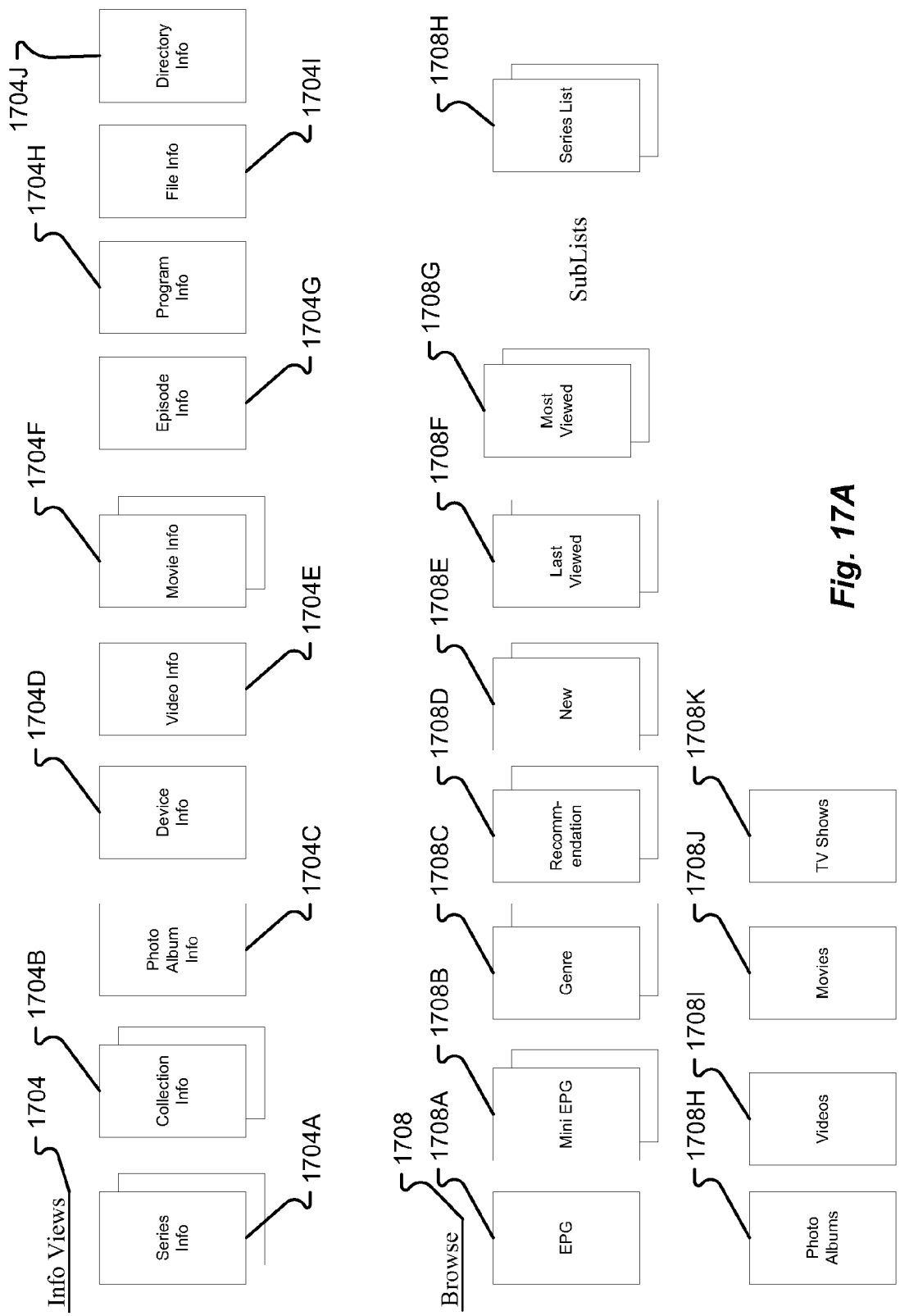

As illustrated in FIGS. 17A-17B, multiple content area panels are provided in accordance with embodiments of the present disclosure. Each panel may be provided based on the context of a navigation. For example, if the panel and navigation bar 1604 indicates that the focus is upon the "Info" panel tab (also called the info panel herein) 1620A, a panel based on the Info Views 1704 category, such as "Series Info" 1704A, may display content related to the current active view. As another example, when the focus of the panel and navigation bar 1604 is upon the "Favorites" panel tab 1620E, a panel based on the Favorites 1716 category, such as "Videos" 1716B, may display content related to the current active view. The categories of panels may include, but are not limited to, "Info Views" 1704 having panel types corresponding to 1704A-1704J; "Browse" 1708 having panel types corresponding to 1708A-1708K; "Search" 1712 having panel types 1712A-1712B; "Favorites" 1716 having panel types 1716A-1716D; and "Global" 1720 having a panel type of 1720A. More or less panel categories and panel types may be provided.

Figure 18:
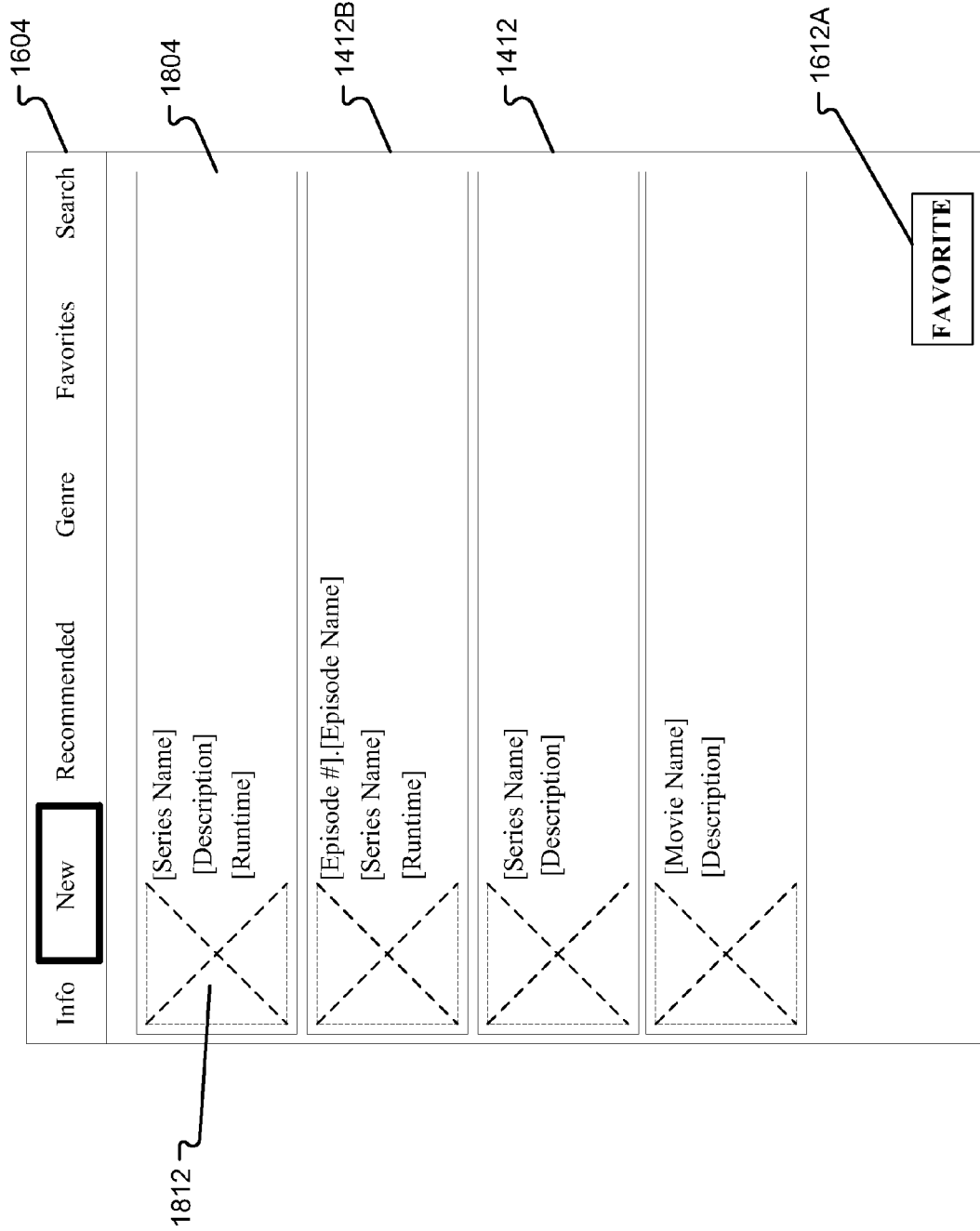
FIG. 18 illustrates a fifth panel view in accordance with embodiments of the present disclosure.

FIG. 18 depicts an example where the "New" panel tab (also called the new panel herein), such as 1620B, has a focus in the navigation bar 1604 in accordance with some embodiments of the present disclosure. When the new panel has a focus or is selected, a browse category 1708 having a panel type 1708E may be utilized to display information regarding new content items. For example, FIG. 18 illustrates an example application panel 1412 when "New" is selected, i.e., the new panel 1412B. In such an instance, the new panel 1708E provides a list of recommendations based on the new media where the new media is media agnostic. The new panel 1708E may provide a rich list of new content, including episode number, series name, description, movie name, runtime information, etc. For example, one or more content areas 1804 may be displayed containing information relating to new content. The content areas 1804 may be arranged chronologically by release date, alphabetically, per the favorites settings, or by some other means. The content areas 1804 may include a thumbnail 1812 displaying one or more images associated with the new content. Additionally, where the content displayed includes episode information, the content area 1804 may include one or more of an episode number, an episode name, a series name, description, movie name, runtime information, etc. Additionally, the content area 1804 may include a hotkey legend corresponding to one or more hotkeys 1612A to add some aspect (for example, an entire series, an episode, etc.) to a favorites list. The info panel 1412A is horizontally scrollable and vertically scrollable. Thus, the navigation panel bar 1604 is horizontally scrollable and the panel content area 1608 may be vertically scrollable.

Figure 19A:
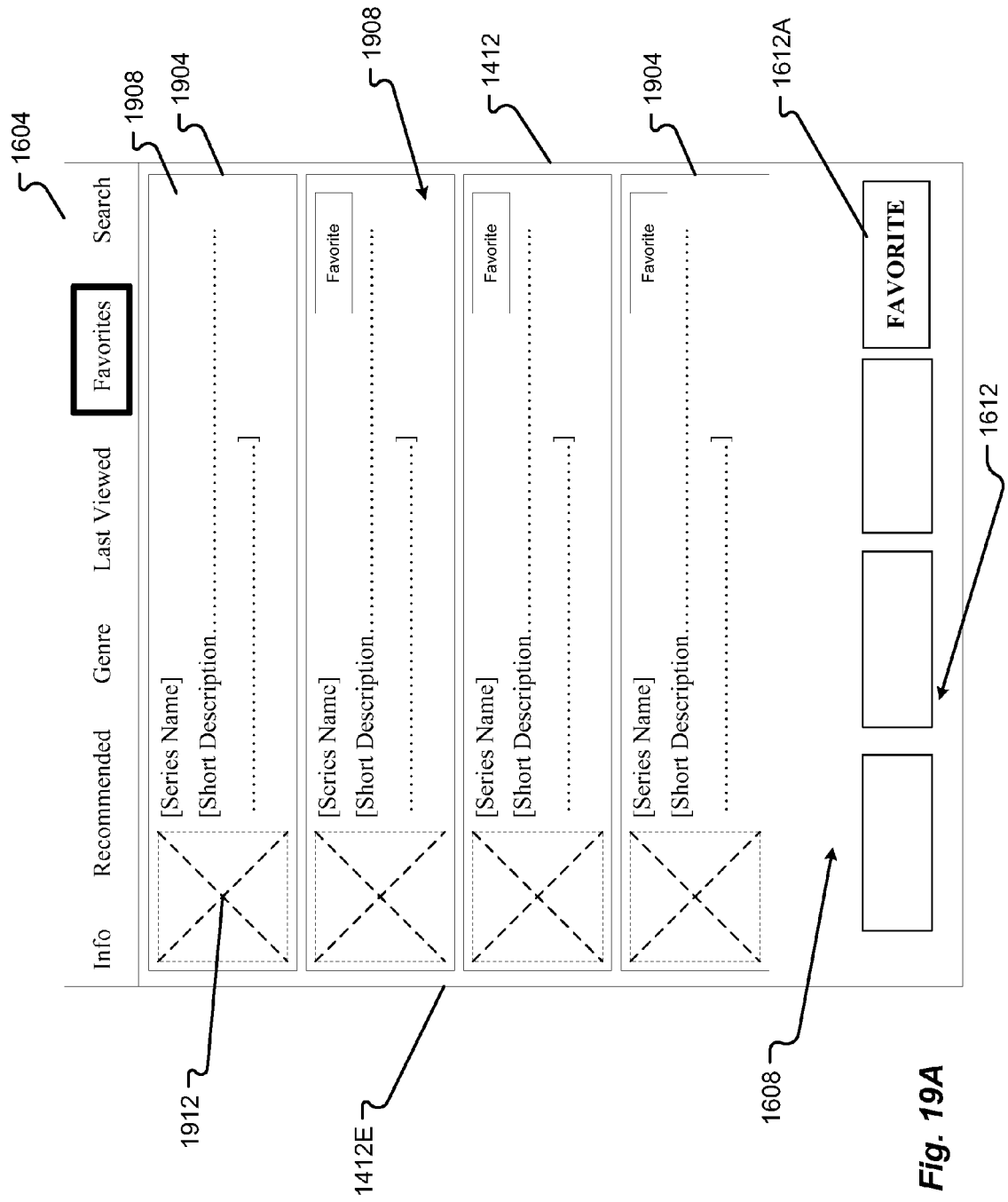
FIG. 19A illustrates a sixth panel view in accordance with embodiments of the present disclosure.

FIG. 19A depicts an example where the "Favorites" tab (also called the favorites panel herein), such as 1620E, has a focus in the navigation bar 1604 in accordance with some embodiments of the present disclosure. When favorites panel has a focus or is selected, a favorites category 1716 having a panel type corresponding to one of 1716A-1716D may be utilized to display information regarding content items marked as favorite. Specifically, when the Intelligent TV 100 is in the video on demand application 456, the panel type will correspond to one of 1716C and 1716D depending on whether the user has selected movies on demand or TV series on demand within the video on demand application 456. The favorites panel 1412A displayed in the application panel 1412, may provide a running list of a user's favorite content and may allow for easy viewing, date checking, sharing, and the like, of content items marked as favorite. In one embodiment, the list of favorites is provided alphabetically. The maximum number of items in the list is 20 items. If there are more than 20 favorites a "Show all Favorites" button appears at the bottom of the scrolling list. Selecting that button dismisses the panel and takes the user to the Favorites Collection View.

Figure 19B:
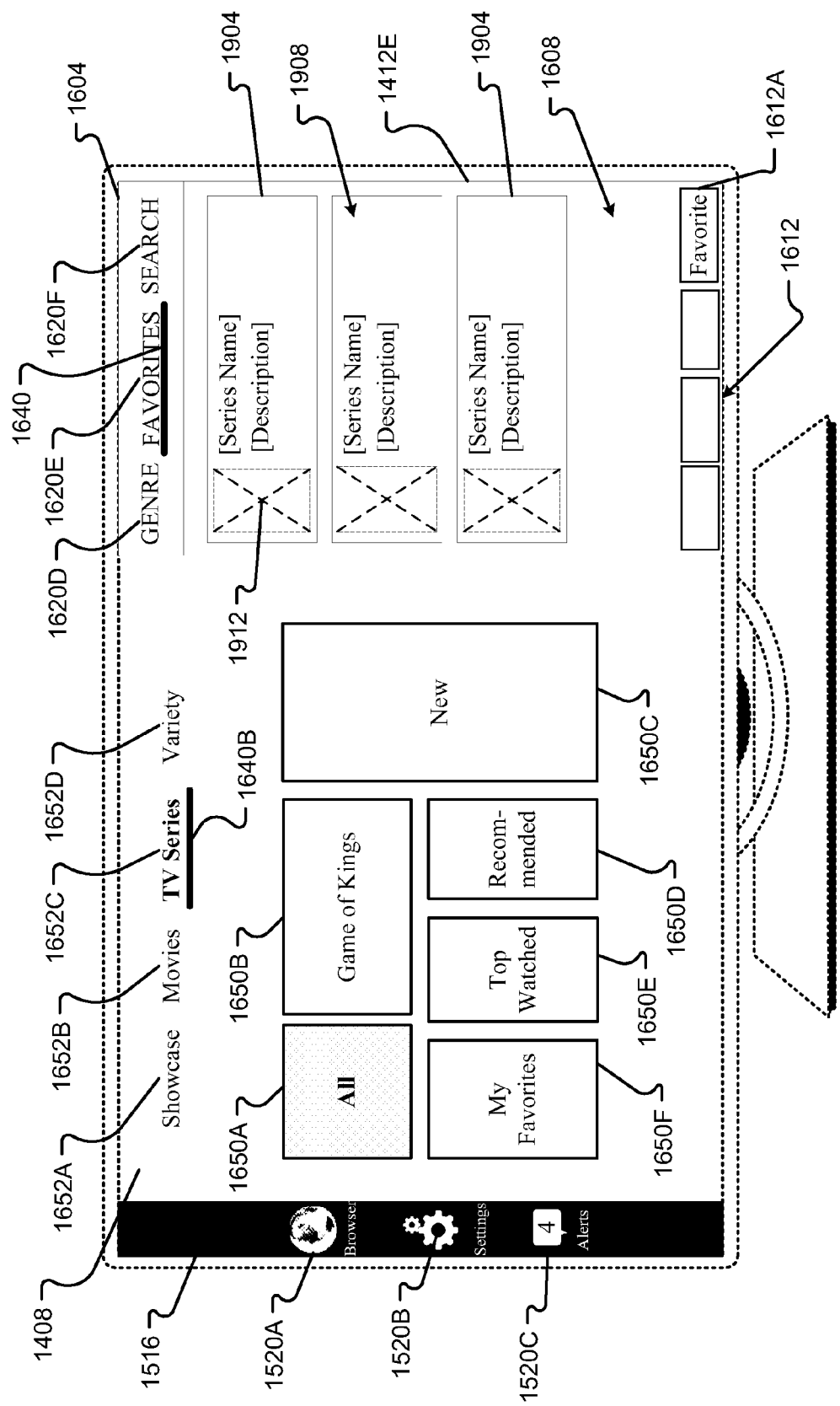
FIG. 19B illustrates a content view in accordance with at least one embodiment of the present disclosure.

For example FIG. 19A illustrates an example of an application panel 1412 when "Favorites" is selected. In such an instance, one of the favorites panel 1412A corresponding to 1716C-1716D provides a list recommendations based on content that a user has marked as special or favorite. The favorites panel 1412A provides a favorites list 1908 comprising a vertical scrollable collection of items 1904 that a user has marked as a favorite. In some embodiments, it offers a series name and a short description. The favorites panel may include desirable features such as content filtering, search/electronic programming guide/navigation bars, silo mobility, taskflows, social TV, On-Demand TV, Live TV, hosted content, and content aggregation. In other embodiments, the lists may be displayed differently. Additionally or alternatively, certain content may be excluded or limitations enforced. In some embodiments, the content items 1904, for example, may be media agnostic. That is, the favorite content as illustrated in FIGS. 19A and 19B may include TV shows, movies, variety shows, applications, etc. The same rules apply for the variety shows and the movies as apply when a TV series or episode is in focus in the active content area 1408. The content area 1608 associated with favorite content generally includes an image thumbnail 1912 of the favorite item, and additional information, such as a series name, movie name, and/or a short description of the favorite content. Additionally, the content area 1608 may include a hotkey legend 1612 corresponding to one or more hotkeys 1612A to unmark content as a favorite (e.g., the blue hot key). In some embodiments, the red hot key may be a navigation button to go to the top of the panel (the first item selected in the list).

FIG. 19B shows the favorites panel 1412E when the user selects TV Series 1652C within the on demand application 456. An indicator, such as indicator 1640, may display which tab 1620D-F is selected or has the current focus. The indicator 1640 may be a box, line, spotlight, highlight, etc. in various embodiments. The user may select content within the content active area 1408 by selecting different top categories such as "Showcase" 1652A, "Movies" 1652B, "TV Series" 1652C, or "Variety" 1652D. Additionally, an indicator, such as indicator 1640B, may display which top category 1652 is selected or has the current focus. The indicator 1640B may be a box, line, spotlight, highlight, etc. in various embodiments. Within each top category 1652A-D the user may make additional selections to choose the desired content. For example, when the user has selected "TV Series" 1652C, the user may make additional selections such as "All" 1650A TV series, a specific TV series "Game of Kings" 1650B, "New" 1650C TV series, "My Favorites" 1650F TV series, "Top Watched" 1650E TV series, or "Recommended" 1650D TV series. Thus, if TV Series 1652C is selected and All content 1650A is selected, the favorites panel 1412E may show a list 1908 of favorite TV series. Each favorite item 1904 may comprise a thumbnail 1912, the TV series name, and a description. The info panel 1412E is horizontally scrollable and vertically scrollable. Thus, the navigation panel bar 1604 is horizontally scrollable and the panel content area 1608 may be vertically scrollable. As the favorites panel 1412E is used to navigate through various recommendations information about the displayed content, the favorites panel 1412E itself does not obstruct the user from viewing content displayed on the screen of the intelligent television.

Additionally, a shortcut area 1516 may provide access to frequently used applications, sources, or areas of the Intelligent TV 100. As illustrated in FIG. 19B, shortcut area 1516 displays an icon for a browser 1520A, an icon for a settings menu 1520B, and an icon for alerts 1520C.

The information panel provides the user with information related to the current active view. For example, if the user is watching Episode 5 of a TV series from Video On Demand, then the information panel provides the information about Episode 5. Alternatively, if the user is watching Live TV, then Information Panel provides the information on currently playing program, the channel, etc. The on demand info panel 1412A provides contextual content and helps the viewer quickly access related functionality. All views are accessible via D-Pad within the panel.

Figure 20A:
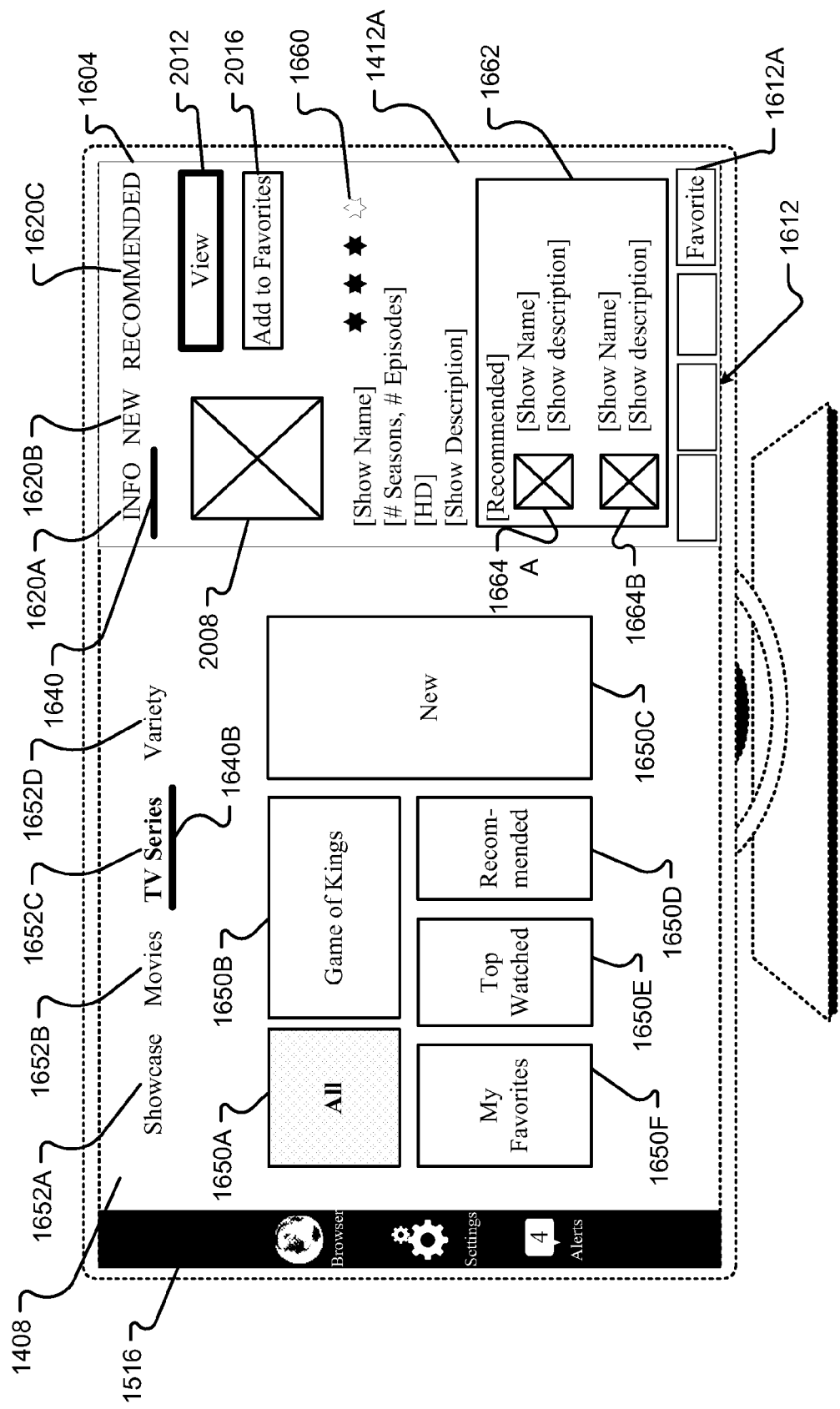
FIG. 20A illustrates a second content view in accordance with at least one embodiment of the present disclosure.

FIG. 20A shows one embodiment of the user interface and behavior for the application panel 1412 in the video on demand application 456 when the info panel 1620A is selected, including three of the application panel's 1412 six views: Info 1620A, New 1620B, Recommended 1620C, Genre, Favorites, and Search. The info panel 1412A for episode view appears when the user has an episode in view or is watching any TV episode. The video playback should not be interrupted while the user navigates the info panel 1412A. Additionally, as the info panel 1412A is used to navigate through various recommendations information about the displayed content, the info panel 1412A itself does not obstruct the user from viewing content displayed on the screen of the intelligent television.

In accordance with some embodiments of the present invention and as previously described, a user may select a panel view 1620A corresponding to info, as illustrated in FIG. 20A. An indicator, such as indicator 1640, may display which tab 1620A-C is selected or has the current focus. Application panel 1412 may then display context specific information corresponding to the active content area 1408. The application panel 1412 may include information specific to the video on demand application 456—for example a show name and the number of seasons, episodes, etc. Additionally, a thumbnail image 2008 corresponding to a specific show may be displayed in the info panel 1412A. The thumbnail 2008 may be a large thumbnail that is a large poster view for the series.

If a thumbnail is not available, then a generic series thumbnail 2008 will be used. The thumbnail 2008 is not selectable in some embodiments. Moreover, the info panel 1412A may utilize one or more panel content types discussed in FIGS. 17A-17B. For example, an additional information region 1662 may display a mini-list of recommended shows displaying the show name and show description and pertaining to the active content area 1408. For example, a mini-list of recommended shows 1662 displaying the show name and show description and pertaining to the active content area 1408 may be displayed in the application panel 1412. Alternatively, a mini-list of the next episodes displaying the show name and show description may be provided in additional information section 1662. Moreover, additional information pertaining to the active content area 1408 may be presented to a user in the additional information region 1662. Information such as the title of the show, the number of seasons for the show that have at least one available episode on the system, the number of episodes for the show/series available on the system, a description of the program (i.e., the description of the series' metadata), characteristics of the program (for example HD, Dolby, and category), and the number of stars 1660 a show receives may also be displayed. Options such as "View" 2012 (to view details about a series or to launch the series digest view) or "Add to Favorites" 2016 (to add an item to a favorites list) may also be available to the user. The View button 2012 is the default focus on the info panel 1412A. The thumbnail 2008, View button 2012, and the Add to Favorites button 2016 may be called the preview content area because it allows the user to preview the content before viewing the content. When the user is in the video on demand application 456, and the user has selected TV Series 1652C, the information panel 1412A allows the user to mark a series as a favorite via an episode screen in the application panel 1412 rather than having to go back to view the entire series. Additionally or alternatively, when the user is in the video on demand application 456 and the user has selected TV Series 1652C, the info panel 1412A allows the user get information on that series before the user watches the series. Thus, if the user has not yet selected a series to view in the active content area 1408, but rather is getting information about the series before viewing the series, the user may select View 2012 in the info panel 1412A to view the series in the active content area 1408.

An indicator, such as indicator 1640, may display which tab 1620A-C is selected or has the current focus. The indicator 1640 may be a box, line, spotlight, highlight, etc. in various embodiments. The user may select content within the content active area 1408 Master View by selecting different top categories such as "Showcase" 1652A, "Movies" 1652B, "TV Series" 1652C, or "Variety" 1652D. Additionally, an indicator, such as indicator 1640B, may display which top category is selected or has the current focus. The indicator 1640B may be a box, line, spotlight, highlight, etc. in various embodiments. Within each top category 1652A-D, the user may make additional selections to choose the desired content. For example, when the user has selected the top category "TV Series" 1652C, the user may make additional content selections by selecting tiles 1650 such as an "All" 1650A tile, a specific TV series "Game of Kings" tile 1650B, a "New" tile 1650C, a "My Favorites" tile 1650F, a "Top Watched" tile 1650E, or a "Recommended" tile 1650D. Thus, if top category TV Series 1652C is selected and the Game of Kings tile 1650B is selected, the info panel 1412A content area 1408 may show information about that specific TV series. The information may comprise a thumbnail 2008, the show name, number of seasons, number of episodes, information about the series (HD, Dolby, category, closed captioned, etc.), a description, and the rating 1660. The info panel 1412A content area 1608 may also include a hotkey legend 1612 corresponding to one or more hotkeys 1612A to add the entire series or an episode to a favorites list or remove the series or episode from a favorites list. If the user has an episode in view in the active content area 1408, the favorite hot key 1612A will mark the series (not the episode) as a favorite or remove the series from favorites. The watched hot key 1612B toggles the watched status of the episode. If the watch button is in focus (not shown), pressing the select key on the remote dismisses the panel and plays the episode from the beginning. If the video is already playing, pressing select dismisses the panel. If the video is paused, pressing the select key dismisses the panel and resumes the video.

Additionally, a shortcut area 1516 may provide access to frequently used applications, sources, or areas of the Intelligent TV 100.

Figure 20B:
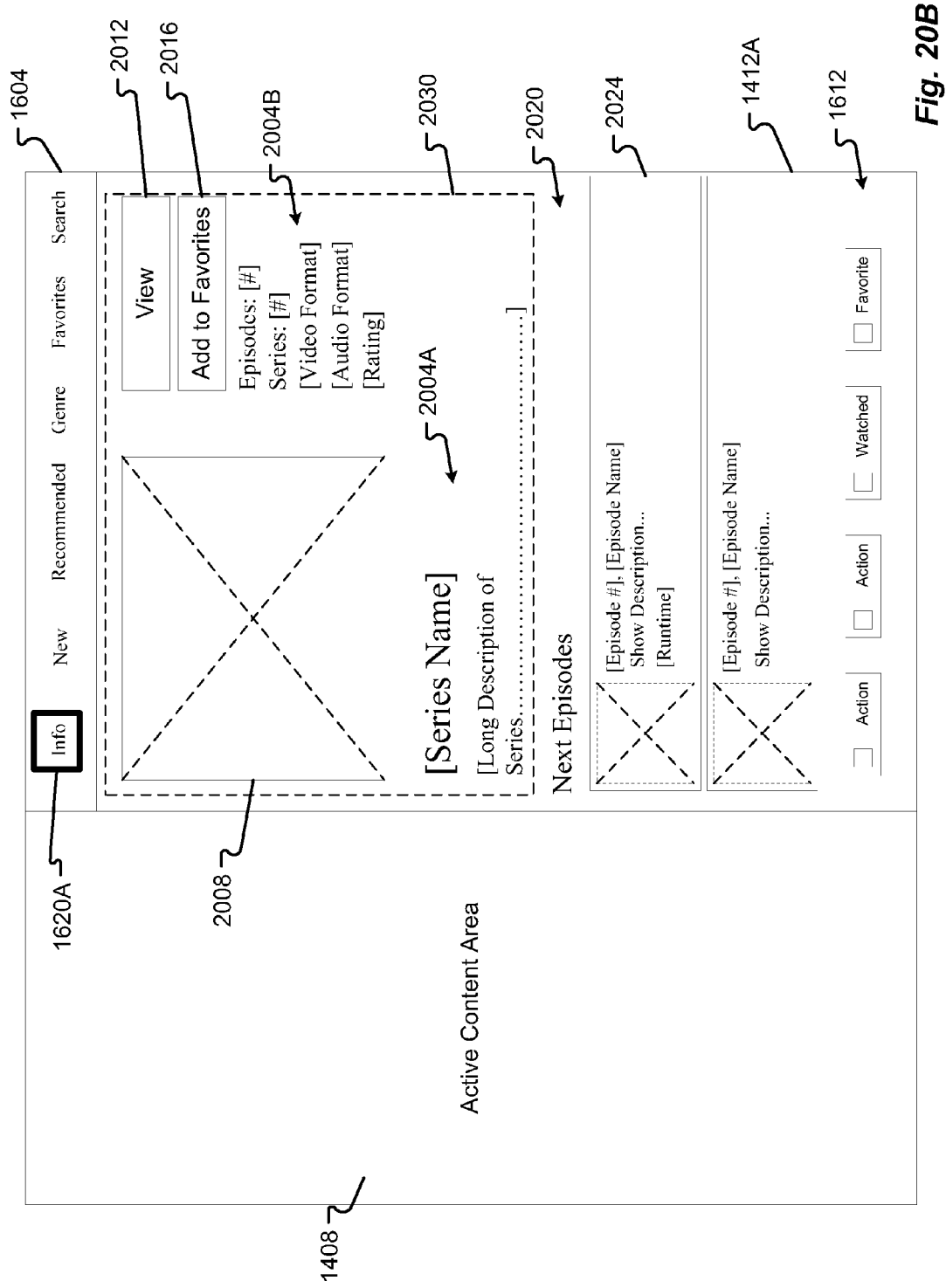
FIGS. 20B-20C illustrate a layout and display of content in accordance with embodiments of the present disclosure.

FIG. 20B depicts an example when the info panel tab 1620A has a focus, i.e., the info panel 1412A is selected and shown, in accordance with some embodiments of the present disclosure. When the info panel view 1620A has a focus, an info panel type, such as series info 1704A, may be presented in a detailed information region 2030. The series info 1704A may be presented when the content displayed in the content active area 1408 is associated with content having series information, such as video on demand 456 TV series 1652C. The info panel 1412A may include series information 2004A and 2004B, a view button 2012, a favorite button 2016, and a thumbnail display of the series information 2008. The series information 2004A and 2004B may comprise information related to or associated with content having series information, such as a TV series, or the like. The series information 2004A and 2004B may include the series name, a season, an episode number, and episode name, a long description of the series, video format (the resolution of the series episodes), audio format, rating, and series number. Of course additional information relating to a series may be displayed.

The detailed information region 2030 for a TV Series Episode may container similar information to the detailed information region 2030 for other content types. Specifically, the large information label 2004 may contain episode name, episode number, episode description, runtime, air date, video format, audio format, and a rating.

The detailed information region 2030 for a Movie may container similar information to the detailed information region 2030 for other content types. Specifically, the large information label 2004 may contain movie name, runtime, description, video codec, audio codec, video format, audio format, and/or rating.

Moreover, an info panel 1412A content area 2020 may provide "Next Episode" information. Next episode information may comprise a list content area 2024 corresponding to the next episodes, if any, of a selected episode. The list content area 2024 may include a thumbnail of the next episode and/or additional episode information, such as episode number, episode name, air date, video format, audio format, rating, file location, description, and runtime information. In some embodiments, the hot keys 1612A-D may be different colors and may correspond to action buttons or navigation buttons. In one embodiment, the Favorites hot key 1612A may be blue.

Figure 20C:
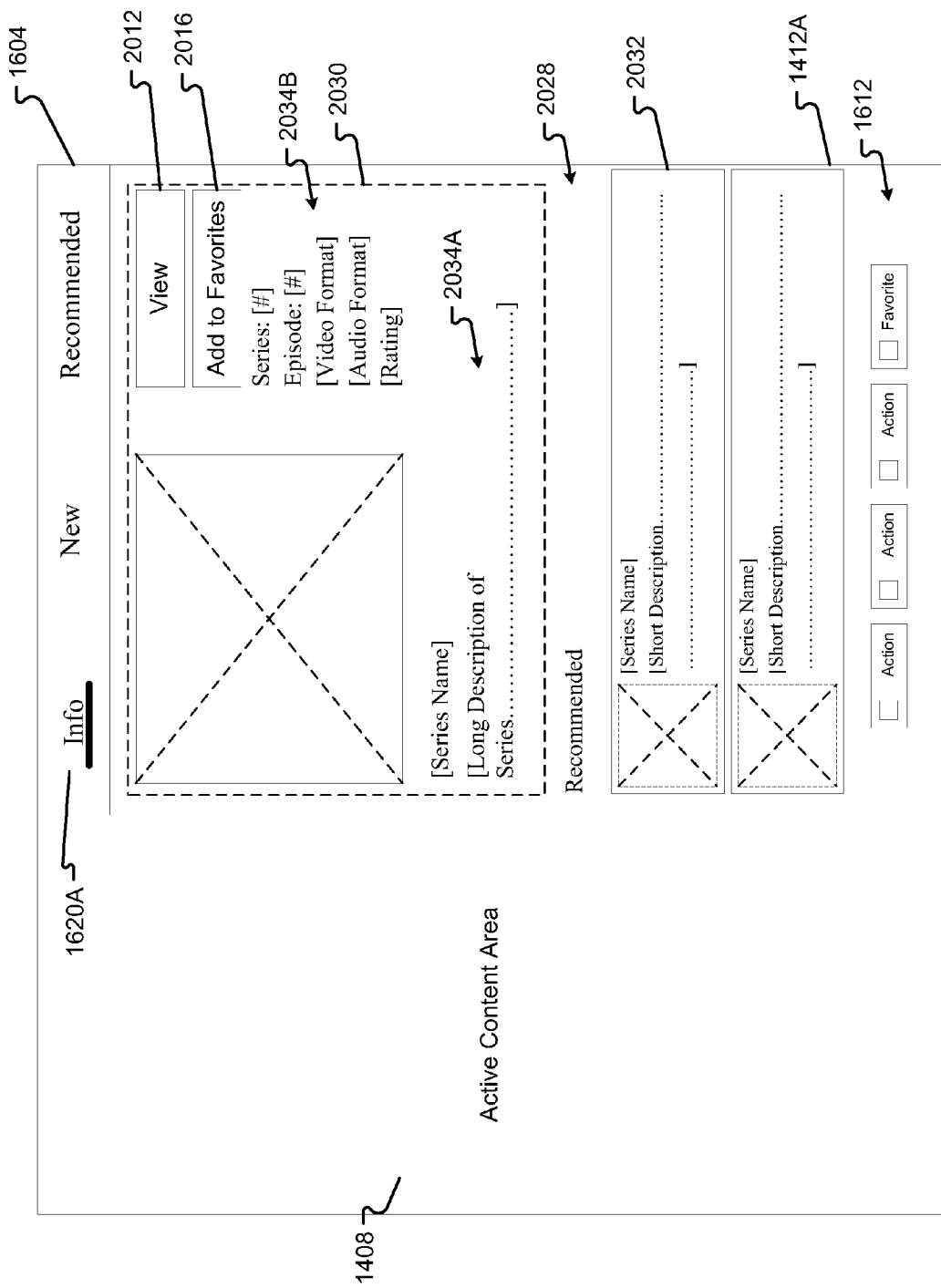

FIG. 20C depicts another example of the info tab 1620A, i.e., the info panel 1412A, having a focus in accordance with some embodiments of the present disclosure. When the info panel view 1620A has a focus, an info panel type, such as panel type 1704A may be presented in a detailed information region 2030. Panel type 1704A may be presented when the content displayed in the content active area 1408 is associated with content having series information. The series panel type 1704A may include series information 2034A and 2034B, a view button 2012, a favorite button 2016, and a thumbnail display of the series information 2008. The series information 2034A and 2034B may comprise information related to or associated with content having series information, such as a TV series, a Movie series, or the like. The series information 2032A and 2034B may include the series name, a season, an episode number, a long description of the series, video format, audio format, rating, and series number. Of course additional information relating to a series may be displayed.

Moreover, an info panel 1412A content area 2028 may provide "Recommended" information in a list content area 2032. Recommended information may comprise content items corresponding to the recommended episodes or content, if any, based on a selected content. The content items may include a thumbnail, the name of a series, and a short description of the series.

Figure 20D:
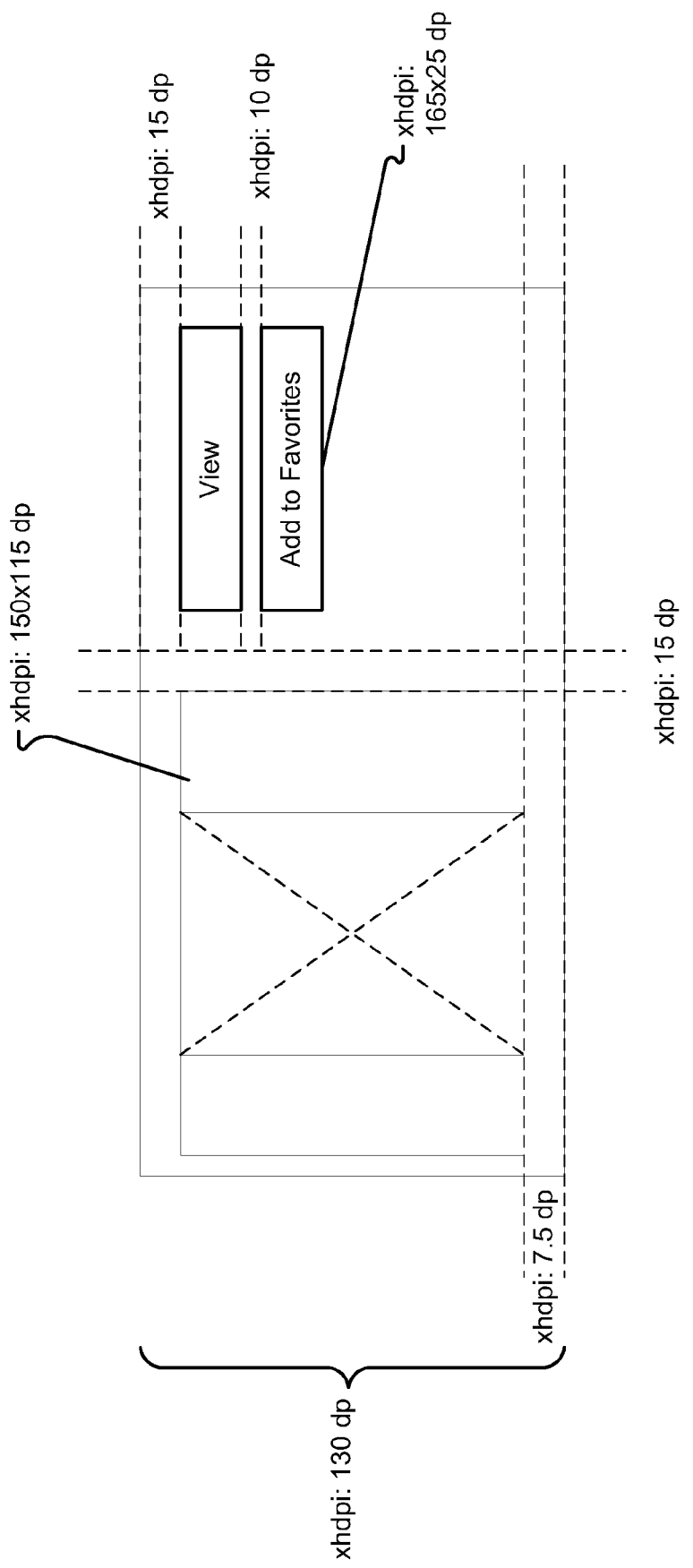
FIG. 20D illustrates a layout and display of content in accordance with embodiments of the present disclosure.

FIG. 20D shows the thumbnail alignment in the block in the info panel 1412A in the detailed information region 2030. The embodiment shown may be used in the info panel 1412A when the user is previewing a TV series episode or when the user is previewing a series. In some embodiments, the mode fit-content may be used for scaling. Additionally xhdpi 10 dp may be positioned between any text in the description. Other characteristics of the description in the info panel 1412A detailed information region 2030 include the name of the series in large font size, 19 sp, gray 1 font color (#F0F0F0). Characteristics of the other font in the info panel 1412A detailed information region 2030 may be in medium font size, 15 sp; gray 1 font color (#F0F0F0); and right alignment. The description of the information in the list content area 2032 may be in medium font size 15 sp; gray 1 font color (#F0F0F0); and right alignment. These fonts maybe used when the user is previewing a TV series episode or when the user is previewing a series.

Figure 21A:
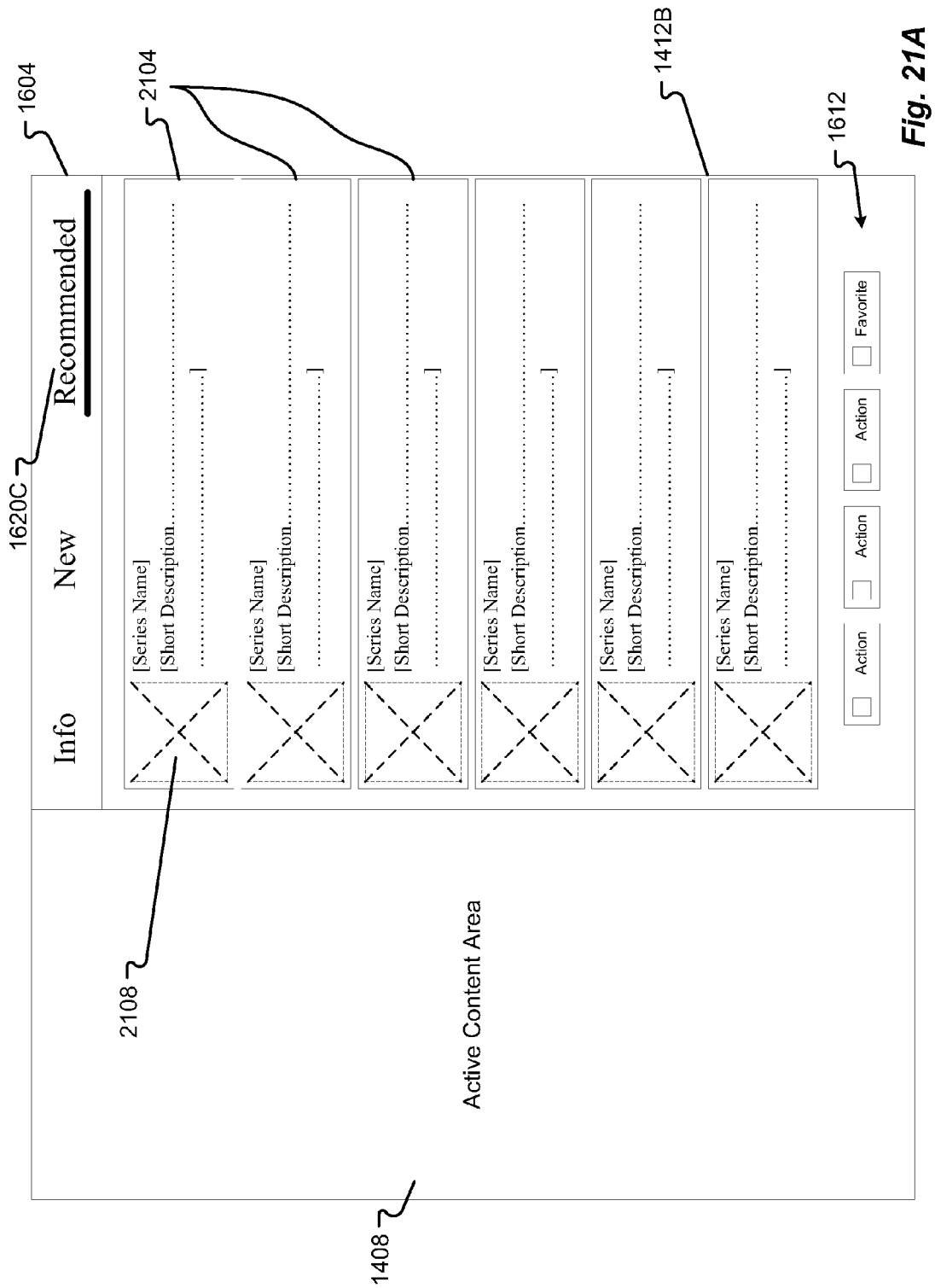
FIG. 21A illustrates a seventh panel view in accordance with embodiments of the present disclosure.
Figure 21B:
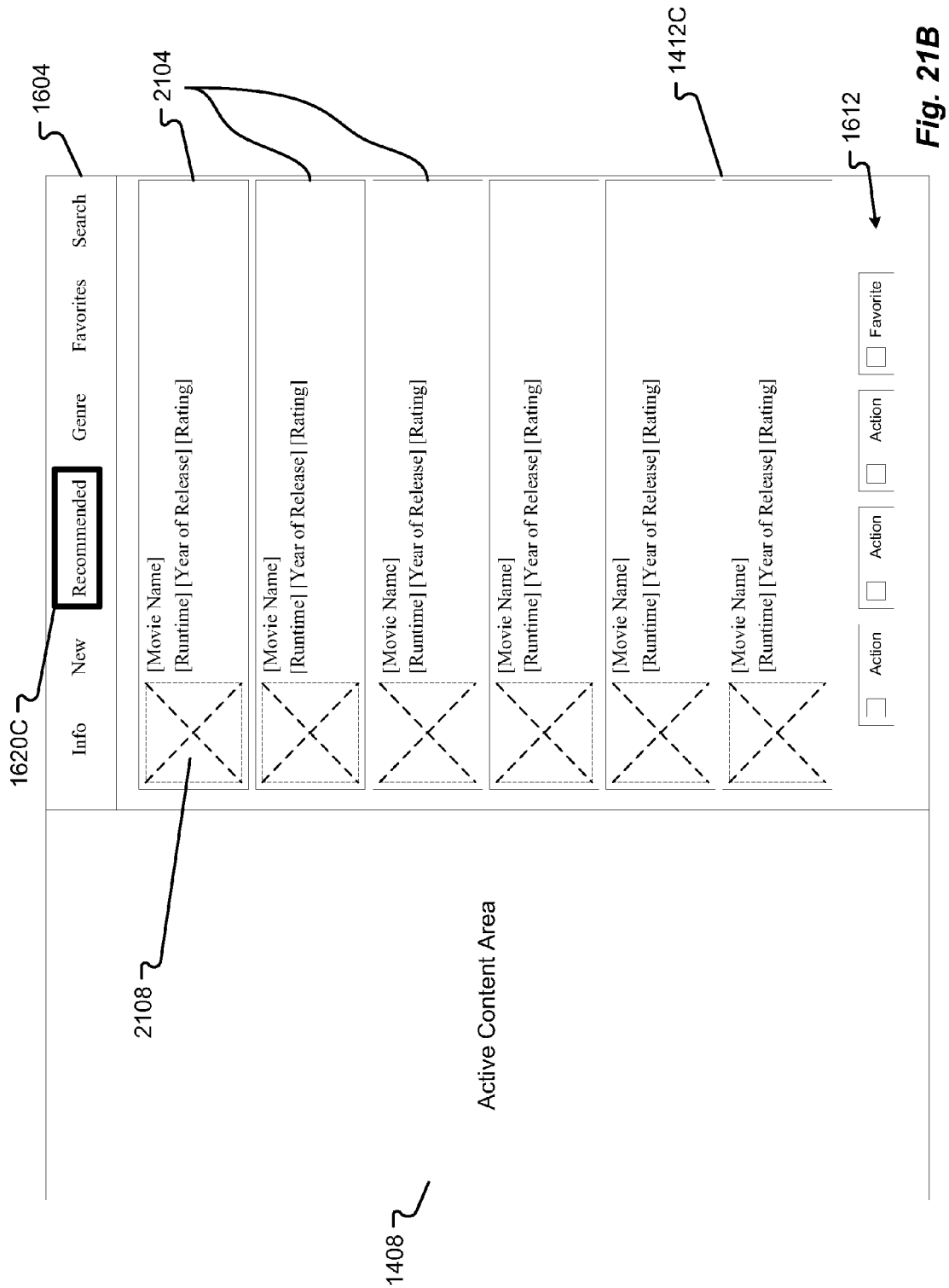
FIG. 21B illustrates an eighth panel view in accordance with embodiments of the present disclosure.

In accordance with some embodiments of the present disclosure, application panel 1412 may display recommended content when the recommended tab 1620C has the focus, as illustrated in FIGS. 21A and 21B. For example, based on one or more content that has been viewed by a user and/or based on content currently being viewed in the active content area 1408, recommended content may be displayed in application panel 1412. The recommended content may include content area 2104 containing an image thumbnail 2108, and information associated with the content, such as a series name and a short description.

In some embodiments, the recommended panel 1412C provides a collection of recommendations from the content provider. These recommendations are contextual and based on the current series. The order of the recommendations is controlled by the video on demand service. The type of recommendations shown is contextual to the media type in focus in the active content area 1408. The recommended panel 1412C provides the user with recommended contents related to the current active view. For example, if the user is watching Episode 5 of a TV series in video on demand, then the recommended panel 1412C provides recommended TV series related to Episode 5.

When a TV Series or episode is in focus (or playing) the recommended panel 1412C provides a vertical scrollable collection of series. The same rules apply for Variety Shows and Movies. The maximum number of items 2104 in the list is 20. The results are provided and ordered from the content provider. A Variety Show recommended panel 1412B may look the same as the TV Series recommended panel 1412C shown in FIG. 21A.

The recommended panel 1412C is vertically scrollable. The navigation panel bar 1604 is horizontally scrollable and the panel content area 1608 may be vertically scrollable. Additionally, as the recommended panel 1412C is used to navigate through various recommendations in the application panel 1412, the recommended panel 1412C itself does not obstruct the user from viewing content displayed on the screen of the intelligent television.

The user can also use hot key to mark any applicable items as favorite, or remove it from favorites. The layout of recommended panel 1412C remains consistent across views. The red hot key may be a navigation button to go to the top of the panel (the first item selected in the list).

Figure 22:
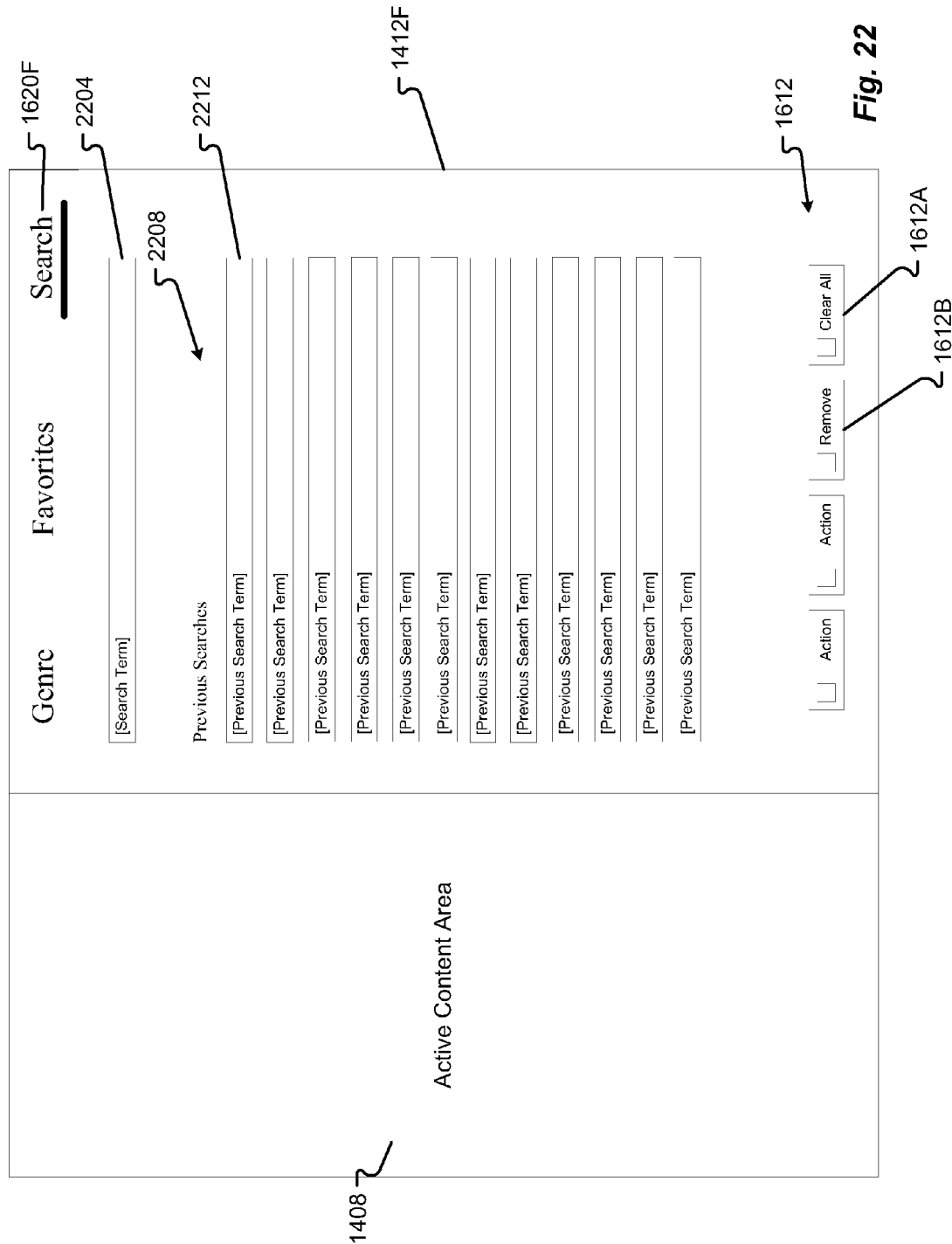
FIG. 22 illustrates a ninth panel view in accordance with embodiments of the present disclosure.

In accordance with some embodiments of the present disclosure, application panel 1412 may display content resulting from a user search when the tab 1620F has the focus, as illustrated in FIG. 22. The search panel 1412F allows the user to search for media within the video on demand space. For example, based on a search term or terms entered into a search box 2604, content matching the search term or terms may be returned to a user. Moreover, as the search panel 1412F is used to navigate through a search on the intelligent television, the search panel 1412F itself does not obstruct the user from viewing content displayed on the screen of the intelligent television. Prior to searching however, a content panel, such as content panel 1712A, may first be displayed. Content panel 1712A may contain a one or more previous search terms 2208 and display each specific search term 2212 for a user to navigate to and select. Therefore, if a user decides to select a previously searched term based on the previous searches 2208, search results matching the previously searched term may be displayed. The previous search terms are listed with most recent searched terms appearing on the top of the list. The maximum number of previous search terms displayed is 10. This is the view the user sees prior to filling in the search terms. Alternatively, or in addition, a user may enter one or more search terms into the term box 2604. The results of the search (not shown), either based on the search terms, or based on the previous search, may then be displayed to a user using a content panel, for example.

The search panel 1412F is vertically scrollable. The navigation panel bar 1604 is horizontally scrollable and the panel content area 1608 may be vertically scrollable. The hot keys 1612 for the search panel 1412F prior to searching may include a green hot key 1612B to remove a selected term 2212 from the search history and/or a blue hot key 1612A to clear all search history. The up and down arrows on the remote allow the user to scroll vertically through the search term list 2208. If a previous search term is in focus, pressing the select key on the remote initiates the search process with the selected search term and takes the user to the search results.

Figure 23:
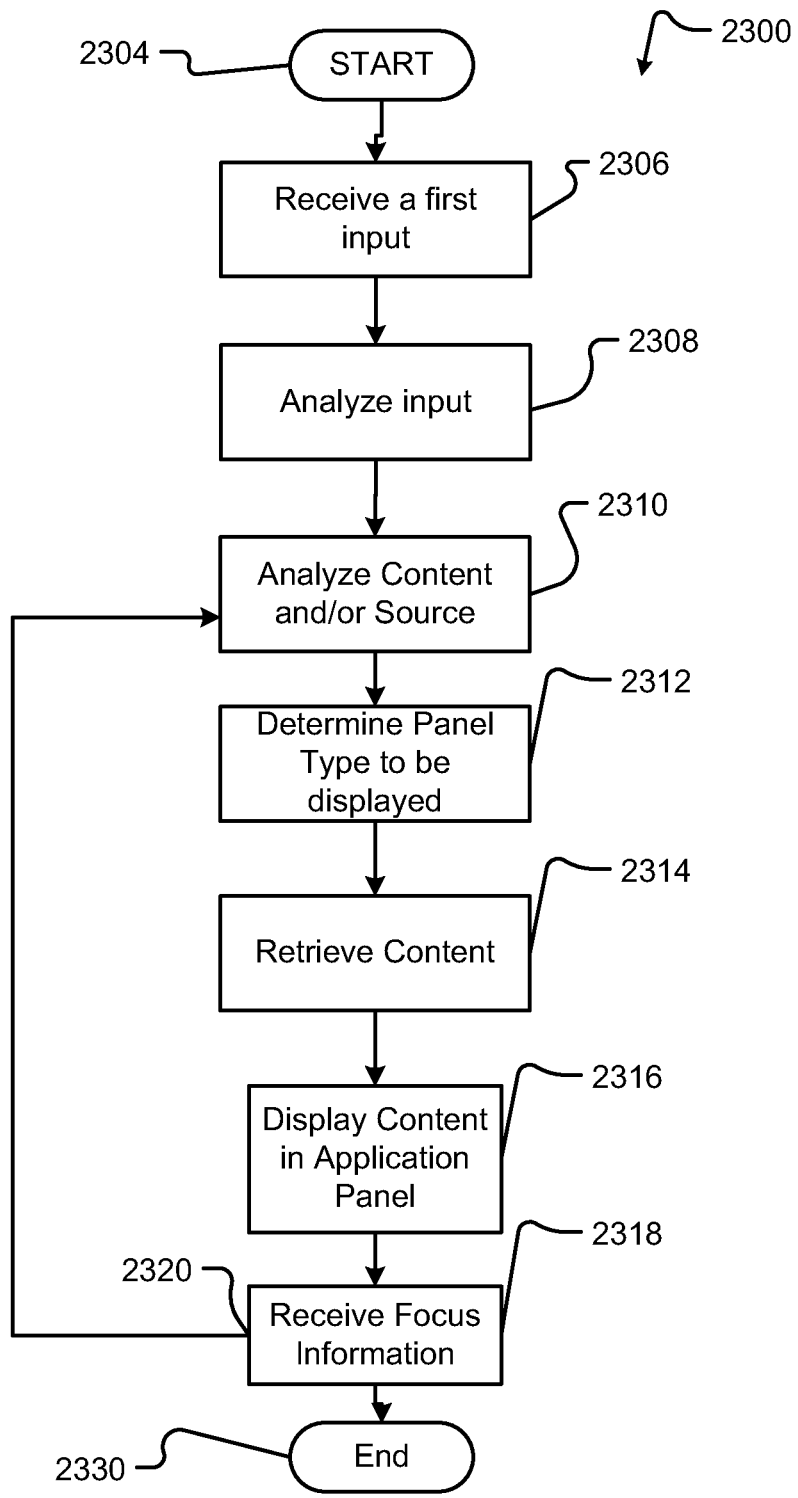
FIG. 23 is a flow diagram depicting a content panel and panel type selection process in accordance with embodiments of the present disclosure.

FIG. 23 is a flow diagram of an embodiment of a method 2300 for selecting and displaying one or more panels for viewing by a user. Method 2300 is in embodiments performed by a device, such as device 100. More specifically, one or more hardware and software components may be involved in performing method 2300. In one embodiment, one or more of the previously described modules perform one or more of the steps of method 2300. The method 2300 may be executed as a set of computer-executable instructions executed by a computer system and encoded or stored on a computer-readable medium. Hereinafter, the method 2300 shall be explained with reference to the systems, components, modules, software, etc. described in conjunction with FIGS. 1-22.

Method 2300 may continuously flow in a loop, flow according to a timed event, or flow according to a change in an operating or status parameter. Method 2300 is initiated at step 2304. Step 2304 may flow to step 2306 where an intelligent television 100 receives an input from a remote or channel changer associated with a user. Based on the remote or channel changer input, the step 2306 may flow to step 2308, where the input received is analyzed. If, at step 2308, it is determined that the analyzed input corresponds to the display of an application panel, such as application panel 1412, then, at step 2310, the content displayed in the active content area 1408 and/or the source is analyzed. At step 2312, a panel type is selected; the panel type may correspond to one or more panel types as described with reference to FIGS. 17A-17B. At step 2314, content information to populate the panel type is retrieved, and the content is then displayed at step 2316 in the application panel. After step 2316, additional focus information may be received at step 2318. Upon receiving additional focus information, the method 2400 may repeat at step 2310, where the content in the active content area and/or the source is analyzed. Alternatively, or in addition, the method 2400 may end at 2330.

Figure 24:
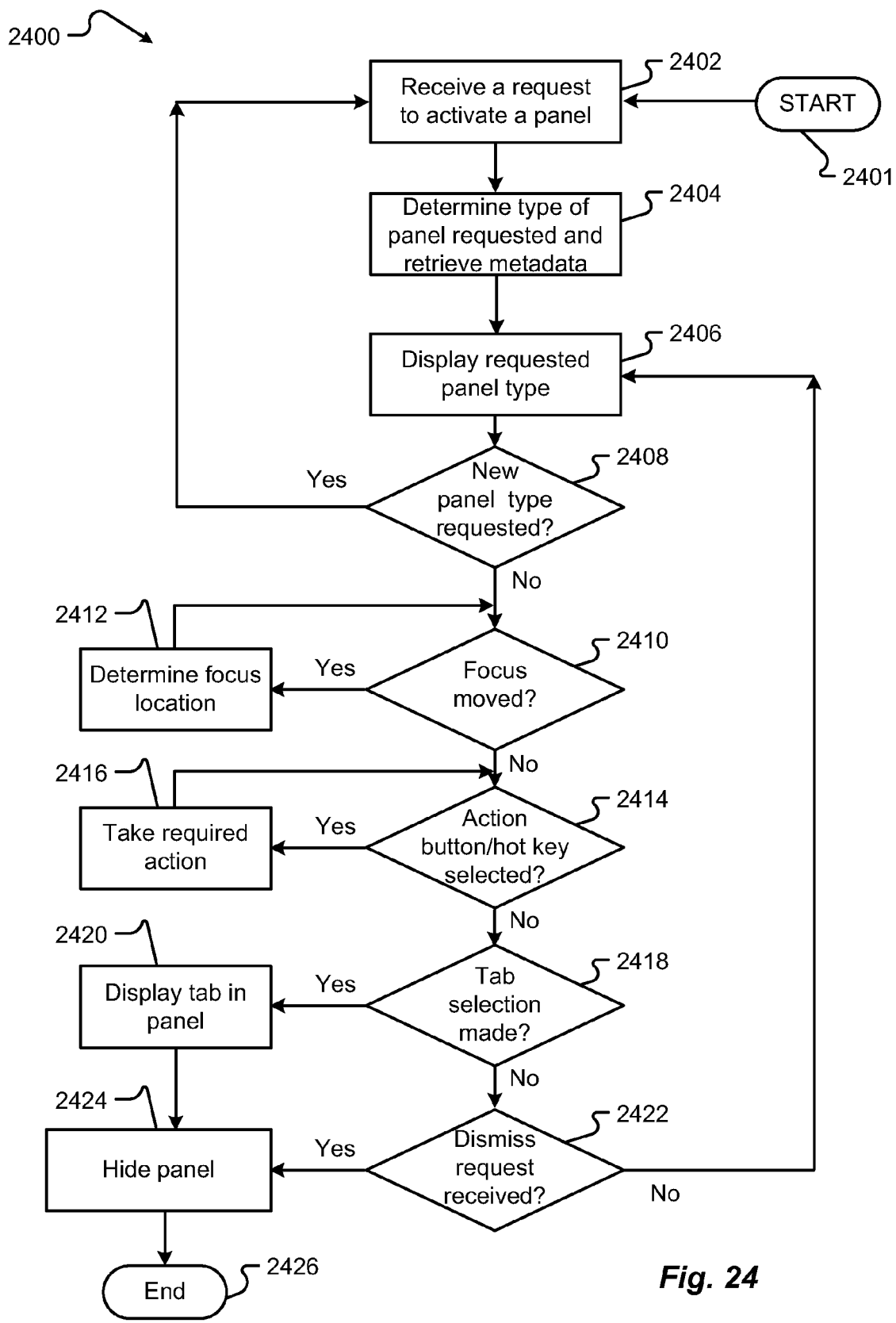
FIG. 24 is a second flow diagram depicting a content panel and panel type selection process in accordance with embodiments of the present disclosure.

FIG. 24 is a flow diagram of an embodiment of a method 2400 for displaying an application panel. Illustratively, the elements described herein may be stored-program-controlled entities, and a computer or processor 364 can perform the method 2400 of FIG. 24 and the processes described herein by executing program instructions stored in a tangible computer readable storage medium, such as a memory 308 or data storage 312. Although the method 2400, described in FIG. 24, is shown in a specific order, one of skill in the art would recognize that the method in FIG. 24 may be implemented in a different order and/or be implemented in a multi-threaded environment. Moreover, various steps may be omitted or added based on implementation. Hereinafter, the method 2400 shall be explained with reference to the systems, components, modules, software, etc. described in conjunction with FIGS. 1-23.

The method 2400 starts 2401 when a user sends a request to activate a panel. The user may activate a panel through various commands, such as by selecting the application panel button, touching the touch sensitive display screen 212, by speaking a voice command, by providing a gesture using the gesture capture regions 224, 228, by operating a pointing device 168i, and/or the like. An input event manager 508 is operable to receive the request 2402 and is operable to determine the type of panel requested 2404. After determining the type of panel requested 2404, the input event manager 508 can send the request to the panel manager 536. The panel manager is operable to retrieve metadata from memory 308 associated with the media item that had focus when the user requested activation of the panel and based on the type of panel requested. If the Intelligent TV 100 recognizes the individual user, the panel manager 536 may retrieve metadata specific to the recognized individual user from the local database 1340 and/or database 640. The panel manager 536 may also retrieve metadata from media data service 628 that is in communication with one or more internal and/or external content providers 616. After the personal metadata is retrieved, the panel manager can display the requested application panel type 2406.

After the user has activated a panel, the user may request a new panel type by navigating left or right using various commands. The input event manager 508 is operable to determine if a user requests a new panel type. If a user requests a new panel type 2408, the input event manager receives the request 2402, determines the type of panel requested 2404, and sends the request to the panel manager 536 which can display the requested panel type 2406.

A user may navigate focus within the application panel to display more information about an item, change tabs, or to move focus to an action button. The input event manager 536 is operable to determine 2410 focus has moved. If focus has moved, the input event manager is operable to determine a new focus location 2412. If the new focus location requires a change to the information displayed in the panel, the input event manager is operable to send the new focus location to the panel manager 536 which can update the panel. The panel manager 536 may resize and or reposition the panel and the information and/or lists displayed within the panel as necessary when focus is moved.

The user may use hot keys 1612A-D or action buttons such as, but not limited to, the view button or add to favorites button. The input event manager 508 is operable to determine 2414 if a user has selected a hot key or an action button and to determine the action required 2416. The input event manager 508 may then send a requested action to the panel manager 536, the application panel application 456, and/or the settings panel 524, as necessary. For example, if the user selects a favorite button or hot key to tag a media item with focus as a favorite, the input event manager 508 would receive the request 2414 and send the request 2416 to the application panel application which may update the metadata stored in memory 308 to tag the media item as a favorite.

If a user navigated focus to an action button or a media item in a list displayed by the panel 2410, the user may select the button or media item with focus to make a media item selection and view the selected media item. A user may also press a hot key to make a media item selection. When a panel tab selection is made 2418, the input event manager 508 can receive the selection and determine the actions required. The input event manager 508 may send the selection to the user interface application 468 which may display 2420 the selected tab. After displaying the selected tab in the application panel, the tab content information may be requested. The input event manager 508 may send the content information to the user interface application 468 which may display the tab content information in the tab.

The user may send a command to exit or dismiss 2422 the application panel and, if so, the input event manager 508 may send the command to the panel manager 536 which may dismiss or hide 2424 the application panel and the process 2400 may then end 2426. Of course, one of skill in the art will recognize that the user can send a command to exit the application panel at any point in method 2400.

Figure 25:
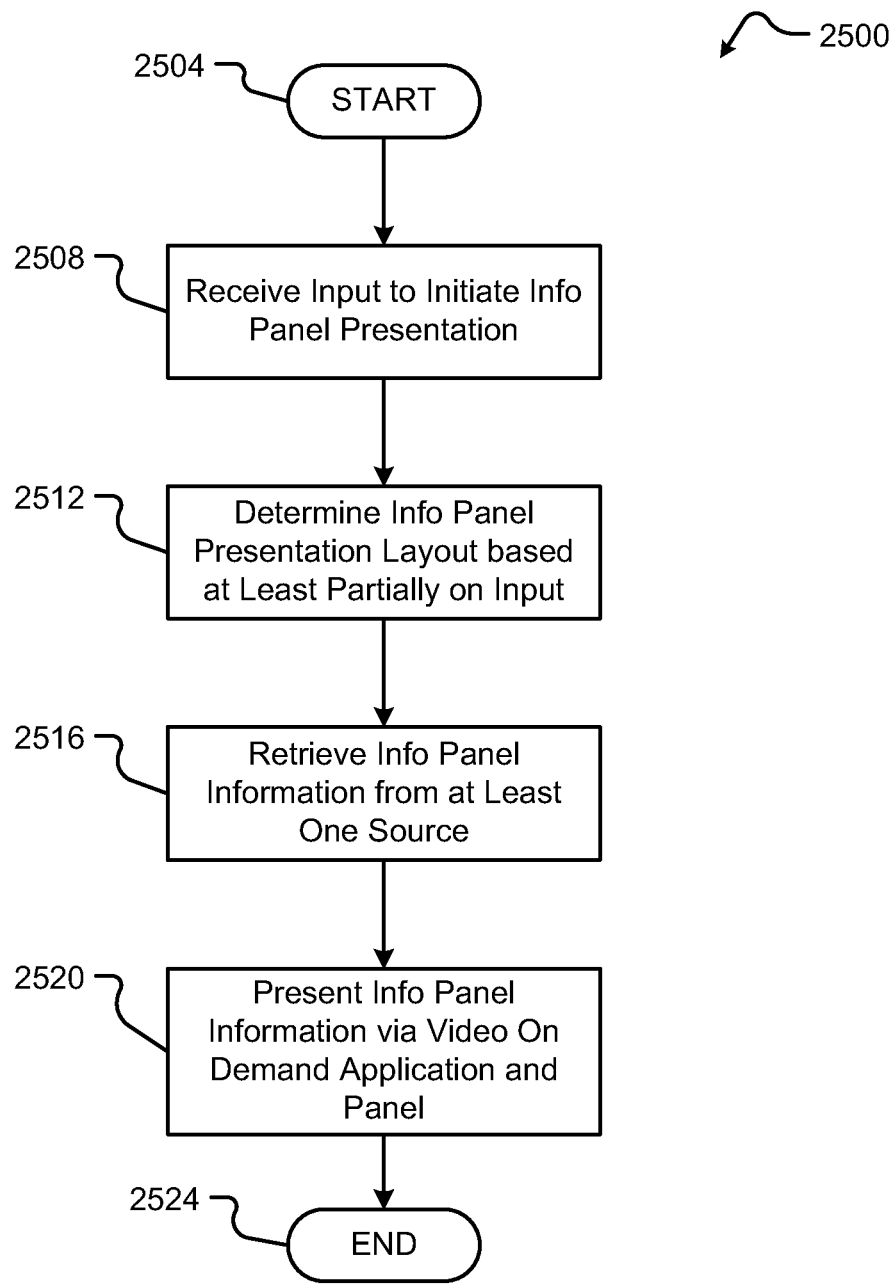
FIG. 25 is a flow diagram depicting an info panel presentation method in accordance with embodiments of the present disclosure.

FIG. 25 shows a flow diagram depicting an info panel presentation method 2500 in accordance with embodiments of the present disclosure. The method 2500 begins at step 2504 and proceeds when the Intelligent TV 100 receives input to initiate the info panel presentation (step 2508). In some embodiments, the info panel may be initiated by a user providing an input via a remote control or other input device. In one example, a user may activate the application panel 1412 by providing an input via the remote control or other device. Once the application panel is presented to the Intelligent TV 100, the user may navigate along the application panel navigation bar 1604 and shift the select-focus to the info panel region 1620A. In another example, a user can provide an input via a hotkey, or other button, associated with a remote control or other device that may cause the application panel 1412 to display the info panel directly. In other words, the user would not be required to navigate through regions on the application panel navigation bar 1604 to display the info panel. In yet another example, the info panel may be automatically displayed by the Intelligent TV 100 in response to detecting a condition stored in rules.

Next, the info panel presentation layout is determined by the Intelligent TV 100 (step 2512). This determination may be based at least partially on the input that initiated the info panel presentation. For example, if an input is provided to display a video on demand-based info panel, the Intelligent TV 100 would determine a video on demand-based info panel to present via the application panel 1412. On the other hand, if an input is provided to display a time-based info panel, the Intelligent TV 100 would determine to present a time-based info panel via the application panel 1412. Rules stored in a memory associated with the Intelligent TV 100 may dictate the presentation layout. In some embodiments, the rules stored in a memory may include one or more info panel information layout templates. The one or more info panel information layout templates may correspond to a layout template that arranges content that makes up the info panel information. As can be appreciated, the info panel information layout template may be associated with a specific info panel presentation input and/or video on demand content playing in the content view area 1408 as an info panel presentation input is received. In one embodiment, an info panel presentation input may be matched to stored info panel inputs to determine a select info panel information layout template for the presentation of the info panel information.

In some embodiments, the info panel presentation layout may include at least one position associated with content that makes up the info panel information. The at least one position may correspond to a position of the content within a video on demand application panel 1412. In some embodiments, the info panel presentation layout may include specific content that makes up the info panel information. For example, an info panel presentation layout may be determined to include a thumbnail graphic, a preview window, and a time scale. In another example, the info panel presentation layout may be determined to present the info panel information in a particular arrangement, position, location, space, size, and/or combinations thereof relative to the application panel 1412.

The method 2500 continues by retrieving info panel information from at least one source (step 2516). In some cases, the Intelligent TV 100 may retrieve program information from over-the-air channel signals. Typically, the program information provided in such signals is limited to simple text-based descriptions. However, the Intelligent TV 100 may be connected to a network (e.g., the Internet) and as such, may retrieve detailed program information, graphics, additional content, multi-media, and the like. Accordingly, the Intelligent TV 100 may compare, select, and/or aggregate information retrieved from at least one source.

At step 2520, the Intelligent TV 100 presents the info panel information retrieved in step 2516 via the video on demand application 456 and panel 1412. The info panel information may be presented in the predetermined info panel presentation layout. Additionally or alternatively, the arrangement of the presented info panel information may be altered via user input. The method 2500 ends at step 2524.

Figure 26:
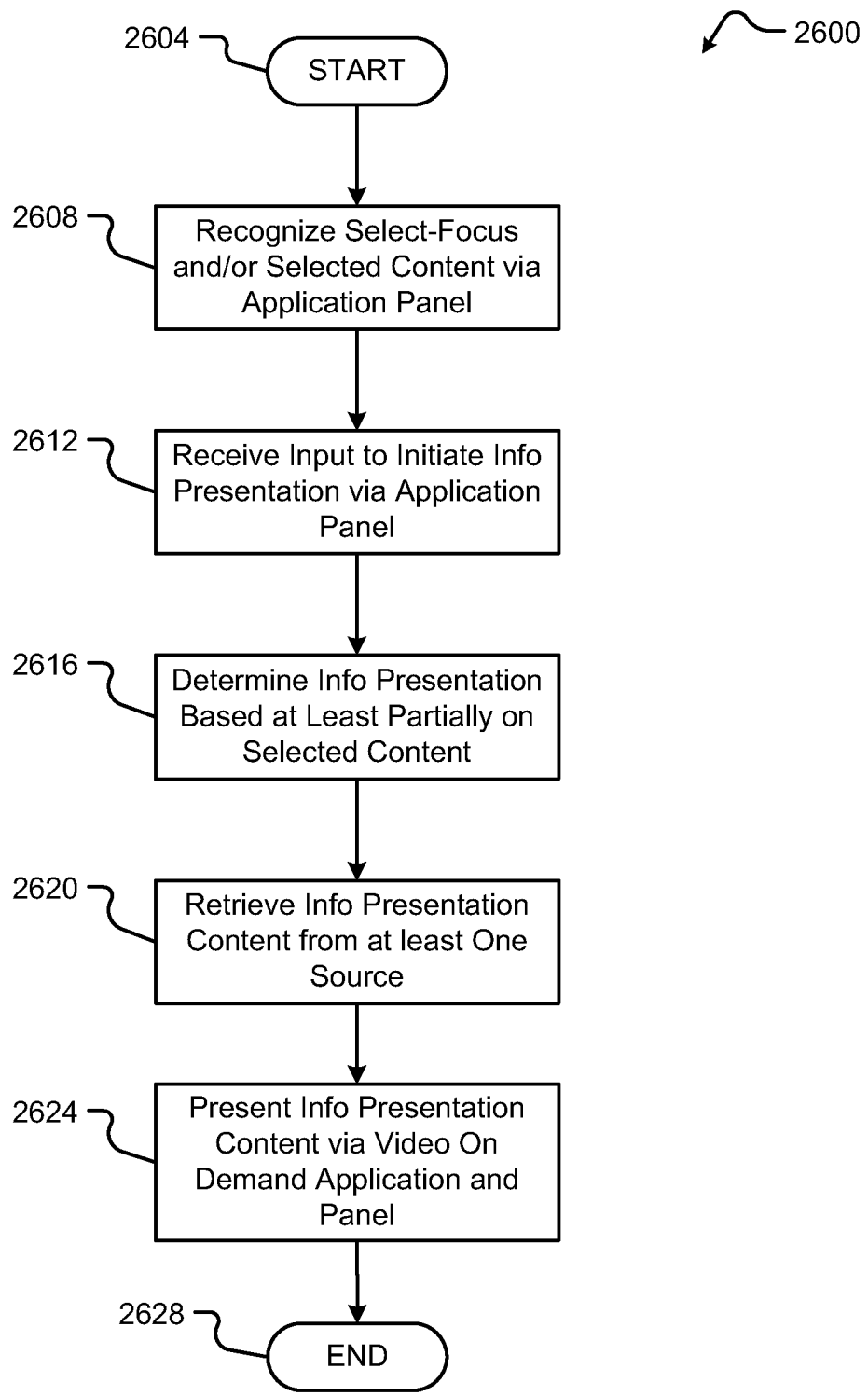
FIG. 26 is a flow diagram depicting an information panel presentation method in accordance with embodiments of the present disclosure.

FIG. 26 shows a flow diagram depicting an information panel presentation method 2600 in accordance with embodiments of the present disclosure. The method 2600 begins at step 2604 and proceeds by recognizing a select-focus and/or selected content via the application panel 1412 (step 2608). In some embodiments, the select-focus may correspond to a position of a user's cursor, or indicator 1640, on the application panel 1412. A select-focus may include a default focus associated with one or more of the fixed tab regions 1620. The select-focus may be moved via a user input from a remote control or other input device. One example of moving or shifting the select-focus may include providing a directional input via a remote control. Selected content may be recognized via an input provided in association with a selection-focus. Additionally or alternatively, selected content may be recognized by detecting an input that is independent of a selection-focus. For example, although an indicator 1640 may be associated with a portion of the application panel 1412, a user may provide an input corresponding to a different portion of the application panel 1412. In this example, a user may select a program hotkey, provide a directional input (e.g., up, down, left, right, angles, and combinations thereof), a swipe input, and/or a hold input to select content.

If the select-focus is associated with an info tab region 1620A, the method 2600 continues by receiving an input to initiate the information presentation via the application panel 1412 (step 2612). The input may be provided by a user via a remote control or other input device. In some embodiments, the user-provided input may be a selection input based on a corresponding position of a select-focus associated with the navigation bar 1604. In other embodiments, an informational input may be provided via an information button associated with a remote control or other input device. In this case, a select-focus may not be required to display informational content via the video on demand application panel 1412. Additionally or alternatively, the input may be provided via the Intelligent TV 100 in response to a condition. For example, a timer may be configured to change from video on demand content to a live TV channel on the Intelligent TV 100 at a given time. Once the channel is changed, the info tab 1620A may be automatically selected and information may be shown via the application panel 1412. This automatic selection and presentation may be provided by one or more of the components associated with the Intelligent TV 100. As can be appreciated, rules and/or preferences may be used to determine the automatic selection and/or presentation of information via the info panel tab 1620A and the application panel 1412.

Upon receiving an input to initiate the information presentation via the application panel 1412, the method 2600 continues by determining the presentation of information based at least partially on the selection (step 2616). The presentation of information may include, but is not limited to, a layout, a graphical representation, selected fields, descriptions, and the like. As such, certain presentations of information may be governed by the content related to the selection input. In one example, a selection input may be provided to show information relating to content playing via video on demand in the active content area 1408. Continuing this example, if a movie is playing in the active content area 1408, the information presentation selected for the application panel 1412 may include a movie name, a description, a cast list, a movie rating, a start and end time, and more. On the other hand, if a TV series is playing in the active content area 1408, the information presentation selected for display in the application panel 1412 may include the TV series name, a default image, the number of episodes in a series, the episode number of the currently playing episode, the season number, a description of the TV series and/or the specific episode, etc. In some embodiments, a size of the active content area 1408 may include the total viewable area of the Intelligent TV 100 display.

The method 2600 continues by retrieving the information presentation content from at least one source (step 2620). For instance, if the information presentation content includes a description of the content playing on video on demand, the Intelligent TV 100 may retrieve this information from at least one service provider. Typically, such information may be included in the data accompanying the video on demand content. Additionally or alternatively, if the information presentation content includes "recommended" or "favorite" content, the Intelligent TV 100 may refer to a memory where such content may be stored. In one embodiment, the memory may be associated with the hardware of the Intelligent TV 100. In some cases, this content may be stored in a memory remote from the Intelligent TV 100, in which case, the Intelligent TV 100 and its various components may be caused to communicate across a network to retrieve the content. Among other things, the content retrieved across the network may include, but is in no way limited to, content information, thumbnail graphics, etc. One example of the network may include, but is not limited to, the Internet.

The exemplary systems and methods of this disclosure have been described in relation to one or more embodiments of an application panel described with respect to tabs for displaying panel views such as an info panel, a favorites panel, a recommended panel, a genre panel, a new panel, and a search panel. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a such as a cable box or other set top box used to provide content to a television, a smart device used to watch streamed shows, and or other smart devices used to watch content, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the panel displayed to a user may comprise one or more combinations of the info panel, favorites panel, recommended panel, genre panel, new panel, and search panel. In another alternative embodiment, only one of an info panel, a favorites panel, a recommended panel, a genre panel, a new panel, and a search panel is displayed. In some embodiments, the application panel may be displayed with or without tabs.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA®, or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for displaying content on a television, comprising:
   receiving a first input via an input device associated with the television;
   in response to the first input, displaying, via the television, an application panel interface;
   determining content currently being shown on the television;
   identifying at least one of a content source and content information associated with the content currently being displayed via the television;

based on the content and the at least one of the content source and the content information, providing a first content panel in the application panel interface, wherein the first content panel is a first type of application panel;

receiving a first directional input via the input device associated with the television;

determining, based on a first direction associated with the first directional input, a second content panel to display via the television in the application panel interface, wherein the second content panel is a second type of application panel;

retrieving, from memory, a second content information based on the second type of content panel; and displaying, via the television, the second content information in the second content panel.

2. The method of claim 1, further comprising:
retrieving, from a memory, a first image that is representative of the at least one of content source and the content information; and
displaying, via the television, the first image in the first or second content panel.

3. The method of claim 1, wherein the application panel interface is provided in a portion of the display of the television.

4. The method of claim 1, further comprising:
receiving a second directional input via the input device; and
determining, based on a second direction associated with the second directional input, a third content panel to display via the television.

5. The method of claim 1, further comprising:
retrieving at least a portion of the content information from the content source; and
displaying, via the television, the content information associated with the determined source.

6. The method of claim 1, wherein the second content information comprises information associated with content information marked as favorite.

7. The method of claim 1, wherein the second content information comprises information associated with TV series episode content information.

8. The method of claim 1, wherein the second type of content panel is a search panel.

9. The method of claim 1, wherein the second type of content panel is a recommended panel.

10. A system for displaying content on a television, comprising:
an input device associated with the television;
a memory; and
a microprocessor that:
receives a first input via an input device associated with the television;
in response to the first input, displays, via the television, an application panel interface;
determines content currently being shown on the television;
identifies at least one of a content source and content information associated with the content currently being displayed via the television;
based on the content and the at least one of the content source and the content information, provides a first content panel in the application panel interface, wherein the first content panel is a first type of application panel;
receives a first directional input via the input device associated with the television;
determines, based on a first direction associated with the first directional input, a content panel to display via the television in the application panel interface, wherein the second content panel is a second type of application panel;
retrieves, from memory, a second content information based on the second type of content panel; and
displays, via the television, the second content information in the second content panel.

11. The system of claim 10, wherein the microprocessor is further operable to:
retrieve, from a memory, a first image that is representative of the at least one of content source and the content information; and
display, via the television, the first image in the first or second content panel.

12. The system of claim 10, wherein the application panel interface is provided in a portion of the display of the television.

13. The system of claim 10, wherein the microprocessor is further operable to:
retrieve at least a portion of the content information from the source; and
display, via the television, the content information associated with the determined source.

14. The system of claim 10, wherein the second content information comprises information associated with content information marked as favorite.

* * * * *

UNITED STATES PATENT AND TRADEMARK OFFICE
CERTIFICATE OF CORRECTION

PATENT NO. : 9,247,174 B2  
APPLICATION NO. : 13/968665  
DATED : January 26, 2016  
INVENTOR(S) : Sanjiv Sirpal et al.

Page 1 of 1

It is certified that error appears in the above-identified patent and that said Letters Patent is hereby corrected as shown below:

Title Page

In the Related U.S. Application Data at page 2, line 2, replace "61/736,962" with --61/736,692-- therein.

Signed and Sealed this  
Fifth Day of July, 2016

Michelle K. Lee  
*Director of the United States Patent and Trademark Office*